(12) United States Patent
Ruiz

(10) Patent No.: US 11,106,987 B2
(45) Date of Patent: *Aug. 31, 2021

(54) FORECASTING SYSTEMS

(71) Applicant: iRuiz Technologies Ltd., London (GB)

(72) Inventor: Ignacio Ruiz, London (GB)

(73) Assignee: iRuiz Technologies Ltd., London (GB)

( * ) Notice: Subject to any disclaimer, the term of this patent is extended or adjusted under 35 U.S.C. 154(b) by 1001 days.

This patent is subject to a terminal disclaimer.

(21) Appl. No.: 15/726,258

(22) Filed: Oct. 5, 2017

(65) Prior Publication Data

US 2018/0089577 A1  Mar. 29, 2018

Related U.S. Application Data

(63) Continuation-in-part of application No. 14/806,563, filed on Jul. 22, 2015, now Pat. No. 10,748,077.

(Continued)

(51) Int. Cl.
*G06N 7/00* (2006.01)
*G06Q 10/04* (2012.01)
*G06N 7/02* (2006.01)

(52) U.S. Cl.
CPC .............. *G06N 7/00* (2013.01); *G06Q 10/04* (2013.01); *G06N 7/02* (2013.01)

(58) Field of Classification Search
None
See application file for complete search history.

(56) References Cited

U.S. PATENT DOCUMENTS 8,099,356 B2   1/2012 Feinstein et al.
2013/0346047 A1  12/2013 Fukushige et al.
(Continued)

FOREIGN PATENT DOCUMENTS

WO   2008020906 A2   2/2008

OTHER PUBLICATIONS

Henrici, Peter, "Barycentric Formulas for Interpolating Trigonometric Polynomials and their Conjugates", Numer. Math. 33, 1979, pp. 225-234. (Year: 1979).*

(Continued)

*Primary Examiner* — Vincent Gonzales
(74) *Attorney, Agent, or Firm* — Perkins Coie LLP

(57) ABSTRACT

A computer-implemented method of determining an approximated value of a parameter in a first domain is described. The parameter is dependent on one or more variables which vary in a second domain, and the parameter is determined by a function which relates sets of values of the one or more variables in the second domain to corresponding values in the first domain. The method is implemented on a computer system including a processor, and the method comprises: determining a plurality of anchor points in the second domain, wherein each anchor point comprises a set of values of the one or more variables in the second domain; evaluating, at each anchor point, the function to generate corresponding values of the parameter in the first domain; generating an approximation function to the function by fitting a series of orthogonal functions or an approximation to a series of orthogonal functions to the corresponding values of the parameter in the first domain; and using the approximation function to generate the approximated value of the parameter in the first domain.

31 Claims, 30 Drawing Sheets

Related U.S. Application Data

(60) Provisional application No. 62/028,228, filed on Jul. 23, 2014.

(56) References Cited

U.S. PATENT DOCUMENTS

| | | |
|---|---|---|
| 2014/0072233 A1 | 3/2014 | Horwood |
| 2014/0200829 A1 | 7/2014 | Hampapur et al. |
| 2014/0217967 A1 | 8/2014 | Zeine et al. |
| 2016/0203413 A1 | 7/2016 | Ruiz |

OTHER PUBLICATIONS

Non-Final Office Action dated Dec. 18, 2017 for U.S. Appl. No. 14/806,563 of Ruiz, I., filed Jul. 22, 2015.

Collins II, G.W., Fundamental Numerical Methods and Data Analysis, Chapter 3, Polynomial Approximation, Interpolation, and Orthogonal Polynomials, Accessed on Dec. 13, 2017 from: <<http://ads.harvard.edu/books/1190fnmd.book>>, 2003, pp. 55-96.

Tsitsiklis, J. N. et al., Optimal Stopping of Markov Processes: Hilbert Space Theory, Approximation Algorithms, and an Application to Pricing High-Dimensional Financial Derivatives, IEEE Trans. on Auto. Control, vol. 44, No. 10, Oct. 1999, pp. 1840-1851.

\* cited by examiner

FORECASTING SYSTEMS

CROSS-REFERENCE TO RELATED APPLICATIONS

This application is a continuation-in-part application which claims priority to U.S. patent application Ser. No. 14/806,563, titled "Forecasting Systems," filed Jul. 22, 2015, which claims priority to U.S. Provisional Patent Application No. 62/028,228, titled "Forecasting," and filed on Jul. 23, 2014, both of which are incorporated by reference herein in their entirety.

TECHNICAL FIELD

The present invention concerns improved forecasting systems, in particular, but not exclusively to a system for accurately carrying out predictive functions using approximation techniques.

BACKGROUND

Predicting future values of parameters is desirable in many fields and endeavours, including molecular biology, oil and gas, structural engineering, financial modelling and weather forecasting. Typically, in these fields, the value of the parameters is dependent on a complex relationship between several underlying variable factors and sub-variables. Forecasting (i.e. determining future potential events with a probability associated with each of them) is useful as decisions and expectations can be made based on predictions. Also, such predictive analysis can result in useful feedback being provided to a control system to configure a system or device to accommodate the future state or events.

Predictive functions using approximation techniques are used in situations where a given parameter can only be determined by consideration of a group of functions where each function is determined based on multiple scenarios. The scale of computational effort required for this future behaviour simulation is so large, for example there may be millions of variable values requiring millions of approximation calculations, that even current state of the art computing platforms struggle to meet the desired level of accuracy and performance. For example, current forecasting systems may reduce the number of approximation calculations performed, thus reducing accuracy, or increase the amount of processing power used, thus increasing the electrical power and resource requirements of the system. The application of such predictive analysis techniques includes fields such as structural engineering, molecular biology weather forecasting, oil and gas and financial modelling.

For example, in biomedical and biological research, it is of the utmost importance to determine the behaviour of molecules in complex systems. Thus, simulation of molecular interaction is essential to predict the results of variable changes that may affect the systems where molecules lie, such as the interactions of a drug with its solvent, or the receptors where it binds. When working with simple molecules standard statistical methods suffice, but in the case of complex molecules such as DNA, proteins or RNA, molecular simulation methods require the inclusion of variables that affect, in apparent serendipity, the global behaviour of biological systems.

Complex simulation can be used, for example, to predict how a protein folds in space, how a membrane receptor transports the ligand to the cellular cytoplasm, how this receptor interacts with the ligand to elicit a physiological response, or how the viral conformation changes to bind to the host membrane and successfully infect it. Complex simulation and prediction systems are in many cases based on the Monte Carlo method, amongst other methods. Furthermore, the Monte Carlo method has been used to simulate and predict evolutionary changes using molecular data from different species.

Further, the folding of chains of protein atoms into shapes that make them usable can be modelled. This modelling can be done using the Monte Carlo method in a simulation (i.e. a Monte Carlo simulation), where each time step simulates a random step forward, and then the equations that create the point of electro-magnetic equilibrium are solved as is known in the art. These equations are extremely complex to calculate and use a significant amount of computing resource.

In structural engineering, for example, for a car manufacturer, there are generally very complex and accurate models that can be used to determine the stress and damage that each component of the car may receive. It is desirable to understand how long a car would last without a component failing in different driving conditions in order to optimise the design and interaction of the components. Different driving scenarios can be simulated over different periods of time (e.g. city driving, on the highway, in the countryside, a combination of city and countryside, at different speeds, etc.). The model can then be used to determine the incremental damage to each component of the vehicle until the damage reaches a threshold of stress that would cause the component to fail. By running these simulations it can be understood how long, on average, the car could remain roadworthy, the probability of it breaking in 1 year, in 5 years, in 20 years, etc.

Typical Prior Art Forecasting System

In the examples described above, the underlying variables that affect the desired parameter may be determined using stochastic modelling such as the Monte Carlo method. The stochastic models can then feed into the determination of the desired result, as the complex relationship between the result and the underlying variable factors is known. However, in order to achieve more accurate results, more combinations of the underlying variables must be run. This becomes computationally very expensive, especially when increasing the number of iterations.

A typical prior art forecasting system 10 is shown in FIG. 1. The forecasting system 10 is suitable for applications wherein the underlying variables that affect the desired parameter may be determined using stochastic modelling. The features of the forecasting system 10 are described in general terms here, and in example contextual applications below. The forecasting system 10 comprises a controller 12, an input factor module 14, a scenario module 16, a metric module 18 and an input/output module 20. The input factor module 14, the scenario module 16, the metric module 18 and the input/output module 20 are each connected to the controller 12.

The input factor module 14 determines the different scenarios 21 (i.e. stochastic models) of the underlying variables that feed into parameter functions 25 (discussed in greater detail below). The input parameter scenarios 21 are stored in a stochastic model database 22.

The metric module 18 is arranged to calculate metrics 19 to generate a forecast based on the evaluated parameter functions 25. The input/output module 20 provides an interface with the forecasting system 10 to external parties. For example, values of the input variables may be provided by a user or an independent system via the input/output module 20.

FIG. 2 shows the scenario module 16 in greater detail. The scenario module 16 comprises a parameter function evaluator 24 and a parameter function database 26 each connected to a scenario controller 28. The parameter function evaluator 24 is arranged to evaluate parameter functions 25 using input variables from the input factor module 14 to generate forecast scenarios 27.

The parameter function database 26 comprises a plurality of application-specific parameter functions 25. Inputs to the parameter function are a set of one or more variables from the input factor module 14. When the parameter function is evaluated for values of the set of one or more variables, the output of the parameter function is a value of the parameter at the given values of those variables.

FIG. 3 shows the relationship between the input scenarios 21, the underlying variables that create the scenarios (in this example, two variables), one of the parameter functions 25 (in this example, function F2), the forecast scenarios 27 and the metrics 19. Namely, each scenario is defined by different combinations of values of the underlying variables. These scenarios are the input to the function F2 used to generate outputs. The outputs of F2 are the forecast scenarios 27 which in turn can be used to determine metrics 19.

FIG. 4 shows a flowchart summarising the prior art process 30 carried out by the forecasting system 10 described above in relation to FIG. 1. The process 30 begins with all the input variables for the parameter function being evaluated at Step 32 by the input factor module 14 using stochastic modelling and being stored in the stochastic model database 22.

Using the input variables as inputs to the parameter functions 25, the parameter scenarios are determined at Step 34 by the scenario module 16. The parameter scenarios also vary stochastically but are different to the stochastic models of the input variables. The parameter function evaluator 24 of the scenario module 16 evaluates the appropriate parameter function 25 from the parameter function database 26 as many times as required to determine the desired parameter scenarios. The parameter function to be used for the forecast is typically predetermined.

Metrics 19 are then evaluated at Step 36 by the metric module 18 taking input from the parameter scenarios generated by the scenario module 16. The prediction or forecast can then be generated at Step 38 using the metrics determined at Step 36. The output of the forecast may be a probability of an event occurring.

The forecasting system 10 is described in greater detail below in the context of the oil and gas industry, weather forecasting and financial modelling. The oil and gas and weather forecasting examples are described with reference to the typical prior art forecasting system described with reference to FIGS. 1 to 4.

Oil and Gas

In the example of oil and gas industry, the process 30 carried out by the forecasting system 10 involves the input factor module 14 evaluating at Step 32 the stochastic models for input variables. The set of input variables may include: viscosity of the crude oil, remaining supplies in the oil reservoir, oil pumping capacity, well temperature, availability and/or effectiveness of drilling fluid which each vary stochastically over time. The different scenarios 21 (i.e. the stochastic models) for each of the input variables are stored in the stochastic model database 22.

The parameter function database 26 of the scenario module 16 in this example stores a parameter function 25 to determine the extractable volume of crude oil in an oil well over time. The scenarios 21 of this parameter are determined at Step 34 by the scenario module 16 using the input variables from the stochastic model database 22. The parameter function is evaluated at each time step in each scenario to form a stochastic model of the extractable volume parameter.

Metrics are then determined by the metric module 18 at Step 36 based on the expected volume of crude oil that can be extracted from the oil well. In this example, the metrics 19 may include required oil refinement and purification capacity and staffing levels required in downstream processes. The calculated metrics 19 allow the forecast to be generated at Step 38, for example the probability of the future refinement and purification demand exceeding current capacity. Accurate forecasts are beneficial to enable refinement and purification capacity to be increased in a timely manner to meet the predicted demand making the refinement and purification process more efficient.

For the metric of staffing level required, accurate forecasts are advantageous in determining whether additional or fewer staff need to be employed to meet the production demand of the oil well.

In order to improve the accuracy of the forecast, the time resolution of the parameter function scenarios determined at Step 34 is increased. However, the typical time to evaluate the parameter function 25, combined with the number of times the parameter function 25 is evaluated for each scenario 21 means that an accurate high-resolution stochastic model for the extractable volume parameter generally may take a long time to generate even using systems employing the highest power computing devices available. If the time taken to generate the parameter function scenarios is too long, the results may no longer be valid as the value of the starting conditions may have changed.

In order to generate the stochastic model for the extractable volume parameter in a timely manner for the forecast, prior art forecasting systems 10 generally undertake one or more of the following:

1) Reduce the number of scenarios and time points determined at Step 34 by the scenario module 16, so the calculation can be done in a reasonable time. However, the disadvantage is that this reduces the resolution of the scenarios and decreases the accuracy of the metrics used to generate the forecast;

2) Not attempt the calculation of complex parameter functions, as these would utilise more computational time. Again, as a consequence, the determined metrics would be negatively affected by a decrease in accuracy; and 3) Increase the number of computers (and hence computational power) configured to implement the forecasting system 10. However, the number of computers required to reduce the time required to ensure that the results are valid and useful, can be completely impractical. Accordingly, even with increased computing power, the results still suffer from a low resolution and poor accuracy.

4) Implement shortcuts in the methods of the calculation that may increase the speed, but that are always at the expense of accuracy in the calculation. As a result, the accuracy and usability of the metrics generated is compromised.

Weather Forecasting

Another example application of the forecasting system 10 is in the field of weather forecasting. When predicting the temperature or rainfall in a location at a particular time, the temperature or rainfall can be predicted using parameter functions where the set of one or more input variables may include air pressure, air density, solar energy and humidity each from hundreds or more different locations. Monte Carlo simulations are used for weather prediction, starting with the state of the atmosphere when the conditions (e.g. temperature, humidity, pressure) are known.

The process 30 carried out by the forecasting system 10 begins at Step 32, wherein the input factor module 14 determines the variation over time for the input variables across a plurality of scenarios 21. The different scenarios 21 of the variation over time (i.e. the stochastic models) for each of the input variables are stored in the stochastic model database 22.

In this example, the parameter function database 26 includes a parameter function 25 which outputs the temperature at a geographic location as a function of one or more of the input variables. The scenarios 21 of this parameter 25 are determined at Step 34 by the scenario module 16 using the input variables from the stochastic model database 22. The parameter function 25 is evaluated at each time step in each scenario 21 to form a stochastic model of the temperature.

Metrics 19 are then determined by the metric module 18 at Step 36 based on the expected temperature variation at the geographic location. The metrics 19 may include, for example, sea level, pollen count, UV index and wind speed/direction. The calculated metrics 19 allow the forecast to be generated at Step 38. For example, the wind speed and direction metric may be used to determine the probability of the wind speed exceeding a predetermined threshold above which precautionary measures would need to be taken by public services in a timely manner. Another example is if the probability of the pollen count or UV index exceeding a predetermined threshold. The forecast can be publicised to the general public to enable them to take appropriate action.

In weather modelling, as well as in oil and gas, accurate forecasts are advantageous. The accuracy of the metrics 19 is dependent on the resolution of the parameter function scenarios 21 determined at Step 34. However, the typical time to evaluate the parameter function 25, combined with the number of times the parameter function 25 is evaluated for each scenario 21 means that an accurate forecast generally takes a long time to generate. One problem is that if the time taken to generate the parameter function scenarios is too long, the results may no longer be valid as the known value of the starting conditions (from which the input parameters are generated, and that may be included in the input parameters) may have changed.

The parameter function database 26 may also include a parameter function 25 arrange to output the state of equilibrium in the atmosphere, such that a scenario shows the evolution of the atmospheric conditions. Typically, this parameter function is evaluated at Step 34 with small time steps in the Monte Carlo simulation, and after each time step, the state of equilibrium in the atmosphere is determined before the next time step. The smaller the time steps, the easier it is to solve the equations that describe the new state of atmospheric equilibrium. However, with a smaller time step, it becomes computationally expensive to run the simulation far into the future (i.e. a longer time frame). Therefore, to be able to predict further in time in the simulation, larger time steps are used in the simulation. However, these larger time steps make the equations that calculate the new atmospheric equilibrium point more complex and therefore more difficult to solve.

In order to generate the parameter function scenarios in a timely manner for the forecast, prior art forecasting systems 10 generally undertake one or more of the three options expressed above, namely:

1) Reducing the number of scenarios and time points determined at Step 34 by the scenario module 16;

2) Simply not attempting the calculation of complex parameter functions; and

3) Increasing the number of computers (and hence computational power) configured to implement the forecasting system 10.

4) Implementing shortcuts in the methods implemented that may increase the speed, but that decrease the accuracy of the calculation.

Often, none of the above lead to a satisfactory solution that is as accurate as desired.

Financial Modelling

A more detailed but functional example of forecasting is discussed below in the field of financial modelling to illustrate the limitations of existing state of the art forecasting simulation technology. However, it is to be appreciated that the technical limitations which exist in the implementation of these systems and techniques apply equally to all fields of application of forecasting and simulation technology.

Taking finance as a specific example, Over-The-Counter (OTC) derivatives are significant part of the world of global finance. OTC derivatives are contracts signed by two institutions by which they agree to exchange a series of cash-flows during and/or at the end of the contract. Those cash-flows will be driven by the value of some specified external variables. Both institutions agreeing to these contracts are typically called the 'counterparties' of the OTC derivative. A financial institution may comprise a large number of OTC derivatives in a 'portfolio' or 'book', with typically up to of a few million OTC derivatives.

Each OTC derivative comprises one or more price parameters. Examples of price parameters include: a value of the price, a time validity of the price and a potential variation range (e.g. a standard deviation) of the price, a sensitivity of the price to external factors (e.g., the so-called "Greeks" in the art).

An example of a contract is an Equity Future. In this example, today is 1 Jan. 2014 and entity A and entity B agree to the following cash-flow between them on 1 Jan. 2015: the difference in the value of SP500 on those two days, multiplied by an agreed notional value. Accordingly, they agree that a price parameter, P, of the contract is approximately determined by:

$$P = \text{Notional}(SP500_{1jan15} - SP500_{1jan14})$$

where Notional is, for example, one thousand US Dollars, and SP500 is the value of the Standard & Poor's 500 equity index such that $SP500_{1jan14}$ is the value on 1 Jan. 2014 and $SP500_{1jan15}$ is the value on 1 Jan. 2015. If P is greater than 0, then entity A receives the cash-flow from entity B, if P is less than 0, then entity A pays the cash-flow to entity B.

It must be noted that the price parameter and risk management of these assets, which have a value that changes constantly and, often, very rapidly, is a major issue for asset owners. The reason for this is that the evaluation of accurate risk metrics can be highly computationally demanding to the extent that, in many cases, it cannot be carried out properly. This will be explained in more detail in this document. Furthermore, calculation of price parameters and risk metrics demands the valuation directly from market data using price parameter functions.

This contract has a price parameter at any time, t, between 1 Jan. 2014 and 1 Jan. 2015, which can be approximated by:

$$P_t = \text{Notional}(SP500_t - SP500_{1jan14})$$

Generalizing the example above, in order to calculate the price parameter of an OTC derivative at any point in time, there are two distinguishable components:

1) Risk Factors

The price parameter of an OTC derivative is based in the value of several risk factors. In the simplified example provided above, there was only one risk factor, the value of the SP500 equity index. However, in most OTC derivatives, there are a substantially greater number of variable risk factors. These risk factors include several types of interest rates, foreign exchange rates, equity prices, credit spreads, commodity prices, bond prices, etc. A financial institution's book of OTC derivatives will be sensitive to a plurality of these factors, typically ranging from a few hundred to several thousand risk factors.

2) Derivative Price Parameter Functions

Once the risk factors that affect the price parameter of the OTC derivative have been determined, the price parameter at time t will be given by a function $f(x)$, such that:

$$P_t = f(x_t)$$

where x refers to the weighted and combined collection of all the risk factors that are relevant to the price parameter of that OTC derivative at time t. Referring back to the previous example, if x is taken to be equivalent to SP500, then $f(x_t)$=Notional $(x_t-x_0)$, where $x_0$ is the initial value of the risk factor, i.e. $SP500_{1jan14}$.

Determination of Counterparty Credit Risk Metrics

In the context of financial services, counterparty credit risk is the risk that a counterparty to a financial contract will default prior to the expiration of the contract. As OTC derivatives are generally privately-negotiated contracts between counterparties, they are subject to counterparty risk. Counterparty risk is similar to other forms of credit risk in that the cause of economic loss is if the obligor defaults (e.g. goes into liquidation). However, counterparty risk is differentiated from more conventional forms of credit risk in the uncertainty of exposure (i.e. the value of the potential loss may vary) and its bilateral nature (i.e. both parties are exposed to each other). In order to reduce the uncertainty of exposure and manage the counterparty credit risk, the risk is measured and quantified using one or more metrics.

FIG. 5(a) shows an example prior art forecasting system 100 that can be used to determine counterparty credit risk metrics. The system comprises a controller 102 and a risk factor module 104, a price parameter module 106, a risk metric module 108 and an input/output module 110 that are each connected to the controller 102. The risk factor module 104 determines the variation over time of the underlying variables that feed into the price parameter functions and affect the price of the OTC derivatives.

A price parameter function, $f(x)$, is a mathematical function that defines a relationship between one or more input variables to produce an output, where the output is a parameter of the price. Price parameter functions are defined in the domain(s) of the one or more input variables. Accordingly, a price parameter function varies in one or more relationship domains (as opposed to the time domain) where each relationship domain corresponds to the effect of the one or more input variables on the output of the function.

The risk factor module 104 stores data regarding the value of the risk factors in a stochastic model database 112, described in more detail with reference to FIG. 5(b). The price parameter module 106 determines the price parameter function $f(x)$, and is described in more detail with reference to FIG. 6(a). The risk metric module 108 is configured to determine the value of the counterparty credit risk metrics.

The input/output module 110 provides an interface with the forecasting system 100 to external parties.

Each module comprises its own processing core or set of processors arranged in parallel with a multicore structure to provide increased processing speed as is known in the art.

The input/output module 110 is configured to allow two-way communication between the forecasting system 100 and a user (user device or computer) or computer network, wherein inputs are signals or data received by the system, and outputs are signals or data sent from it. For example, the input/output module 110 may be a network card, a modem or a computer terminal comprising a keyboard and a monitor.

FIG. 5(b) shows the stochastic model database 112 in greater detail. For each risk factor 114, for a point in time 116, values 120 of the risk factor are stored for a plurality of different scenarios 118. In the example of FIG. 5(b), the values 120 of two different risk factors, Factor1 and Factor2, are shown each at four time points.

FIG. 5(c) is a graphical representation of an example stochastic model 122 that may be stored in the stochastic model database 112. The stochastic model 122 shows the value of a risk factor over time with four distinct distributions of potential outcomes 124, called 'scenarios'. In the example shown all four scenarios 124 start at t=0 with the same value of the risk factor; however it must be noted that, in other applications, this may not always the case and the initial value of the scenarios may be different. In FIG. 5(c), only four scenarios are shown for illustrative simplicity, however, a typical stochastic model may comprise thousands of scenarios.

In this example, the initial conditions of each risk factor are known, in other words, the value of each risk factor is known for the present time, t=0, however the values of the risk factor any time after the present time are not known. As each risk factor may vary over time, the risk factor module is configured to determine the evolution of the risk factors over time using probabilistic modelling in the form of stochastic simulation such as the Monte Carlo method as is known in the art.

The four scenarios 124 tend to diverge away from each other with increasing time as the stochastic model allows for random variations which accumulate, causing increased uncertainty in the potential future value of the risk factor. The random variations can be based on fluctuations observed in historical data of the risk factor and/or in the value of current data.

As described above, each OTC derivative may be affected by a few hundred to several thousand risk factors, each with their own stochastic model of value for thousands of scenarios.

The stochastic scenarios generated by the risk factor module 104 are communicated to the price parameter module 106 via the controller 102.

The price parameter module 106 is configured to determine the price parameter of each OTC derivative at a desired time point and in a given scenario. For a particular time, t, and in a given scenario, i, the price parameter of the OTC derivative can be determined using a pricing parameter function, $P_{t,i}=f(x_{t,i})$. To establish the variation of the OTC derivative price parameter over time in a given scenario, the pricing parameter function can be determined for different points in time.

FIG. 6(a) shows an example prior art price parameter module 106 in greater detail. The price parameter module 106 comprises a price parameter controller 150, a price parameter function evaluator 152 and a pricing function database 154. The price parameter controller 150 is connected to the controller 102 of the forecasting system 100. The price parameter function evaluator 152 and the pricing function database 154 are each connected to the price parameter controller 150. The price parameter function evaluator 152 determines the value of a price parameter function from the pricing function database 154 using the value of the risk factors from the stochastic model database 112. The pricing function database 154 comprises a plurality of price parameter functions.

FIG. 6(b) shows the pricing function database 154 in greater detail. The pricing function database 154 stores the price parameter function 156 associated with each OTC derivative 158 in the financial institution's portfolio. Each price parameter function 156 generally comprises a different combination and weighting of risk factors. The price parameter function evaluator 152 is configured to determine the output value of the price parameter function 156, requesting the value of the risk factors it requires from the stochastic model database 112 via the risk factor module 104 and the controller of the system and the price parameter controller 150.

FIG. 7(a) is a graphical representation 180 of an example of a price parameter function over time and shows an example distribution in the price parameter of an OTC derivative over a period of time in two potential outcomes 182 (i.e. two scenarios). The price parameters of the OTC derivative in each of the two scenarios is determined by the price parameter function evaluator 152 and are shown at each of ten time points, $t_0$ to $t_9$ respectively.

FIG. 7(b) is a graphical representation 184 of another example of a price parameter function over time showing a higher resolution distribution of four scenarios 186 compared to the lower resolution shown in FIG. 7(a). The higher resolution means that the price parameter function has been evaluated at more time points.

Increasing the number of time points at which the price parameter is determined increases the resolution of the scenario, thereby increasing the accuracy of any analysis made on the scenario. However, as is described below, this comes at a far greater computational cost. This is because each determination of the price parameter function by the price parameter module 106 is computationally expensive, and the price parameter function must be evaluated at each desired time point and scenario.

The number of scenarios in the stochastic model generated by the risk factor module 104 will be referred to below as N. For example, referring to FIG. 5(c), N=4. Additionally, the number of points in time at which the OTC price parameter is determined at will be referred to M. For example, referring to FIG. 7(a), M=10. It follows that in a price parameter distribution, the price parameter function is determined N×M times for each derivative. For example, referring to FIG. 7(a), the price parameter function is called by the price parameter function evaluator 2×10=20 times.

The price parameter distributions generated by the price parameter module 106 are communicated to the risk metric module 108 via the controller 102.

The risk metric module 108 is configured to determine a plurality of counterparty credit risk metrics using all the scenarios in the price parameter distributions for all the OTC derivatives of the financial institution. Many metrics are typically used for pricing, accounting, risk management and capital calculations. The metrics include:
 a) Expected Exposure (EE) profiles, both in its 'positive' (EPE) and 'negative' (ENE) version
 b) Potential Future Exposure (PFE) profiles
 c) Credit Value Adjustment (CVA) and Debit Value Adjustment (DVA) for pricing
 d) Effective Expected Positive Exposure (EEPE) for regulatory capital calculation
 e) Funding Value Adjustment (FVA) for internal valuation and balance sheet calculation.

FIG. 8(a) shows a flowchart summarising the prior art process 200 carried out by the forecasting system 100 described above in relation to FIG. 5(a). The process 200 begins at Step 202, where all the risk factors are evaluated using stochastic modelling by the risk factor module 104 and stored in the stochastic model database 112. Using risk factors as inputs to the price parameter functions, the price parameter scenarios (which are related but different to the risk factor scenarios) are determined at Step 204 by the price parameter module 106. The price parameter function evaluator 152 of the price parameter module 106 evaluates the appropriate price parameter function from the pricing function database 154 as many times as required to determine the desired price parameter scenarios (described in more detail with reference to FIG. 8(b)). The risk metrics are then evaluated at Step 206 by the risk metric module 108 taking input from the price parameter scenarios generated by the price parameter module 106. The prediction or forecast can then be generated at Step 208 using the risk metrics determined at Step 206.

FIG. 8(b) shows a flowchart of the process 204 carried out by the price parameter module 106 in order to determine the price parameter scenarios. The process 204 starts with the price parameter function evaluator 152 receiving at Step 210 the number of time points, M, required for the desired resolution of the price parameter scenarios. Then the price parameter function evaluator 152 receives at Step 212 the number of scenarios, N, desired. The price parameter function evaluator 152 then obtains at Step 214 the price parameter function 156, $f(x)$, for the OTC derivative from the pricing function database 154.

The price parameter function evaluator 152 sets at Step 216 the current time point to the first time point of the total number of time points, M. Then, the price parameter function evaluator 152 sets at Step 218 the current scenario to the first scenario of the total number of scenarios, N.

For the first time point of the first scenario, the price parameter function 156 is then evaluated at Step 220 by the price parameter function evaluator 152. The price parameter function evaluator 152 then checks at Step 222 whether the price parameter function has been evaluated for all scenarios N received at Step 212 for the first time point. If not, the price parameter function evaluator 152 moves at Step 224 the current scenario to the next scenario and the process 204 loops back to Step 220 whereby the price parameter function 156 is evaluated by the price parameter function evaluator 152 for the current time point.

This loop continues until the price parameter function 156 has been evaluated for all the scenarios, N, received at Step 212 for the first time point. If, following the check at Step 222, the price parameter function 156 has been evaluated for all the scenarios received at Step 212, the process 204 moves on to checking at Step 226 whether price parameter function 156 has been evaluated for all time points received at Step 210.

If not, the price parameter function evaluator 152 moves at Step 228 the current time point to the next time point and then the current scenario is moved at Step 230 to the first scenario. The process 204 then loops back to Step 220 whereby the price parameter function 156 is evaluated by the price parameter function evaluator 152 for the current time point of the current scenario. Once the price parameter function 156 has been evaluated for all the time points for all the scenarios, the process 204 is completed.

In other embodiments, all the time points for the first scenario are determined before moving on to determining all the time points for the next scenario, until all the time points for all the scenarios have been determined.

The process 204 carried out by the price parameter module 106 in order to determine the price scenarios demonstrates that the number of evaluations of the price parameter function 156 required (M×N in this example) is a limiting factor in the speed of the overall process 200 carried out by the forecasting system 100. A more detailed numerical example of the limitations imposed by the process 204 is highlighted in the financial example below.

Example Number of Price Parameter Function Determinations

Taking the CVA metric as an example, the price parameter of the OTC derivative is typically desired to be calculated to an accuracy of one 'basis point' (one one-hundredth of one percent), i.e. 0.01% ($1/10^4$). The typical number of scenarios, N, used in order to achieve this pricing error in CVA is around one million.

In order to calculate the CVA 'Greeks' via Monte Carlo methods (the sensitivities of the CVA price parameter to changes in the market conditions), the CVA price parameters must be calculated to a resolution of 0.01 basis points at least ($1/10^6$) so that the calculated Greek parameter has a stable value. As the pricing error expands in Monte Carlo simulations as $\sqrt{N}$, this means that in order to calculate the Greeks to this accuracy, N would be around ten billion (i.e. 10,000,000,000) and this would be received by the price parameter function evaluator 152 at Step 212 of the process 204.

The expiry of an OTC derivative may range from a few weeks (e.g. foreign exchange derivatives) to up to 50 years (e.g. inflation derivatives). The average expiry in a financial institution's book of derivatives can typically be of around 10 years.

For example, taking an average OTC derivative with an expiry of 10 years, there are approximately 2,600 trading days in that period. Ideally, the financial institution would desire an accurate determination of the counterparty credit risk that it is currently exposed to be based on the forecast from today (I.e. $t_0$) to the end of year 10. Taking each day as a point in time at which the price parameter is determined for one of the OTC derivatives, M=2,600 and this would be received by the price parameter function evaluator 152 at Step 210 of the process 204. Therefore, in order calculate, for example, the CVA counterparty credit risk metric for this OTC derivative to the desirable degree of accuracy of 0.01 basis points, the price parameter function is determined N×M times or 10,000,000,000×2,600=26,000,000,000,000 (i.e. $26 \times 10^{12}$ times) in the step of determining the price parameter scenarios (Step 220 of the process 204 carried out by the price parameter function evaluator 152).

A typical large financial institution may have a few million OTC derivatives on their books. For example, if the number of derivatives, D, of a financial institution is 1,000,000, then to calculate the CVA metric for each (and assuming an average expiry of 10 years for each OTC derivative), the number of times that the price parameter function 156 is determined is D×N×M times or 1,000,000×26,000,000,000,000=26,000,000,000,000,000,000 (i.e. $26 \times 10^{18}$ times).

This number of calculations would only determine one set of risk metrics. Additionally, a number of subsequent calculations are carried out. In order to calculate the CVA Greeks via the typical Monte Carlo method, for example, this calculation would be repeated at least one time per Greek. A large financial institution may typically desire to calculate a few hundred Greeks. The example below uses 100 Greeks.

Also, whenever a new derivative is transacted, an existing derivative is unwound, or when risk analysis is performed, the calculation would be to be re-run, at least partially to the netting set affected by the derivative.

Conservatively, a typical financial institution may desirably run this calculation 10 times per day.

This would lead to the number of price parameter function determinations, in this example, to be:

$$100 \times 10 \times 26 \times 10^{18} = 26 \times 10^{21}$$

The number of calculations required to achieve this desired level of accuracy demands significant computational effort and accordingly, takes too long to process to be of any benefit. Accordingly, this level of accuracy is simply not achievable within a practical time period given the available computing power.

Maximising the accuracy of the risk metrics is desirable in all fields, including weather forecasting and in the oil and gas industry. In turn, this increases the number of times the respective functions $f(x)$ are evaluated, requiring more computational effort and time.

Computational Power Requirements

The largest financial institutions in the world comprise server farms of state-of-the-art computers, available 24 hours a day, for these calculations. In spite of that, the reported number of scenarios that they use range between N=1,000 and N=10,000, and the number of time points between M=25 to M=100.

The computational time required for an optimised price parameter function 156 for a single parameter currently range from around one millisecond for the simplest derivatives to several minutes or hours for complex ones. Reportedly, large financial institutions typically run a few hundred systems, typically about two hundred, constantly and simultaneously to determine the price parameter functions and process the counterparty credit risk metrics.

The approximate total computational time of Step 204 is given by:

$$\frac{\text{computational time per calculation} \times \text{number of derivatives}, D \times \text{number of scenarios}, N \times \text{number of time points}, M}{\text{number of computers}}$$

Assuming that an average computational time for a price parameter function is only 0.01 seconds, taking the typical values above, this gives:

$$\frac{0.01 \times 1,000,000 \times 1,000 \times 25}{200} = 1,250,000 \text{ seconds} \approx 14.5 \text{ days}$$

$$\frac{0.01 \times 1,000,000 \times 10,000 \times 100}{200} = 50,000,000 \text{ seconds} \approx 578.7 \text{ days}$$

Therefore the computational time of Step 204 can easily range from 14.5 days to 578.7 days.

The vast number of determinations of the price parameter function 156 by the price parameter function evaluator 152 means that by the time the calculations are complete, the results may no longer be valid or useful. Therefore, financial institutions implement the forecasting system 100 in state-of-the-art computer farms but generally reduce the accuracy in order to save time. Further, in order to achieve the best possible result in the available time, workarounds are implemented including:

1) Reducing the number of scenarios and time points so the calculation can be done in a reasonable time. As a result, the quality of the risk metrics and subsequent risk management results generated by the forecasting system 100 substantially decreases.

2) Simply not attempting this calculation for sophisticated OTC derivatives with complex price parameter functions, as these would utilise more computational time. Again, as a consequence, risk management results are negatively affected.

3) Increasing the number of computers (and hence computational power) configured to implement the forecasting system 100. However, the number of computers required to reduce the time required to ensure that the results are valid and useful is impractical. Further, the size of the computational problem is so large that additional computing power can actually make a negligible difference to the time required.

4) Implement methodological shortcuts in the calculation that may increase the speed, but that always create lack of accuracy in the calculation and, hence, decrease the usability of the metrics produced.

The present invention seeks to mitigate or at least overcome at least some of the above-mentioned problems.

SUMMARY OF THE INVENTION

According to the present invention, there is provided a computer-implemented method of determining an approximated value of a parameter in a first domain, the parameter being dependent on one or more variables which vary in a second domain, and the parameter being determined by a function which relates sets of values of the one or more variables in the second domain to corresponding values in the first domain, the method being implemented on a computer system including a processor, and the method comprising: determining a plurality of anchor points in the second domain, wherein each anchor point comprises a set of values of the one or more variables in the second domain; evaluating, at each anchor point, the function to generate corresponding values of the parameter in the first domain; generating an approximation function to the function by fitting a series of orthogonal functions or an approximation to a series of orthogonal functions to the corresponding values of the parameter in the first domain; and using the approximation function to generate the approximated value of the parameter in the first domain.

Optionally, the method comprises transforming the function into an intermediary function before the generating step, wherein the intermediary function is a linear transformation of the function, and wherein the generating step comprises approximating the intermediary function.

Optionally, the transforming step comprises linearly transforming the function into a predetermined range.

Optionally, the series of orthogonal functions is one of the group comprising: sines, cosines, sines and cosines, Bessel functions, Gegenbauer polynomials, Hermite polynomials, Laguerre polynomials, Chebyshev polynomials, Jacobi polynomials, Spherical harmonics, Walsh functions, Legendre polynomials, Zernike polynomials, Wilson polynomials, Meixner-Pollaczek polynomials, continuous Hahn polynomials, continuous dual Hahn polynomials, a classical polynomials described by the Askey scheme, Askey-Wilson polynomials, Racah polynomials, dual Hahn polynomials, Meixner polynomials, piecewise constant interpolants, linear interpolants, polynomial interpolants, gaussian process based interpolants, spline interpolants, barycentric interpolants, Krawtchouk polynomials, Charlier polynomials, sieved ultraspherical polynomials, sieved Jacobi polynomials, sieved Pollaczek polynomials, Rational interpolants, Trigonometric interpolants, Hermite interpolants, Cubic interpolants, and Rogers-Szegö polynomials.

Optionally, the series of orthogonal functions is a series of orthogonal polynomials.

Optionally, the approximation to a series of orthogonal functions is an approximation to a series of orthogonal polynomials.

Optionally, the method comprises selecting a series of orthogonal functions or an approximation to a series of orthogonal functions before the generating step, and wherein the generating step comprises using the selected series of orthogonal functions or the approximation to the series of orthogonal functions.

Optionally, the number of anchor points, $N_E$, is so that:

$$\frac{N_S \cdot T}{N_E \cdot T + N_S \cdot t} > 1$$

Wherein $N_S$ is the number of scenarios, t is the time taken to run the approximation function, and T is the time taken to run the function. For example, the number of anchor points is from 1 to 200, from 5 to 50, from 1 to 50, or from 5 to 20.

Optionally, the method comprises holding the values of all but one variable in the set to be constant in the evaluating step.

Optionally, the method comprises using the approximated values of the parameter to generate standard metrics.

Optionally, the values of the variables vary stochastically.

Optionally, the using step comprises using the approximation function a plurality of times to generate at least one scenario or one time step, each scenario or each time step comprising a plurality of approximated values.

Optionally, the number of scenarios or time steps is significantly greater than the number of anchor points.

Optionally, an output of the function is a parameter of a financial product.

Optionally, the financial product is a financial derivative including one or more of a group comprising: an option pricing function, a swap pricing function and a combination thereof.

Optionally, the function is one of the group comprising: a Black-Scholes model, a Longstaff-Schwartz model, a binomial options pricing model, a Black model, a Garman-Kohlhagen model, a Vanna-Volga method, a Chen model, a Merton's model, a Vasicek model, a Rendleman-Bartter model, a Cox-Ingersoll-Ross model, a Ho-Lee model, a Hull-White model, a Black-Derman-Toy model, a Black-Karasinski model, a Heston model, a Monte Carlo based pricing model, a binomial pricing model, a trinomial pricing model, a tree based pricing model, a finite-difference based pricing model, a Heath-Jarrow-Morton model, a variance gamma model, a Fuzzy pay-off method, a Single-index model, a Chepakovich valuation model, a Markov switching multifractal, a Datar Mathews method, and a Kalotay-Williams-Fabozzi model.

Optionally, the anchor points are the zeros or extrema of each of the orthogonal functions, or a subset of the zeros or extrema.

Optionally, the approximating function is generated using an interpolation scheme.

Optionally, the interpolation scheme is one from the group comprising: piecewise constant interpolants, linear interpolants, polynomial interpolants, gaussian process based interpolants, spline interpolants, barycentric interpolants, Rational interpolants, Trigonometric interpolants, Hermite interpolants and Cubic interpolants.

Optionally, the anchor points are integration points of a numerical integration scheme.

Optionally, the numerical integration scheme is one from the group comprising: Newton-Cotes methods, a trapezoidal method, a Simpson's method, a Boole's method, a Romberg integration method, Gaussian quadrature methods, Chenshaw-Curtis methods, a Fejer method, a Gaus-Kronrod method, Fourier Transform methods, an Adaptive quadrature method, a Richardson extrapolation, a Monte Carlo and Quasi Monte Carlo method, a Markov chain Monte Carlo, a Metropolis Hastings algorithm, a Gibbs Sampling, and Fast Fourier Transform methods.

Optionally, the speed of the calculation is increased with no loss of accuracy in the standard metrics, and/or the accuracy of the standard metrics increase with no decrease in the speed of the calculation when using the approximation function.

Optionally, there is a difference between the approximated value of the parameter and the parameter in the $2^{nd}$ significant figure when compared at the same point in the first domain.

Optionally, there is a difference between the approximated value of the parameter and the parameter in between the $4^{th}$ and the $6^{th}$ significant figure when compared at the same point in the first domain.

Optionally, there is a difference between the approximated value of the parameter and the parameter in the $15^{th}$ significant figure when compared at the same point in the first domain.

A financial derivative may comprise a parameter, wherein a value of the parameter is determined using the computer-implemented method above.

According to an aspect of the invention, there is provided a computer system comprising a processor configured to determine an approximated value of a parameter in a first domain, the parameter being dependent on one or more variables which vary in a second domain, and the parameter being determined by a function which relates sets of values of the one or more variables in the second domain to corresponding values in the first domain, the computer system comprising: a determination module arranged to determine a plurality of anchor points in the second domain, wherein each anchor point comprises a set of values of the one or more variables in the second domain; an evaluation module arranged to evaluate, at each anchor point, the function to generate corresponding values of the parameter in the first domain; a generation module arranged to generate an approximation function to the function by fitting a series of orthogonal functions or an approximation to a series of orthogonal functions to the corresponding values of the parameter in the first domain; and an approximation module arranged to use the approximation function to generate the approximated value of the parameter in the first domain.

According to an aspect of the invention, there is provided a computer-implemented method of determining an approximated value of a parameter in a first domain, the parameter being dependent on one or more variables which vary in a second domain, and the parameter being determined by a function which relates sets of values of the one or more variables in the second domain to corresponding values in the first domain, the method using a series of orthogonal functions or an approximation to a series of orthogonal functions to approximate the function.

Optionally, the series of orthogonal functions used to generate the approximation function is a first series of orthogonal functions and the series of orthogonal functions used to determine the plurality of anchor points is a second series of orthogonal functions different from the first series of orthogonal functions.

Optionally, the first series of orthogonal functions is the Lagrange polynomials and second series of orthogonal functions is the Chebyshev polynomials.

Optionally, the series of orthogonal functions is the Chebyshev polynomials, and the method comprising applying a Clenshaw algorithm to the approximation function to obtain a Clenshaw approximation function before the using step, wherein the using step comprises using the Clenshaw approximation function to generate the approximated value of the parameter.

Optionally, the series of orthogonal functions is the Lagrange polynomials, and the method comprising applying a Barycentric algorithm to the approximation function to obtain a Barycentric approximation function before the using step, wherein the using step comprises using the Barycentric approximation function to generate the approximated value of the parameter.

Optionally, the determining step comprises determining a plurality of anchor points in a sub-domain of the second domain, wherein each anchor point comprises a set of values of the one or more variables in the sub-domain of the second domain, and the generating step comprises generating the approximation function to the function in the sub-domain.

Optionally, using the approximation function comprises applying a transform to the approximation function, and using the transformed approximation function to generate the approximated value of the parameter.

Optionally, the transform is a derivative of the approximation function with respect to at least one of the variables in the second domain.

According to an aspect of the invention, there is provided a computer-implemented method of determining an approximated value of a parameter in a first domain, the parameter being dependent on one or more variables which vary in a second domain, and the parameter being determined via a function which relates sets of values of the one or more variables in the second domain to corresponding values in the first domain, the method being implemented on a computer system including a processor. The method comprises determining a plurality of anchor points in the second domain, wherein each anchor point comprises a set of values of the one or more variables in the second domain; evaluating, at each anchor point, the function to generate corresponding values of the parameter in the first domain; applying a transform to the corresponding values of the parameter in the first domain; generating an approximation function by fitting a series of orthogonal functions or an approximation to a series of orthogonal functions to the transformed corresponding values of the parameter in the first domain; and using the approximation function to generate the approximated value of the parameter in the first domain.

According to an aspect of the invention, there is provided a computer-implemented method of determining an approximated value of a parameter in a first domain, the parameter being dependent on one or more variables which vary in a second domain, and the parameter being determined by a function which relates sets of values of the one or more variables in the second domain to corresponding values in the first domain, the method being implemented on a computer system including a processor. The method comprises receiving a plurality of given values of the parameter in the first domain corresponding to a plurality of given sets of values of the one or more variables in the second domain; determining a plurality of anchor points in the second domain, wherein each anchor point comprises a set of values of the one or more variables in the second domain; transforming the given sets of values of the one or more variables in the second domain to correspond to the plurality of anchor points; generating an approximation function to the function by fitting a series of orthogonal functions or an approximation to a series of orthogonal functions to the given values of the parameter in the first domain at the plurality of anchor points; and using the approximation function to generate the approximated value of the parameter in the first domain.

BRIEF DESCRIPTION OF THE DRAWINGS

FIG. 1 (8b) have already been described above by way of background, in which:

FIG. 1 is a schematic block diagram of a prior art forecasting system;

Figure 9A:
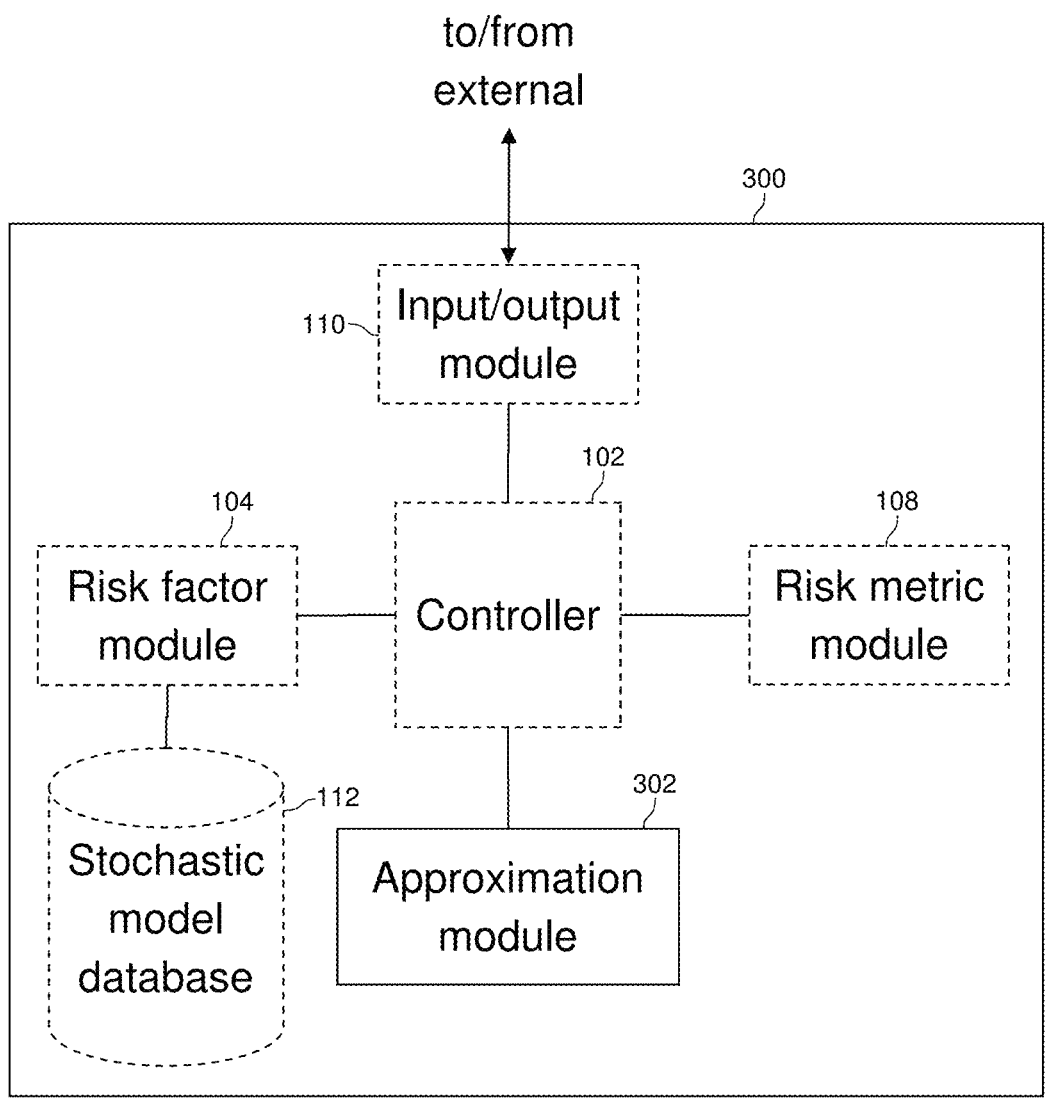
Figure 9B:
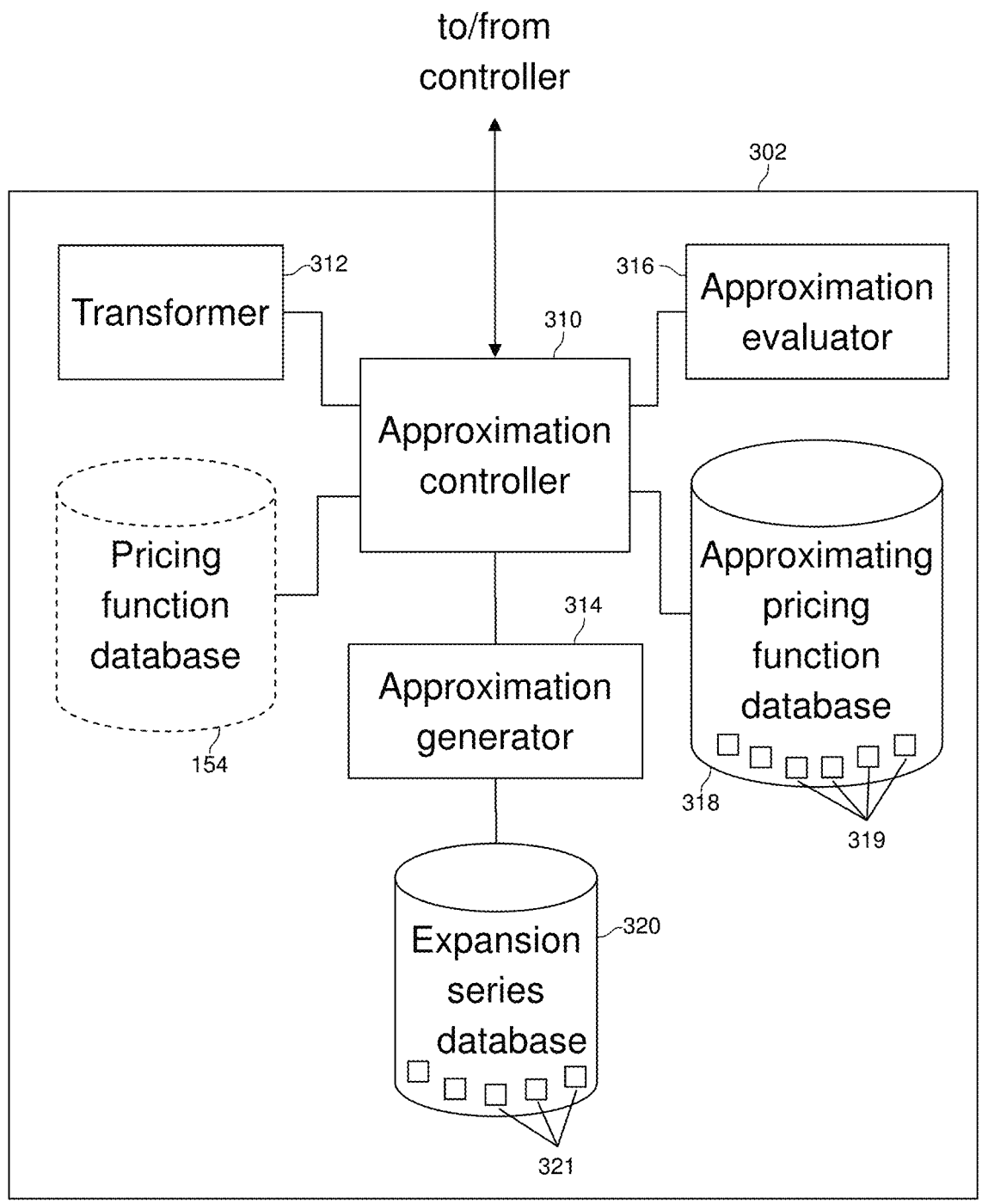
Figure 10A:
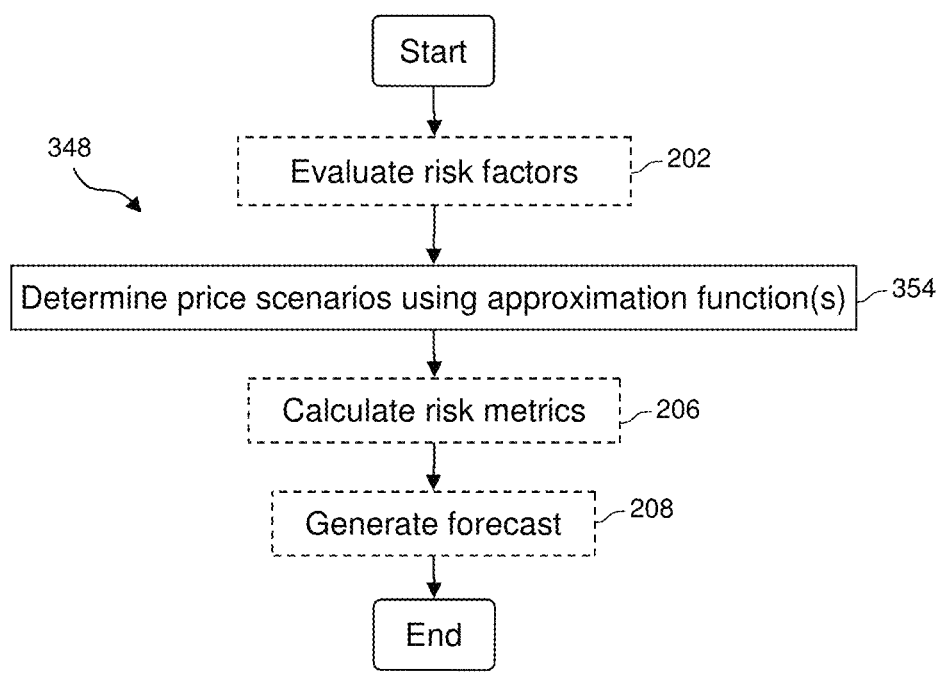
Figure 10B:
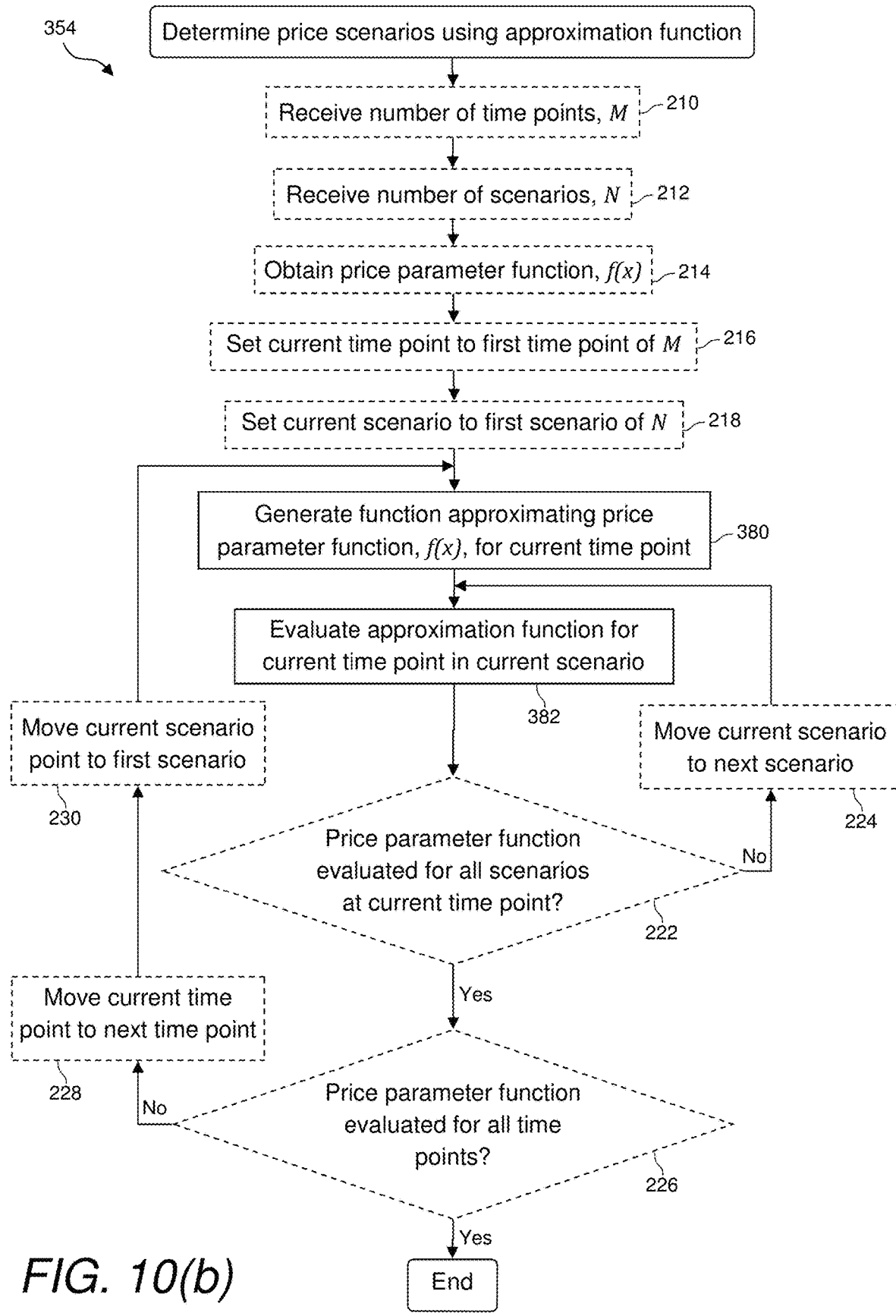
Figure 10C:
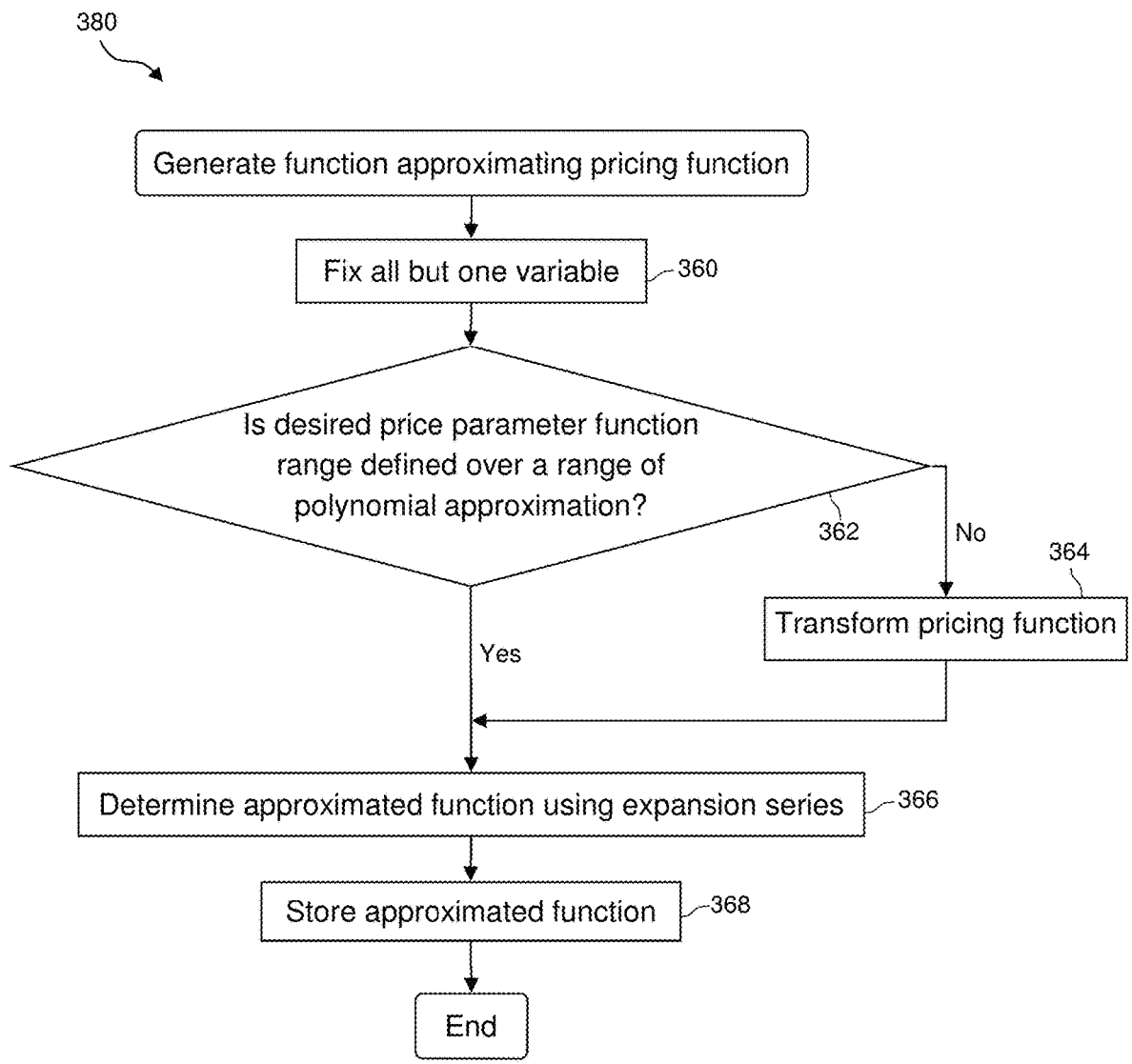
Figure 15:
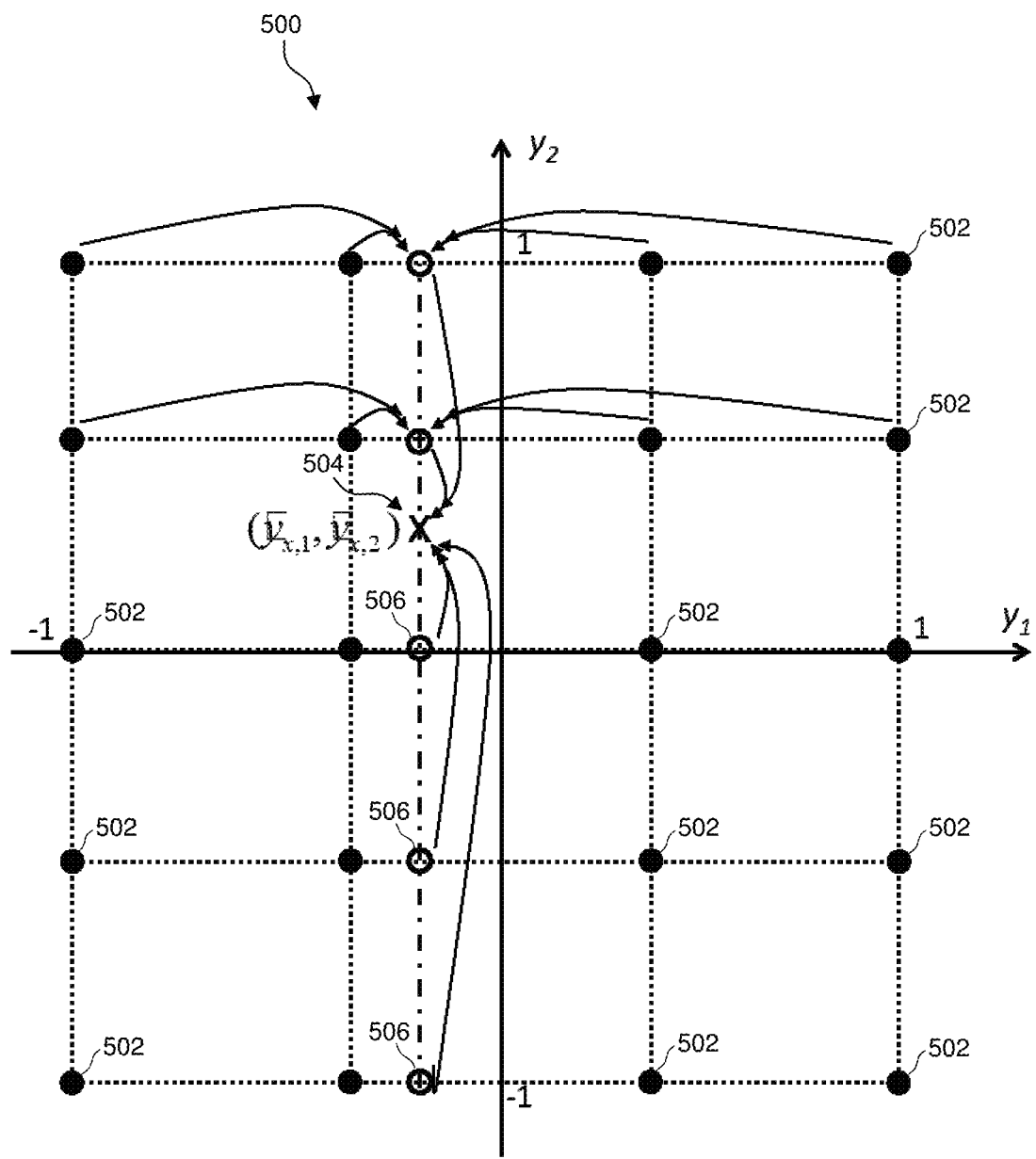
Figure 16:
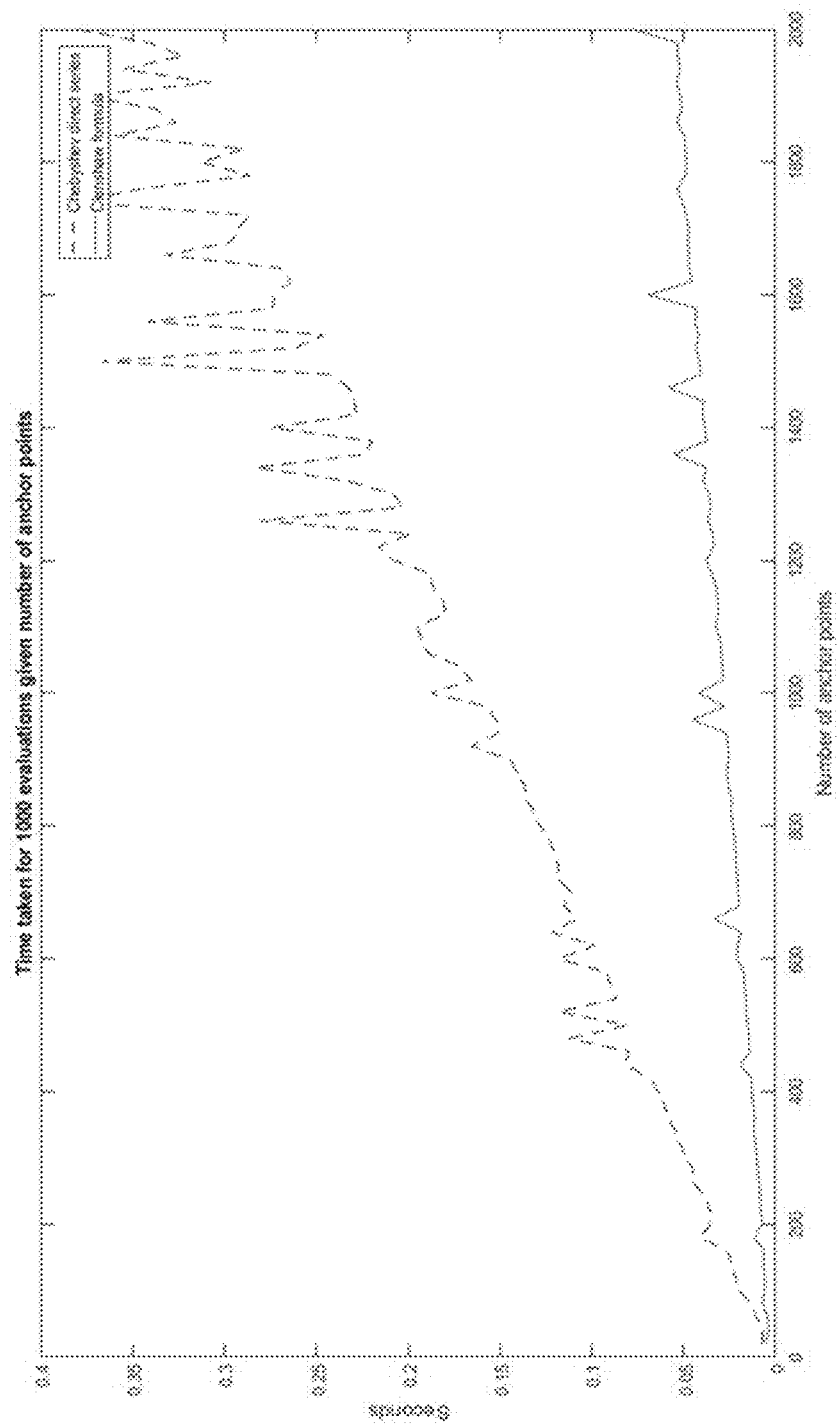
Figure 17A:
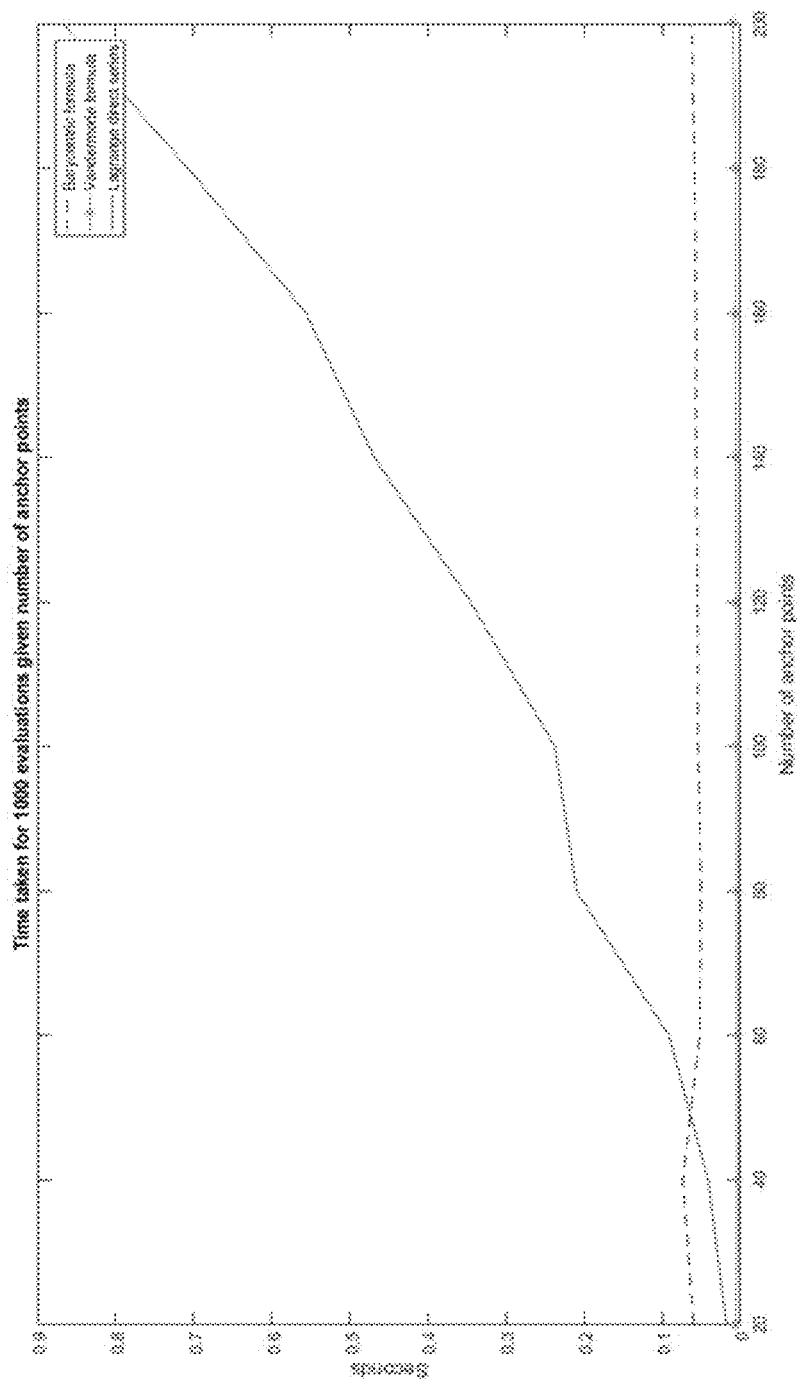
Figure 17B:
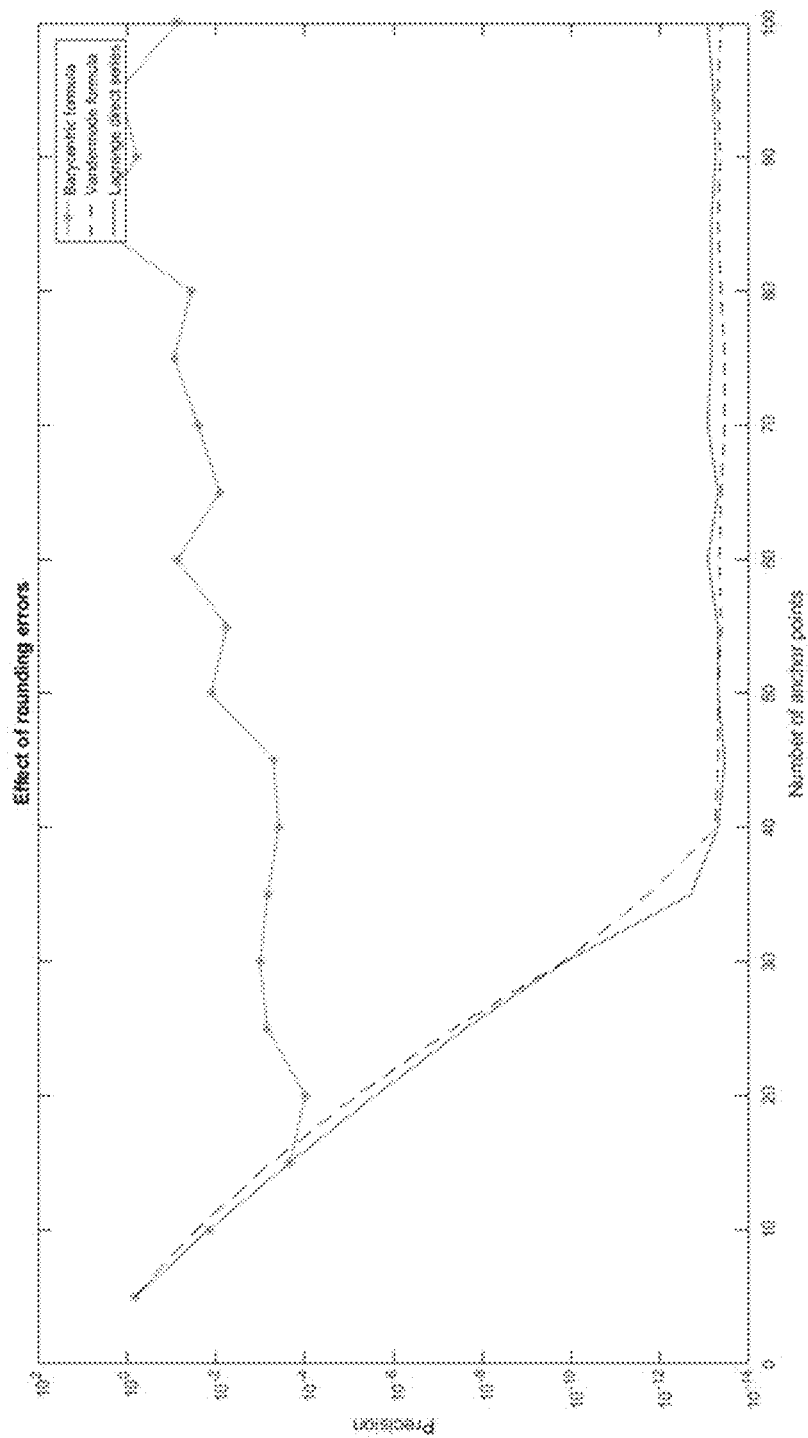
Figure 18:
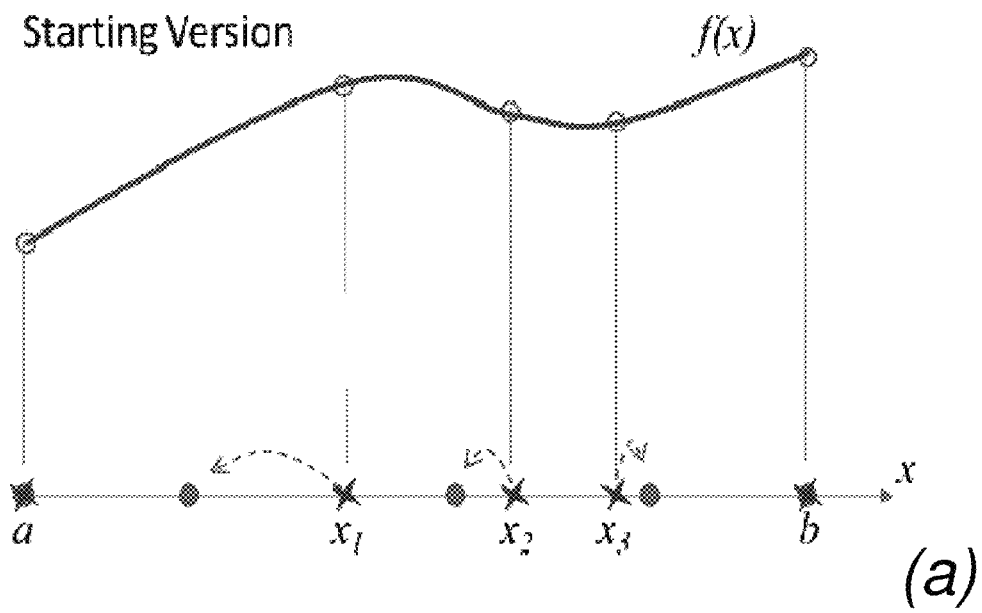
Figure 18:
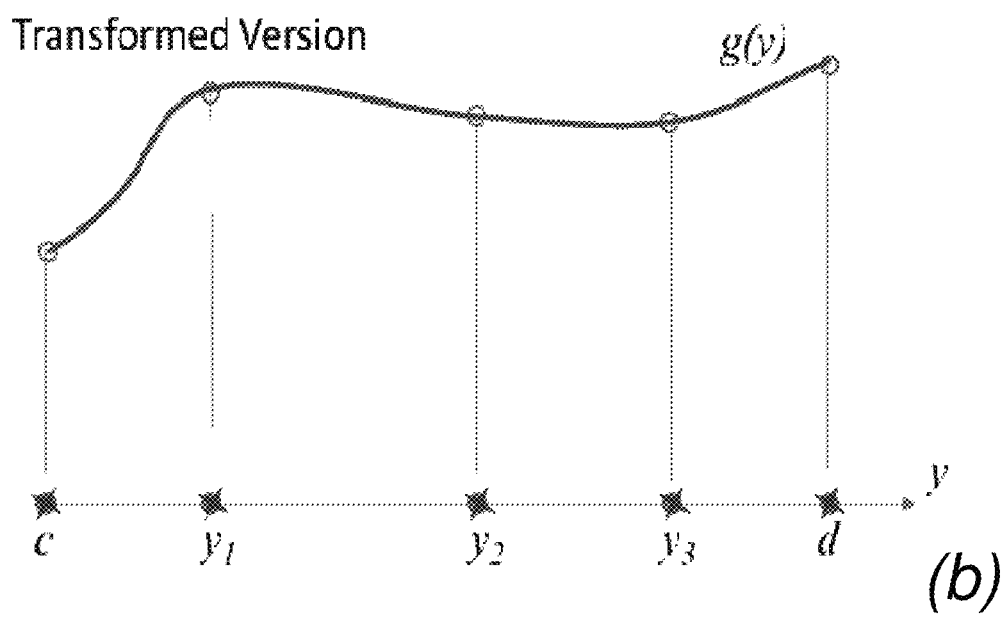
Figure 19:
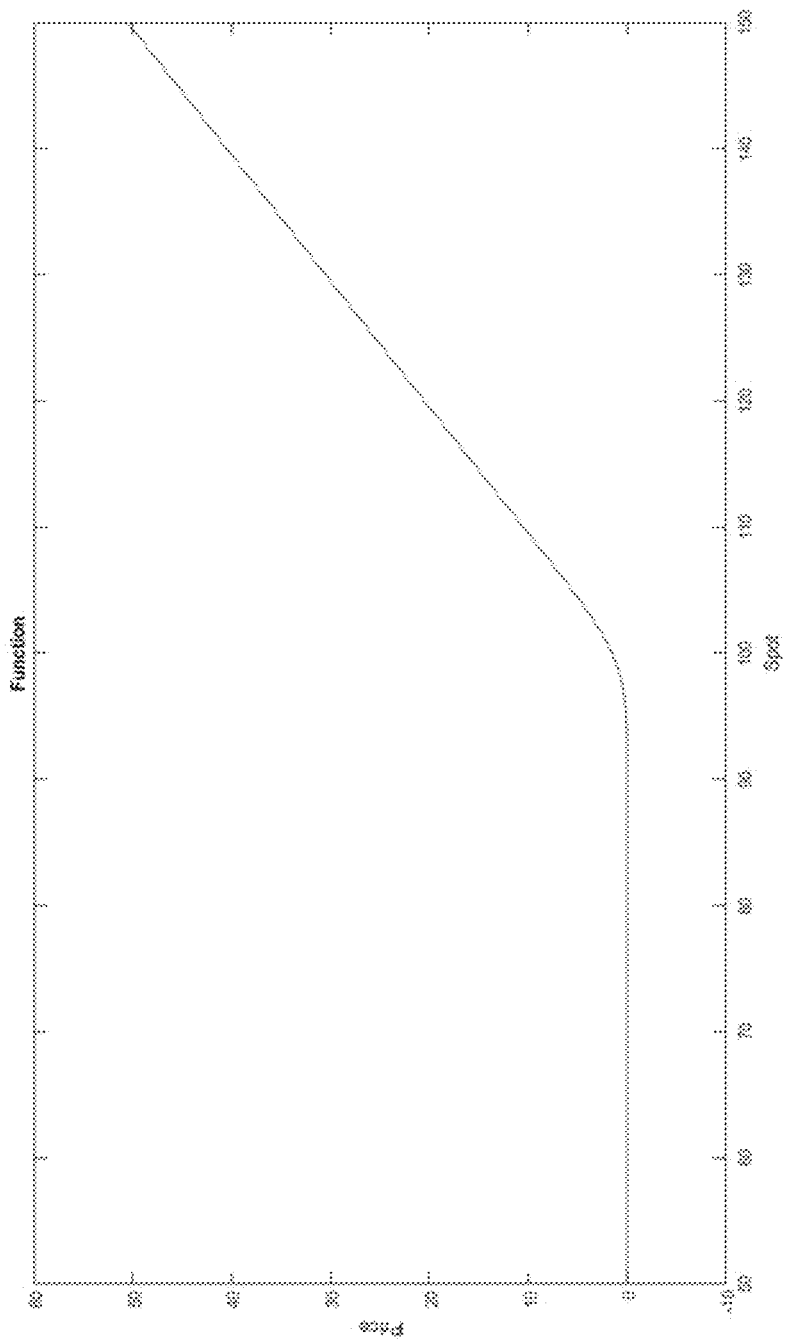

One or more embodiments of the invention will now be described, by way of example only, with reference to the remaining drawings, in which:

FIG. 9(a) is a schematic block diagram of a forecasting system according to an embodiment of the invention;

FIG. 9(b) is a schematic block diagram of an approximation module of the forecasting system of FIG. 9(a);

FIG. 10(a) is a flowchart showing a process carried out by the forecasting system of FIG. 9(a) according to an embodiment of the invention;

FIG. 10(b) is a flowchart showing a process of determining price scenarios in the process of FIG. 10(a);

FIG. 10(c) is a flowchart showing a process of generating approximating functions in the process of FIG. 10(b);

FIGS. 11 to 14 are graphical charts showing results obtained comparing the prior art forecasting system to the embodiment of FIG. 9(a);

FIG. 15 is a graphical chart illustrating an application of the embodiment in more than one dimension;

FIG. 16 is a graphical chart showing results obtained comparing computer evaluations of two different mathematical expressions of the same approximating function of FIG. 10(c);

FIG. 17(a) is a graphical chart showing results obtained comparing computer evaluations of three different mathematical expressions of the same approximating function of FIG. 10(c), and FIG. 17(b) shows the relative stability of these evaluations;

FIG. 18(a) shows a pricing function of the forecasting system of FIG. 9(a), the value of the pricing function being known at a plurality of given points, and also showing a plurality of anchor points generated by the approximation module of FIG. 9(b), and FIG. 18(b) shows a transformed version of the pricing function in which the transformed given points correspond to the anchor points; and, FIG. 19 shows an example of a pricing function of the forecasting system of FIG. 9(a) in an embodiment of the invention.

DETAILED DESCRIPTION

The present invention can be realised in many different ways and has been explained previously for many different applications. In the following description, a specific embodiment is described which is in the financial forecasting domain. The reason for illustrating the present invention using this embodiment is because the present invention can be described efficiently using some of the elements of a system for forecasting future price of an OTC contract which have already been described in the background section. Also, benchmarking results using the prior art system 100 and the forecasting system of the present embodiment can be carried out and these results have been provided towards the end of this specific description. However it is to be clearly appreciated that the present embodiment is exemplary only and the structure of the specific embodiment described herein can readily be adapted by the skilled person to work with any of the other areas of application mentioned in the introduction.

Figure 8A:
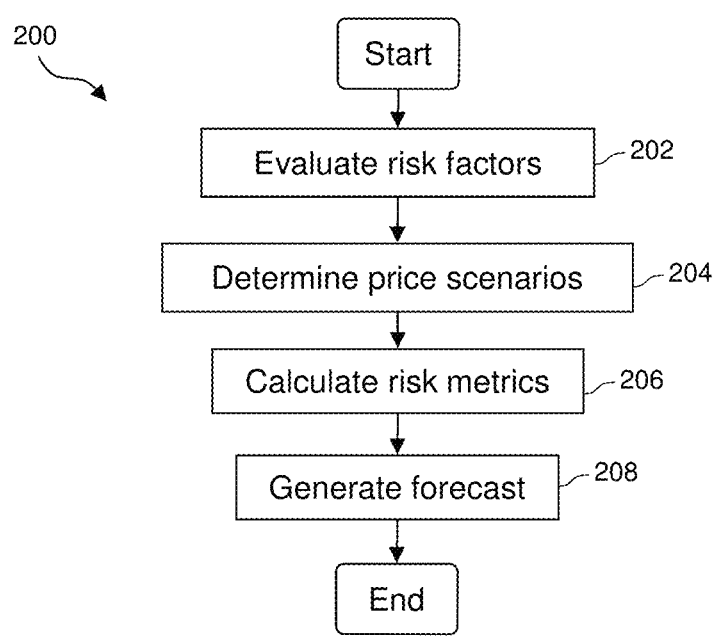
FIG. 8(a) is a flowchart showing a process carried out by the prior art system of FIG. 1(a)
Figure 8B:
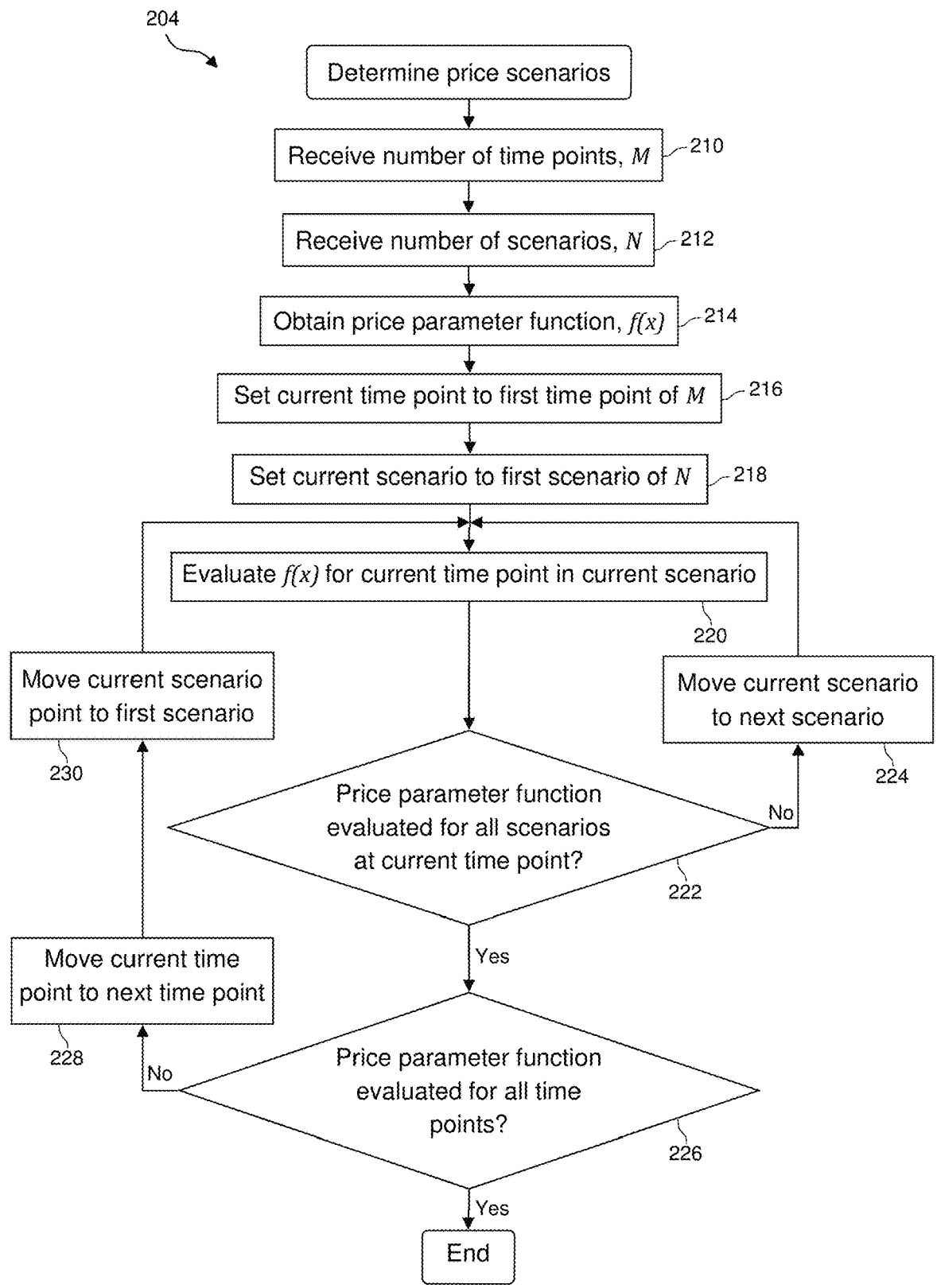
FIG. 8(b) is a flowchart showing a process of determining price scenarios in the process of FIG. 8(a)

As described above, the step of determining the price parameter scenarios in the process 204 described in relation to FIG. 8(b) comprises evaluating the price parameter function 156 potentially quintillions of times and is the most computationally expensive part of the overall process 200 of determining counterparty credit risk metrics.

Figure 6A:
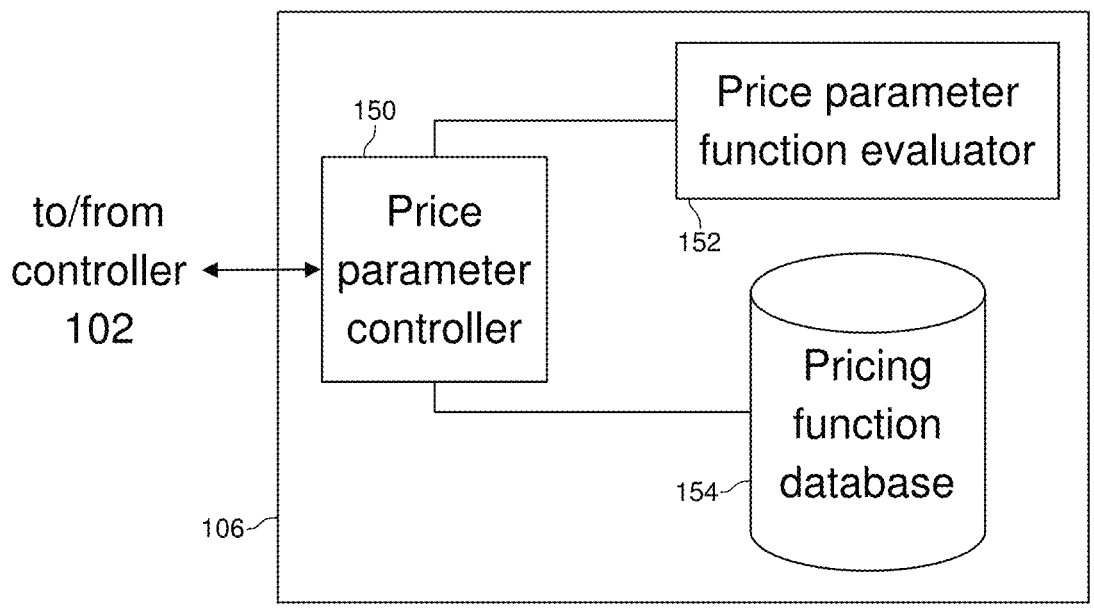
FIG. 6(a) is a schematic block diagram of a price parameter module of the system of FIG. 5(a)

FIG. 9(a) shows a forecasting system 300 according to an embodiment of the present invention. The forecasting system 300 has substantially the same structure as the prior art forecasting system 100 shown in FIG. 1(a). However, the prior art price parameter module 106 described with reference to FIG. 6(a) is replaced in the current embodiment with an approximation module 302 to significantly reduce the computational time required to generate the required results of the forecast. The modules and database shown with dashed lines in FIG. 9(a) are substantially unchanged from the prior art forecasting system 100.

The approximation module 302 is configured to evaluate an approximation to the pricing parameter functions 156, for example by substituting the price parameter function 156 by an expansion in orthogonal functions that yields a substantially equivalent result to that of the original pricing parameter function. The orthogonal functions are generally faster to evaluate than their corresponding original price parameter functions.

Figure 2:
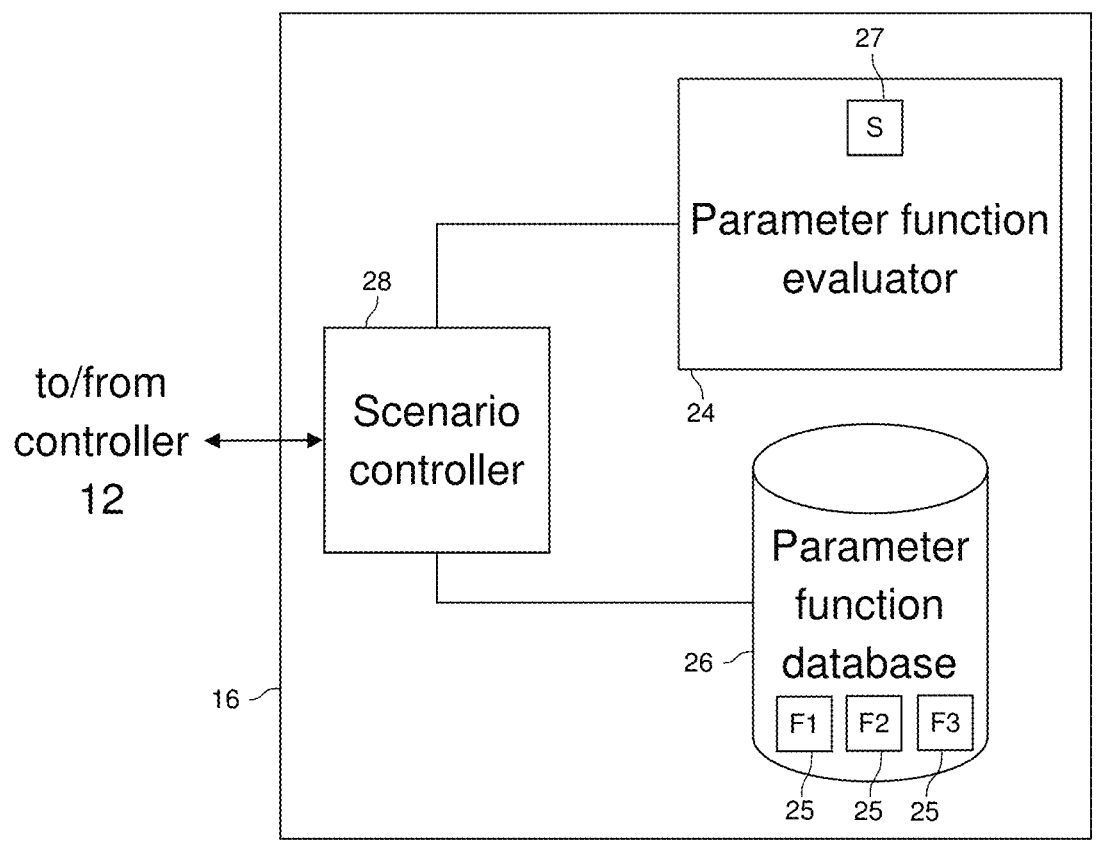
FIG. 2 is a schematic block diagram of a scenario module of the system of FIG. 1.
Figure 3:
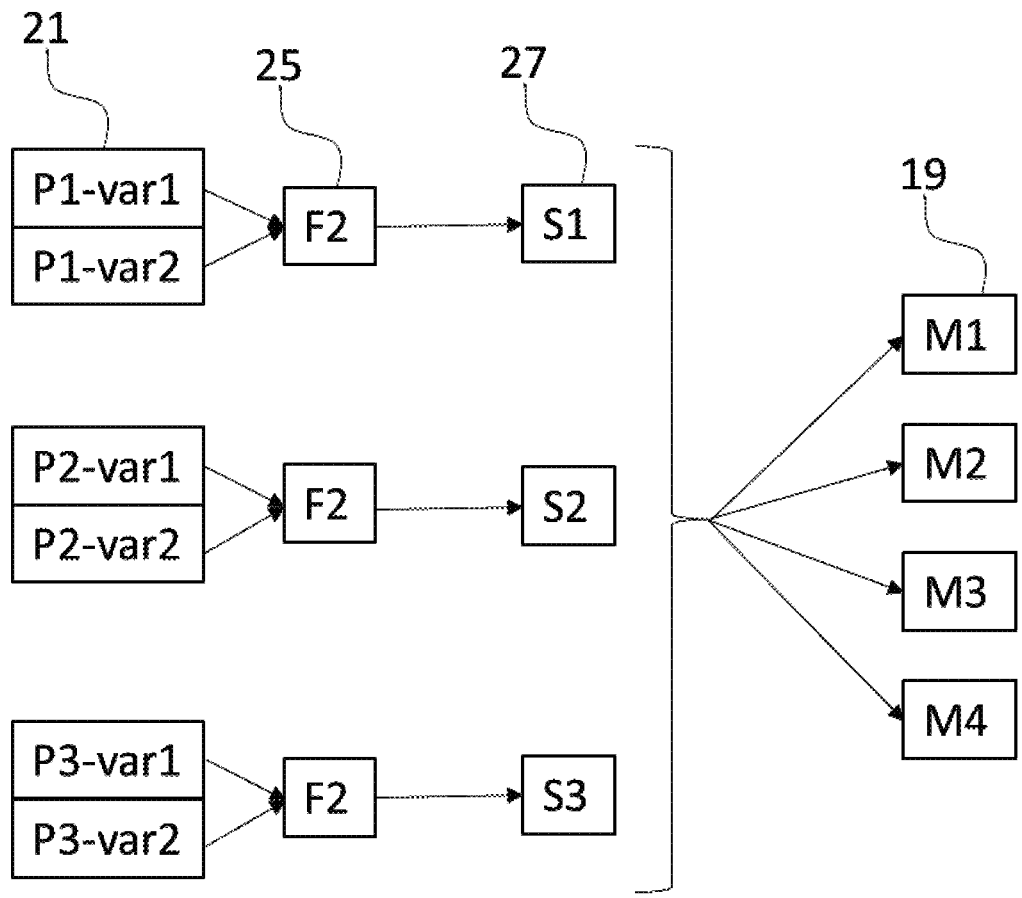
FIG. 3 is a schematic diagram of data flow in a prior art forecasting system.
Figure 4A:
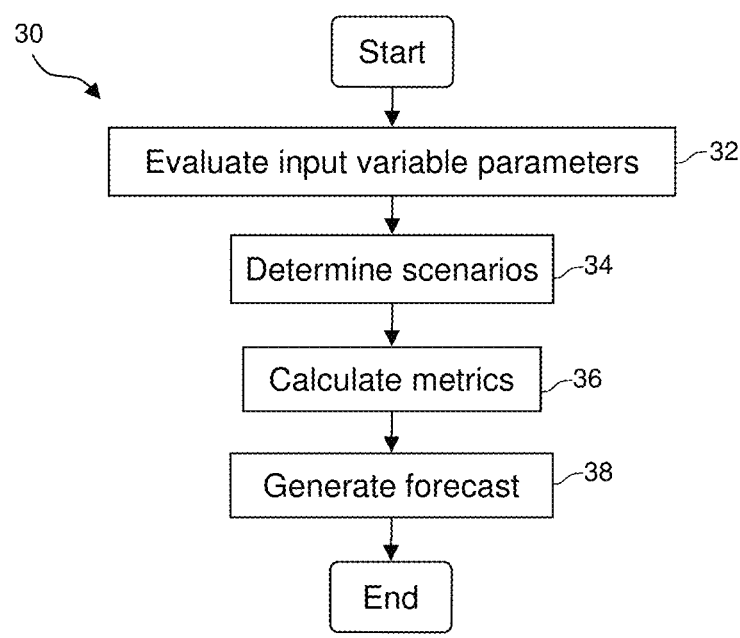
FIG. 4 is a flowchart showing a process carried out by the prior art system of FIG. 1.
Figure 4B:
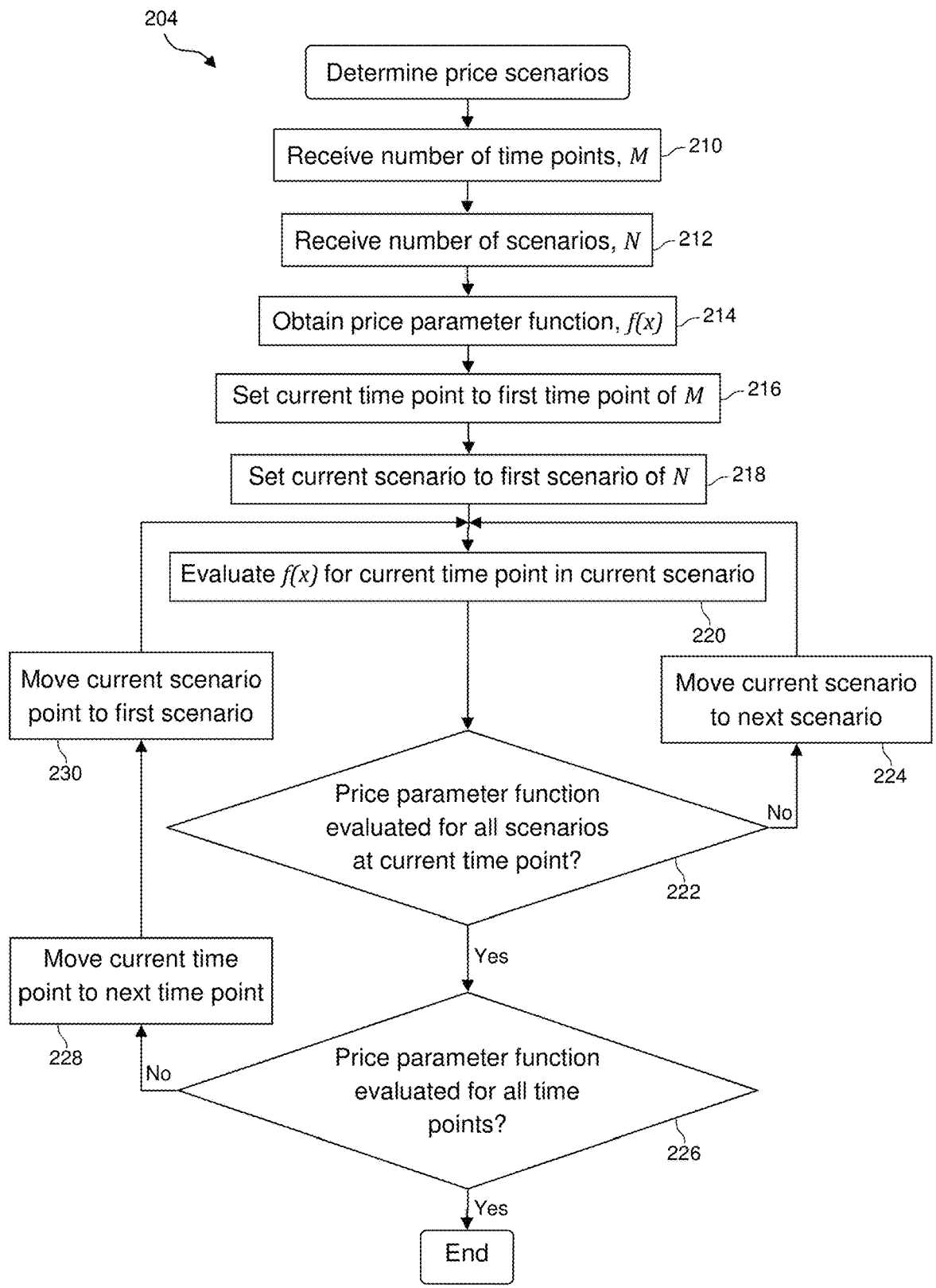

FIG. 9(b) shows the approximation module 302 in greater detail. The approximation module 302 comprises an approximation controller 310, a transformer 312, a pricing function database 154 (substantially identical to the prior art pricing function database shown in FIGS. 2(a) and 2(b)), an approximation generator 314, an expansion series database 320, an approximation evaluator 316 and an approximating pricing function database 318. The transformer 312, the approximation generator 314, the approximation evaluator 316, the pricing function database 154 and the approximating pricing functions database 318 are each connected to the approximation controller 310.

The approximation generator 314 is arranged to determine as approximation of the pricing functions 156. The expansion series database 320 is connected to the approximation generator 314. The expansion series database 320 comprises expansion series 321 associated with different families of orthogonal functions, including orthogonal polynomials and approximations to them. For example, the expansion series database 320 stores mathematical relationships for orthogonal functions including sines and cosines, Bessel functions, Gegenbauer polynomials, Hermite polynomials, Laguerre polynomials, Chebyshev polynomials, Jacobi polynomials, Spherical harmonics, Walsh functions, Legendre polynomials, Zernike polynomials, Wilson polynomials, Meixner-Pollaczek polynomials, continuous Hahn polynomials, continuous dual Hahn polynomials, the classical polynomials described by the Askey scheme, Askey-Wilson polynomials, Racah polynomials, dual Hahn polynomials, Meixner polynomials, Krawtchouk polynomials, piecewise constant interpolants, linear interpolants, polynomial interpolants, gaussian process based interpolants, spline interpolants, barycentric interpolants, Charlier polynomials, sieved ultraspherical polynomials, sieved Jacobi polynomials, sieved Pollaczek polynomials, Rational interpolants, Trigonometric interpolants, Hermite interpolants, Cubic interpolants, and Rogers-Szegö polynomials which are examples of families of mathematical relationships for functions that are suitable for approximating price parameter functions 156. The orthogonal functions stored in the expansion series database 320 are termed expansion series 321. The expansion series 321 may be orthogonal functions or approximations to orthogonal functions.

Accordingly, the transformer 312 is arranged to transform the price parameter functions 156 into the range where an approximating expansion series is substantially equivalent to the price parameter function, if required, prior to the approximation generator 314 determining an approximation of a pricing function 156.

The approximating pricing function database 318 stores the approximations 319 (i.e. approximating functions) of the pricing functions 156 determined by the approximation generator 314.

The approximation evaluator 316 is configured to determine the approximate value of the price parameter using the approximation 319 (also termed as 'approximation functions'). The function of the approximation evaluator 316 is roughly analogous to the pricing parameter function evaluator 152 of the prior art price parameter module 106.

FIG. 10(a) shows an overview of the process 348 carried out by the forecasting system 300. The process begins at Step 202, where all the risk factors are evaluated using stochastic modelling by the risk factor module 104 and stored in the stochastic model database 112 in substantially the same way as in the prior art forecasting system 100. Then, the approximation evaluator 316 evaluates at Step 354 the price scenarios using the approximating function(s) 319 from the approximating pricing function database 318. The specific embodiment is described below with one approximating function 319 generated for each time step (Step 354 is described in more detail with reference to FIG. 10(b)), however, it is to be appreciated that other embodiments are possible which may comprise more than one approximating function 319 generated for each time step.

The risk metrics are then evaluated at Step 206 by the risk metric module 108 taking input from the price scenarios generated by the approximation module 302 in substantially the same way as in the prior art forecasting system 100. The prediction or forecast can then be generated at Step 208 using the risk metrics determined at Step 206 in substantially the same way as in the prior art forecasting system 100.

FIG. 10(b) shows the process of determining at Step 354 the price scenarios using the approximating function 319 carried out by the approximation module 302 in greater detail.

The process 354 starts with the approximation evaluator 316 receiving at Step 210 the number of time points, M, required for the desired resolution of the scenarios in substantially the same way as in the prior art forecasting system 100. Then the approximation evaluator 316 receives at Step 212 the number of scenarios, N, desired in substantially the same way as in the prior art forecasting system 100. The approximation evaluator 316 then obtains at Step 214 the price parameter function 156, $f(x)$, for the OTC derivative from the pricing function database 154 desired in substantially the same way as in the prior art forecasting system 100.

The approximation evaluator 316 sets at Step 216 the current time point to the first time point of the total number of time points, M in substantially the same way as in the prior art forecasting system 100. Then, the approximation evaluator 316 sets at Step 218 the current scenario to the first scenario of the total number of scenarios, N in substantially the same way as in the prior art forecasting system 100. Following this, a function approximating the pricing function (i.e. the approximating function 319) for the current time point is generated at Step 380 by the approximation module 302 and stored in the approximating pricing function database 318 (this step is described in more detail with reference to FIG. 10(c)).

For the first time point of the first scenario, the approximating function 319 is then evaluated at Step 382 by the approximation evaluator 316. The approximation evaluator 316 then checks at Step 222 whether the price parameter function has been evaluated for all scenarios N received at Step 212 for the first time point in substantially the same way as in the prior art forecasting system 100. If not, the approximation evaluator 316 moves at Step 224 the current scenario to the next scenario and the process 354 loops back to Step 382 whereby the approximating function 319 is evaluated by the approximation evaluator 316 for the current time point.

This loop continues until the approximating function 319 has been evaluated for all the scenarios, N, received at Step 212 for the first time point in substantially the same way as in the prior art forecasting system 100. If, following the check at Step 222, the approximating function 319 has been evaluated for all the scenarios received at Step 212, the process 354 moves on to checking at Step 226 whether approximating function 319 has been evaluated for all time points received at Step 210 in substantially the same way as in the prior art forecasting system 100.

If not, the approximation evaluator 316 moves at Step 228 the current time point to the next time point and then the current scenario is moved at Step 230 to the first scenario in substantially the same way as in the prior art forecasting system 100. The process 354 then loops back to Step 380 whereby a function approximating the price parameter function is generated for the current time point. Then, at Step 382 the approximating function 319 is evaluated by the approximation evaluator 316 for the current time point of the current scenario. Once the approximating functions 319 have been evaluated for all the time points for all the scenarios, the process 354 is completed.

In other embodiments, all the approximating functions 319 for all the time points, M, are generated at the start of the process. Then the price parameters for all time points for the first scenario are determined before moving on to determining them for all the time points for the next scenario, until all the time points for all the scenarios have been determined. Also, in other embodiments, the loop in time steps and scenarios could be inverted as it was explained in the prior art system 100.

As can be seen, the main difference between the Step 354 carried out the forecasting system 300 over the Step 204 carried out by the prior art forecasting system 100 is that the approximation evaluator 316 evaluates a approximating function 319 which is computationally cheap to evaluate compared to the price parameter function evaluator 152 which evaluates price parameter functions 156 directly at a far higher computational cost.

FIG. 10(c) shows the process of generating at Step 380 the approximating function 319 carried out by the approximation module 302 in greater detail. The process starts with all but one of the factors in the pricing function being fixed at Step 360 by approximation generator 314 such that all but one degree of freedom (DOF) of the pricing function are locked.

The approximation controller 310 then determines at Step 362 whether the variable, x, in which the price parameter function range is defined over the same range as the approximation function. If not, then the transformer 312 carries out at Step 364 a linear transformation to the variable x of the price parameter function 156 from the pricing function database 154.

If no transformation is required following the check of Step 362 or once the pricing function has been transformed at Step 364, the approximation generator 314 determines at Step 366 a function that approximates the linearly transformed price parameter function using the expansion series 321 from the expansion series database 320. The approximation generator 314 stores at Step 368 the resulting approximation function 319 that approximates the linearly transformed price parameter function (i.e. orthogonal approximations 319) in the approximating pricing function database 318. As will be discussed in more detail below, the polynomial approximations 319 yield substantially the same result as the original price parameter functions 156, but in a significantly reduced time frame.

The steps in the process 348 carried out by the approximation module 302 are described in more detail in the specific example given below, where Chebyshev polynomials are employed by the approximation module 302. However, it is to be appreciated that any family of orthogonal functions or approximations to them can be used to approximate the price parameter functions 156, each with a slightly different degree of accuracy and amounts of computational cost. However, regardless of which function 319 is used, the reduction in computing overhead compared to the prior art forecasting system 100 can, in most cases, be orders of magnitude less.

In other embodiments, the time variable in the price parameter function can be considered as another variable x in a multidimensional generation of the approximation function 319 (explained in greater detail later), in which case it is not necessary to generate a new approximation function for each time step in 380.

The transformer 312 is configured to perform a linear transformation of the price parameter function from the pricing function database, $f(x)$ in which x varies between a minimum value, a, and a maximum value, b. Accordingly, the transformer 312 determines a linearly transformed or converted price parameter function g(y) in which y varies between a minimum value, c, and a maximum value, d. In mathematical notation, this would be:

$$x \in [a,b] \to y \in [c,d]$$

$$f(x) \to g(y)$$

In most cases, the transformer 312 carries out Step 364 on the price parameter function and on the variable x for which the price parameter function is evaluated at Step 380. The interval [a,b] is driven by the interval of the original price parameter function in the x domain in which accurate approximation is desired. Typically, this interval is defined by the minimum and the maximum values of the variable x.

The interval [c,d] is defined by the family of orthogonal functions chosen for the approximation. The interval is driven by the interval in the y domain where the approximation is accurate. For example, in the case of Chebyshev polynomials, the interval is [−1,1], and in the case of {sin(nx) and cos(mx)} orthogonal functions, the interval is [−π,π].

Once the transformer 312 has determined the linearly transformed pricing parameter function, the approximation generator 314 can then generate at Step 366 a function that approximates the linearly transformed pricing parameter function.

Using the expansion series 321 in the expansion series database 320 and a price parameter function 156 from the pricing function database 154, the approximation generator 314 is configured to determine an approximation function that approximates the pricing parameter function 156 that yields substantially the same result as the original pricing parameter function. For example, the linearly transformed pricing parameter function can be expressed as:

$$g(y) \approx q(y) = \sum_{j=0}^{N_E} \alpha_j A_j(y), \ y \in [c,d]$$

Where the collection $\{A_j(y)\}$ is the desired family of orthogonal functions (321), the collection $\{\alpha_j\}$ is calculated by the approximation generator 314, and is given by:

$$\alpha_j = (g(y) | A_j(y))$$

where (■|■) represents the scalar product that defines the orthogonality in the desired family of orthogonal functions. Typically, the $\{\alpha_j\}$ values are calculated via a numerical integration technique. For example, a Newton-Cotes methods, a trapezoidal method, a Simpson's method, a Boole's method, a Romberg integration method, a Gaussian quadrature methods, Chenshaw-Curtis methods, a Fejer method, a Gaus-Kronrod method, Fourier Transform methods, an Adaptive quadrature method, a Richardson extrapolation, a Monte Carlo and Quasi Monte Carlo method, a Markov chain Monte Carlo, a Metropolis Hastings algorithm, a Gibbs Sampling and Fast Fourier Transform methods.

In this case, the function q(y) is an accurate approximation of the linearly transformed pricing parameter function, g(y), when the upper bound of summation, $N_E$, is sufficiently large. In mathematical notation:

$f(x)=g(y)\approx q(y)$ for $N_E$ sufficiently large where y is the linear transform of x as per Step 364.

The approximation evaluator 316 can then determine the approximate value of the price parameter function at the desired time points and scenarios using the approximation function 319. The approximation evaluator 316 is used in place of the price parameter function evaluator 152 of the prior art forecasting system 100 when the price parameter scenarios are determined at Step 220 of the process carried out by the prior art forecasting system 100.

The approximation function 319 that approximates the pricing parameter function 156 is computationally simpler than the original pricing parameter function. Accordingly, the overall computational time required to carry out the step (Step 204) of determining the price parameter scenarios is reduced significantly. As discussed above, significant computational time needed in Step 204 in the prior art forecasting system 100 to achieve an accurate prediction, which can mean that the results of the prediction are no longer useful. As a consequence of determining the approximation function 319, the system 300 can significantly reduce the total computational time to generate the forecast, making the results useful.

The computational speed gained by the approximation evaluator 316 over the price parameter function evaluator 152 is particularly relevant for a number of families of orthogonal functions 319 in the approximating data function database 318, as for them either the gain in speed comes with no substantial loss of accuracy, or the system 300 can produce more accurate parameter values or metrics than 100 in the same time frame, or the system 300 can produce both an increase in speed and in accuracy over prior art.

An example of the process 348 carried out by the improved price parameter module 302 will now be described where the family of orthogonal functions can deliver an approximating function in the interval between a minimum value of −1 and a maximum value of 1 (i.e. $y \in [-1,1]$), for example a Chebyshev polynomial.

Firstly, the transformer 312 transforms at Step 364 the pricing parameter function $f(x)$ which is in the interval [a,b] to an equivalent function in the interval [−1,1]. This is achieved starting with the equation of a straight line:

$y = mx + c$

Where m is the gradient of the straight line and c represents the intercept of the line with the y-axis. The mapping between the interval [a,b] to the interval [−1,1] means the line is known to pass through two points: the minimum value of x, (i.e. $x_{min}=a$), at y=−1 and the maximum value of x, (i.e. $x_{max}=b$), at y=1. Accordingly, it can be shown that:

$$y = \frac{2}{b-a}x - \frac{b+a}{b-a}$$

Expressing this linear transformation function as y=L(x), x can be expressed as the inverse of the function L such that $x=L^{-1}(y)$. In this example:

$$x = L^{-1}(y) = \frac{(b-a)y + b + a}{2}$$

The transformer 312 can then determine the linearly transformed price parameter function such that:

$f(x)=f(L^{-1}(y))=g(y)$

Once the transformer 312 has determined the linearly transformed price parameter function, the approximation generator 314 can generate at Step 380 a function that approximates the linearly transformed price parameter function based on a predetermined expansion series 321 from the expansion series database 320.

For example, one series that could be used to approximate the linearly transformed price parameter function, g(y), is:

$$c(y) = \sum_{j=0}^{N_E} c_j T_j(y), \ y \in [-1, 1]$$

$$T_0(y) = 1$$

$$T_1(y) = y$$

$$T_{j+1}(y) = 2yT_j(y) - T_{j-1}(y), \ j \in \mathbb{N} \text{ and } j > 1$$

$$c_j = \frac{2}{\pi} \int_{-1}^{1} \frac{1}{\sqrt{1-y^2}} g(y) T_j(y) dy, \ j > 0$$

$$c_0 = \frac{1}{\pi} \int_{-1}^{1} \frac{1}{\sqrt{1-y^2}} g(y) dy, \ j = 0$$

Note that this series is the Chebyshev polynomials of the first kind; however, Chebyshev polynomials of the second kind may also be used, and they differ from the above only in that $T_1(y)=2y$. Note also that the zeros of the Chebyshev polynomials of the second kind correspond to the extrema of the Chebyshev polynomials of the first kind.

The coefficients $c_j$ can be computed by the approximation generator using a Fast Fourier Transform (FFT) function or any other numerical integration method known in the art. Typically, these methods have to call the original function (f(x)) only in a relatively low number of times, in the "anchor" points in the 'x' domain.

In this example, the function c(y) is an accurate approximation of the linearly transformed pricing parameter function, g(y), for $y \in [-1,1]$, when the upper bound of summation, $N_E$, is sufficiently large, and when g(y) is Lipschitz continuous in [−1,1]. It must be noted that the substantial majority of functions g(y) in practical applications have this Lipschitz property. In mathematical notation:

$f(x)=g(y)\approx c(y)$ for $N_E$ sufficiently large

Also, the approximation function (e.g., c(y)) can be calculated or approximated by an interpolation scheme, where the anchor points of it can be the zeros of each member of the chosen family of orthogonal functions, or a subset of the zeros. Alternatively, the anchor points may be the extrema of each member of the chosen family of polynomials, or a subset of the extrema, where the extrema are the points at which there is a local minimum or maximum of the orthogonal functions.

Generally, in many forecasting systems, using this series expansion 321 a value of $N_E$ (i.e. anchor points) between 1 and 200 is large enough to generate an approximation function, c(y), that outputs substantially the same result (typically the machine precision accuracy known in the art of $10^{-15}$) as the original price parameter function at the same time point and scenario. The accuracy is the difference between the output of the original price parameter function and the approximating function at the same set of input parameters. In some examples, the value of $N_E$ may be in the range of 5 to 50 to give a better balance between computational time and accuracy of the results; in many cases this range provides an accuracy between $10^{-4}$ and $10^{-6}$, which is often considered as substantially zero error in the art. In some other cases, a relatively low $N_E$ (e.g., 10) may give an accuracy of $10^{-2}$, which can be good enough to produce meaningful metrics and subsequent forecasts in a time frame that makes them useful. By $10^{-2}$, $10^{-4}$, $10^{-6}$, $10^{-15}$ or, generally, $10^{-Q}$ is meant that the lack of accuracy (e.g., the error) starts in the $2^{nd}$, $4^{th}$, $6^{th}$, $15^{th}$ or Q-th significant figure. The choice of $N_E$ is a balance between the desire to minimise the error in the approximation function 319 and reduce the time taken to determine the desired number of price scenarios. In other words, choosing a larger value for $N_E$ would minimise the error in the approximation function 319 but increase the time taken for the approximation generator 314 to generate an approximation function, and accordingly increase the overall time required to determine the scenarios. Conversely, choosing a smaller value for $N_E$ would reduce the time taken to for the approximation generator 314 to generate an approximation function, and accordingly reduce the overall time require to determine the scenarios, however, the error in the output of the approximation function would increase. Clearly, when the number of scenarios is much greater than the $N_E$ (for example, the number of scenarios, N, may be 20,000 whereas $N_{E\ may\ be}$ 20), the process 348 carried out by the forecasting system 300 is much faster than the prior art process 200.

The approximation function 319 is then evaluated at Step 354 as many times as required to generate the scenarios as desired.

In addition to $N_E$ and the number of scenarios ($N_S$), other factors that need to be accounted for to determine the improvement over prior art are the time it takes an approximation function, c(y), to run (t) and the time it takes the price parameter function to run (7). In general, the pricing step 204 of prior art systems will take approximately a total time $N_S \cdot T$ to run; the pricing step 354 in system 300 will take approximately $N_E \cdot T + N_S \cdot t$. System 300 will be beneficial over prior art when $N_S \cdot T$ is greater than $N_E \cdot T + N_S \cdot t$. That is the case in many forecasting systems. In other words, the value of $N_E$ (i.e. the number of anchor points) that reduces the processing time required compared to the prior art system is:

$$\frac{N_S \cdot T}{N_E \cdot T + N_S \cdot t} > 1$$

Taking an example where the desired number of scenarios for a time point is ten thousand, where an $N_E$ of 20 is enough to give a sufficiently good approximation, and where the time to compute the approximation function is lower than the price parameter function, in the prior art method, the price parameter function would be evaluated ten thousand times. However, using the approximation module 302, the approximation generator 314 would evaluate the linearly transformed price parameter function up to 20 times in order to determine an approximation function 319. The computationally faster approximation function 319 would be evaluated ten thousand times by the approximation evaluator 316 to determine the desired ten thousand price parameters for a given time step.

Choice of Orthogonal Function

The determination of which orthogonal function expansion series 321 (or approximations to them) from the expansion series database 320 is used to generate the approximation function 319 can be done in various ways. For example:

1. Practitioner Experience

The user of the forecasting system 300 may predetermine the desired orthogonal function series expansion 321 used by the approximation generator 314 and makes this choice based on prior knowledge and experience of using the forecasting system 300.

2. Trial and Error

The user of the forecasting system 300 may run tests with a plurality of the series expansions 321 and determine which orthogonal function yields the most accurate result in the desired computing time.

3. Run all and Analyse

The approximation generator 314 of the forecasting system 300 may be configured to run all the series expansions 321 available (or a subset of series expansions considered from historical experience and data known to be the most likely to produce the best results) to determine an estimate of the time required and the associated error to complete the generation of a forecast. The approximation generator 314 would then choose the optimum orthogonal function for the forecast.

Improvements Achieved Over Prior Art

Discussed below are the results of the following tests comparing the prior art forecasting system 100 with the forecasting system 300 embodying the present invention:

1. Impact on the forecasting computing time for two standard pricers in a counterparty risk Monte Carlo simulations
    a. Black-Scholes option pricer
    b. Longstaff-Schwartz option pricer
2. Impact in computing time as a function of pricing function computing time in a
    counterparty risk Monte Carlo simulation.
3. Reduction in noise in a counterparty risk Monte Carlo simulation.

1. Computing Time
    a. Black-Scholes Option Pricer

In an embodiment of the present invention, the p(y) series expansion was used to approximate the relatively simple Black-Scholes pricing parameter function in a forecasting Monte Carlo simulation, with 105 time points and 10,000 scenarios. In the computer where the embodiment of the invention was implemented, the time required to generate the 105×10000 price parameter scenarios using the price parameter module 106 of the prior art forecasting system 100 was 119.1 seconds, but the time was reduced to 25.6 seconds using the approximation module 302 of the forecasting system 300. This shows that the forecasting system 300 is 4.7 times faster than the prior art system to determine the pricing scenarios in Step 204.

It must be noted that the Black-Scholes pricing function used in the above test is already generally considered to be a super-fast function in the art. Accordingly, more common price parameter functions would result in a far greater speed-up multiple.

The overall time to carry out the process 200 and determine the counterparty credit risk metrics was 130.4 seconds using the prior art forecasting system 100 and 36.7 seconds using the forecasting system 300. This demonstrates a 3.6 times improvement in the overall time required to perform the same forecast.

Figure 11A:
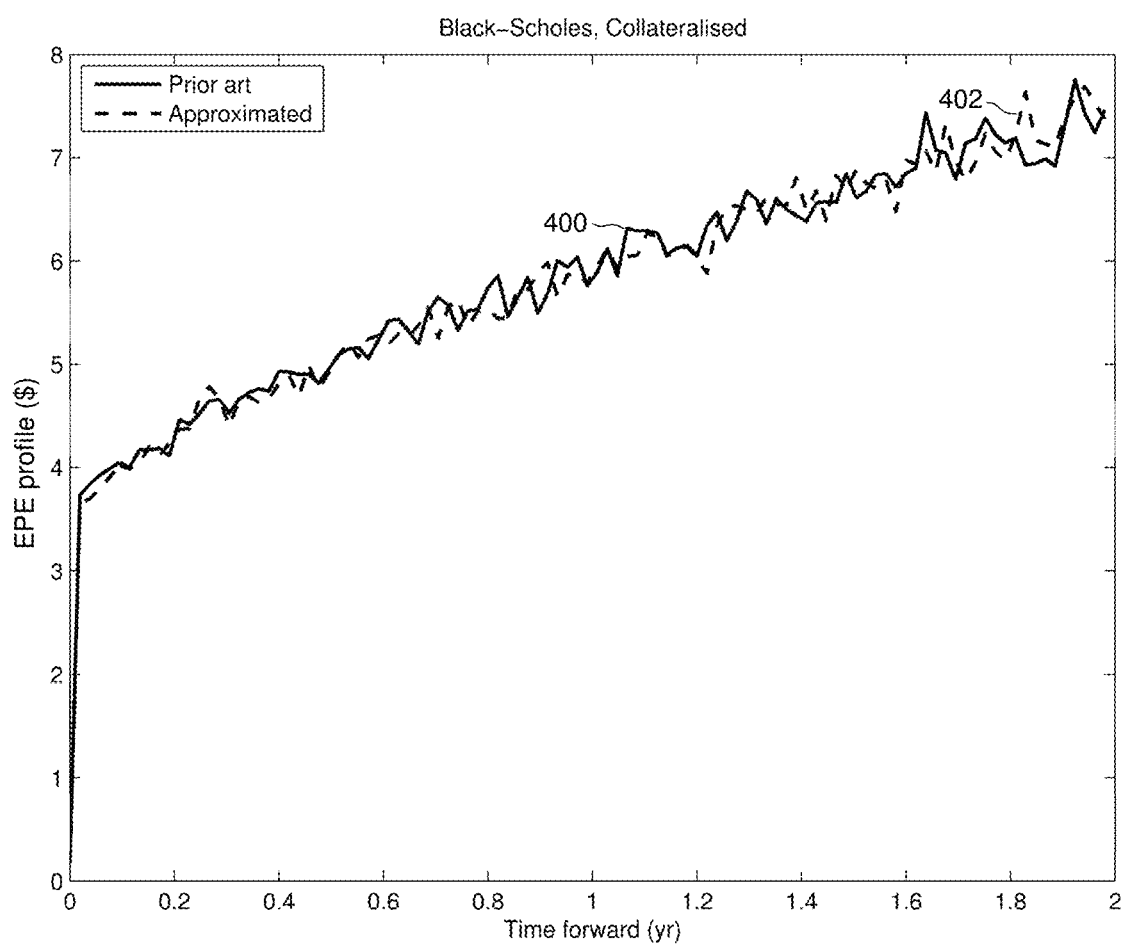
Figure 11B:
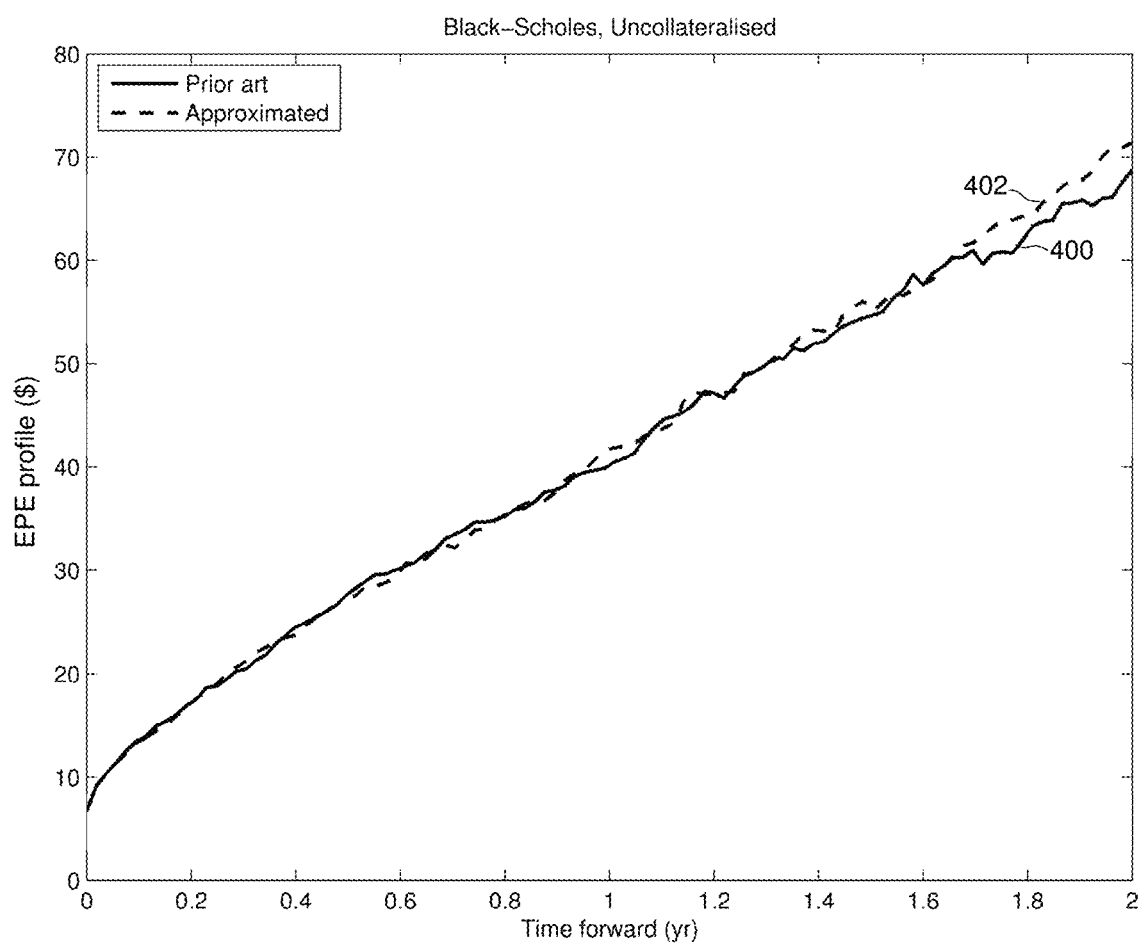

FIGS. 11(*a*) and 11(*b*) show the EPE (Expected Positive Exposure, one of the counterparty credit risk metrics) profiles 400, 402 (one of the counterparty credit risk metrics) of this OTC derivative contract, both from the direct calculation of the price parameter function (profile 400) and via the approximation function (profile 402). The figures show the EPE profiles for different collateralisation conditions. It can be seen that the results for both collateralised and uncollateralised cases are substantially the same (within the always existent numerical noise of the Monte Carlo simulation).

b. Longstaff-Schwartz Option Pricer

This is a typical pricer function used for American options. These options are fairly common, but pricing is too slow using the prior art forecasting system 100 for good counterparty risk calculations.

For example, in the computer in which these tests were carried out, the time to compute a single Black-Scholes option price was around 0.6 milliseconds, whilst that time for a Longstaff-Schwartz option in this test was around 130 milliseconds. Again, the test was performed with 105 time points and 10,000 scenarios. The time to compute an approximated single price using the present embodiment in these tests was around 0.15 milliseconds.

The time required to generate the price parameter scenarios using the prior art forecasting system 100 was 25,112 seconds but was reduced to 57.5 seconds using the forecasting system 300 comprising the approximation module 302. This shows that the forecasting system 300 of the present embodiment is 437 times faster than the prior art forecasting system 100 to determine the pricing scenarios in Step 204. The overall time to carry out the process 200 and determine the counterparty credit risk metrics was 25,134 seconds in the prior art forecasting system 100 and 69.3 seconds using the forecasting system 300 of the present embodiment. This demonstrates a 363 times improvement in the overall time required to perform the same calculation.

Figure 12A:
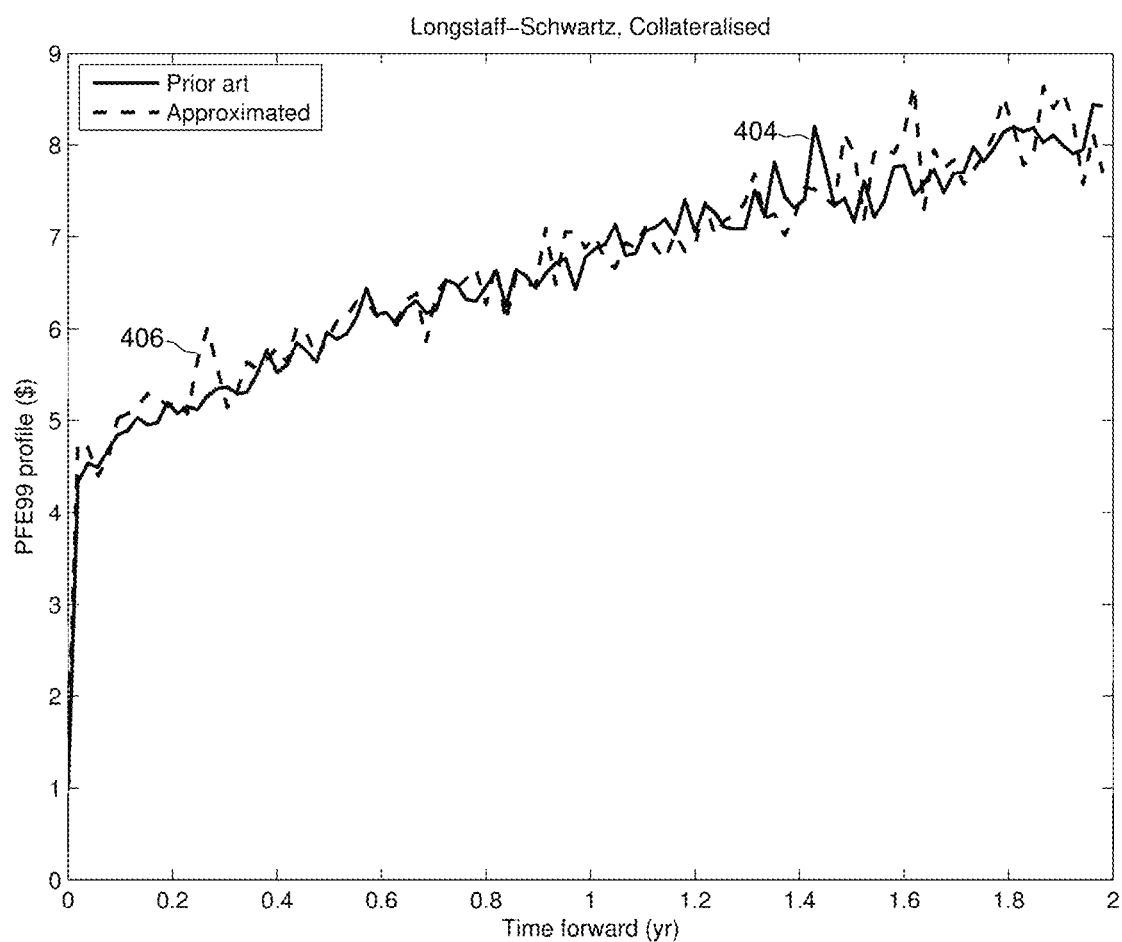
Figure 12B:
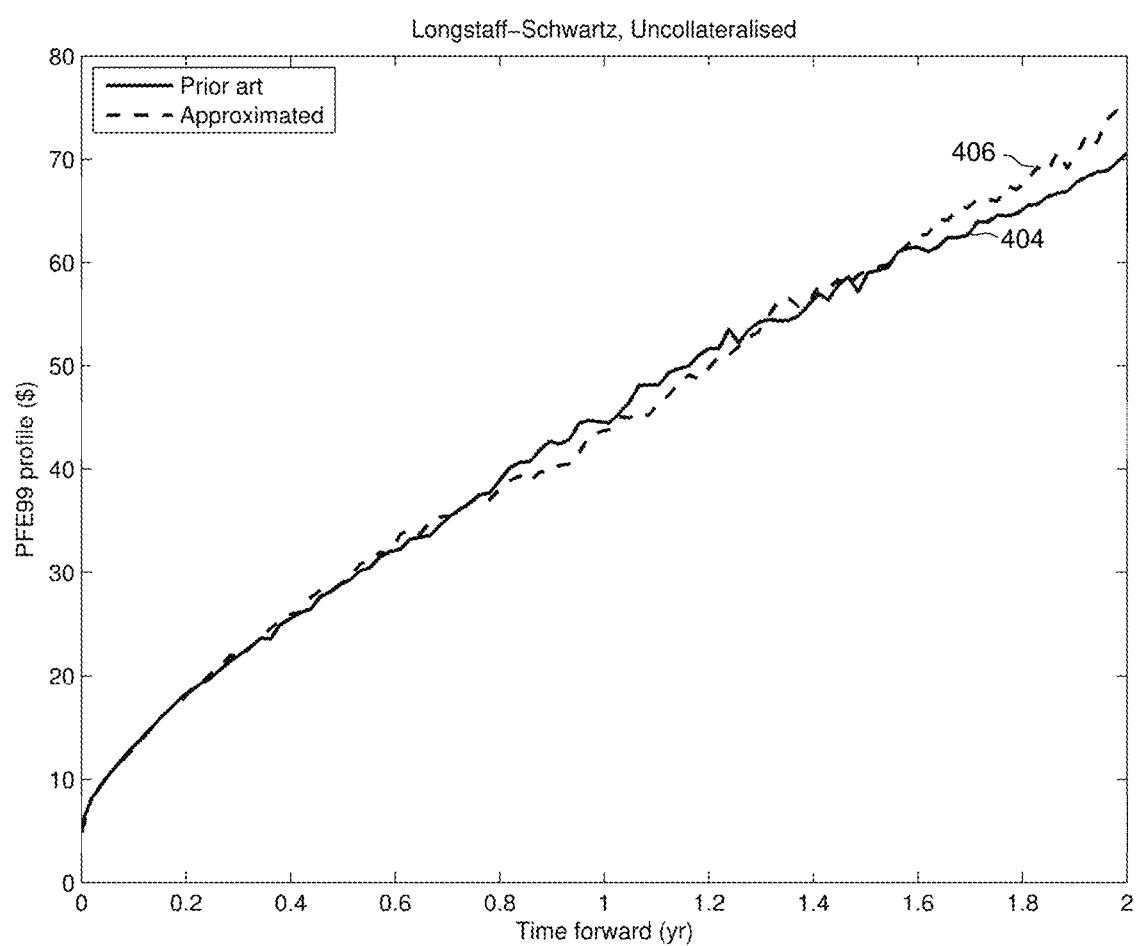

FIGS. 12(*a*) and 12(*b*) shows the PFE profiles (Potential Future Exposure, one of the counterparty credit risk metrics) of this OTC derivative contract, both from the direct calculation of the price parameter function (profile 404) and via the approximation function 319 (profile 406). Two plots are provided for the collateralised and uncollateralised cases. It can be seen that the results for both the collateralised and uncollateralised cases are substantially the same (within the always existent numerical noise of the Monte Carlo simulation).

2. Impact as a Function of Pricing Time

This performance test involves using a simple generic pricing function as possible comprising a single line of code with a simple subtraction. A time delay was introduced into the original function. The time delay was varied and the impact on the computing time required is shown in the table below, wherein the tests were carried out under the same conditions using the same computer hardware.

| Single price parameter function time (millisecond) | Price parameter scenarios determination time | | | Overall risk metric determination time | | |
| --- | --- | --- | --- | --- | --- | --- |
| | Prior art system (seconds) | Approximation system (seconds) | Improvement | Prior art system (seconds) | Approximation system (seconds) | Improvement |
| 0.03 | 6.5 | 28.6 | 0.2 | 20.4 | 42.2 | 0.5 |
| 1.03 | 198 | 28.5 | 6.9 | 211 | 41.8 | 5.0 |
| 5.03 | 952 | 28.5 | 33 | 966 | 41.8 | 23 |
| 10.03 | 1903 | 29.2 | 65 | 1917 | 42.7 | 45 |
| 50.03 | 9511 | 30.0 | 317 | 9525 | 43.5 | 219 |
| 100.03 | 19021 | 29.7 | 641 | 19035 | 43.1 | 442 |

Figure 13:
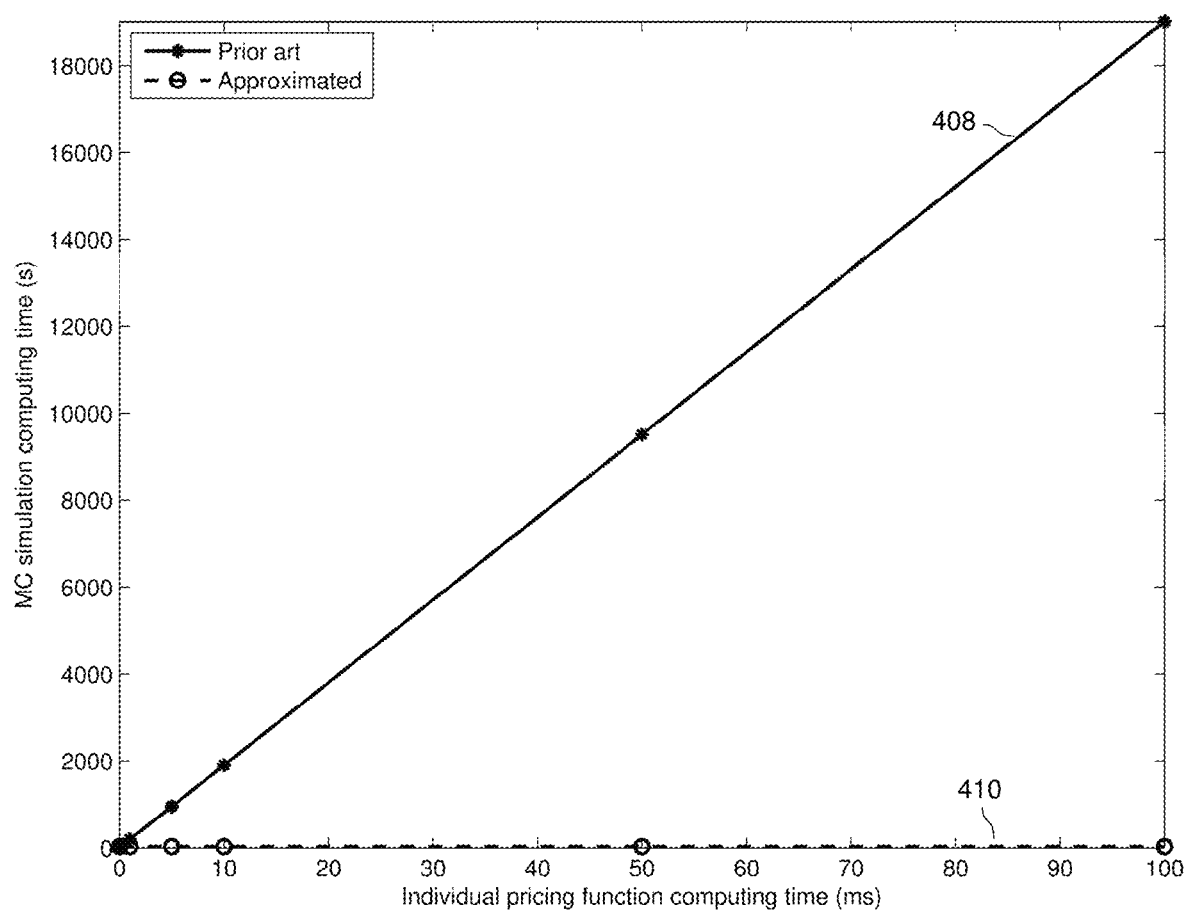
Figure 14A:
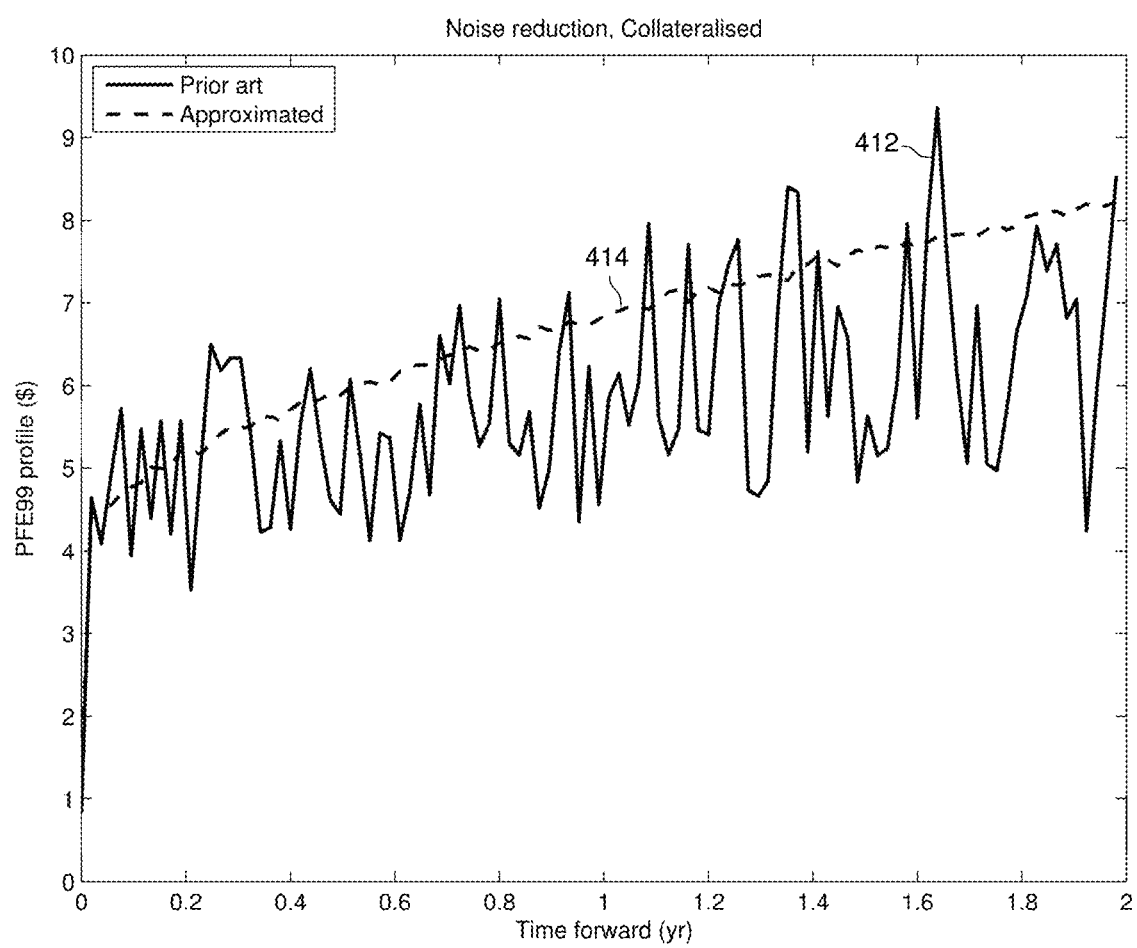
Figure 14B:
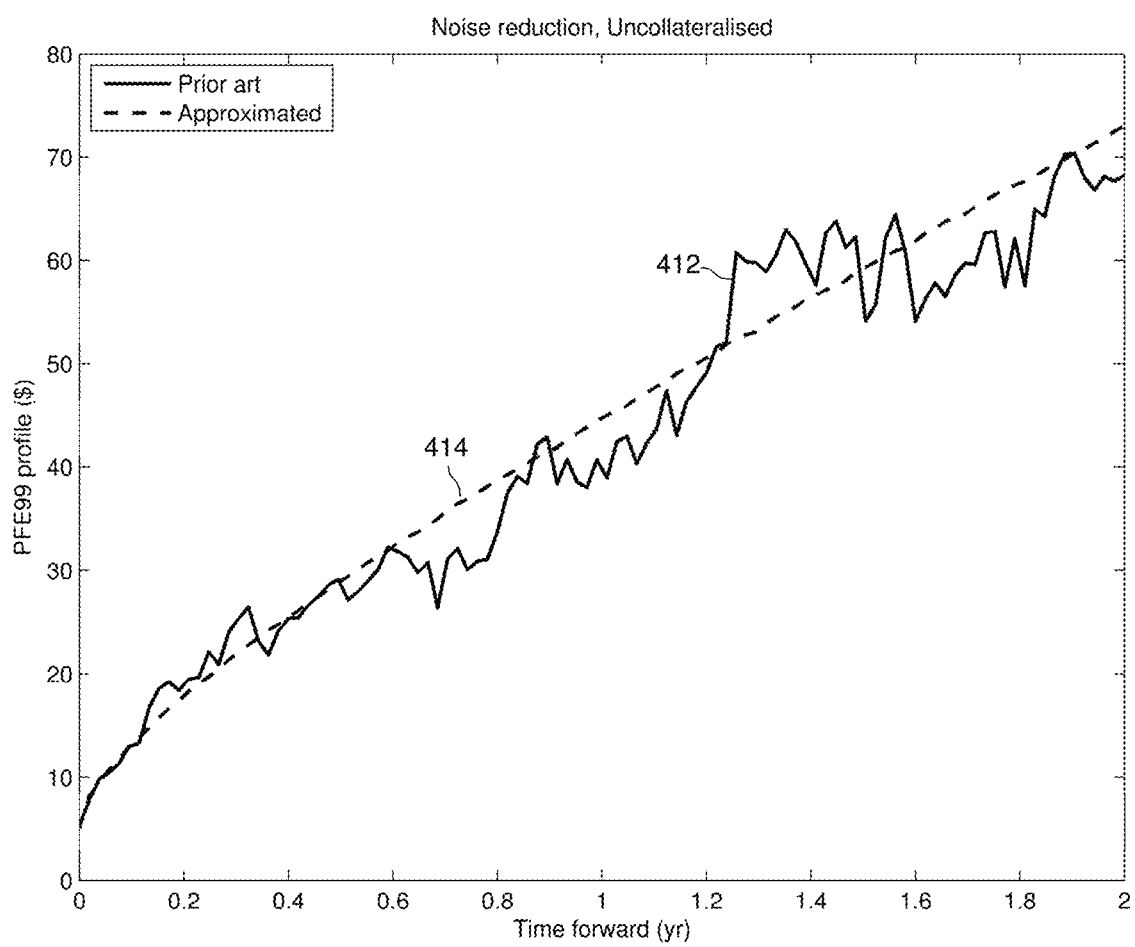

This data is graphically shown in FIG. 13 where the prior art direct pricing graph 408 shows a relationship of linearly increasing computing time with linearly increasing price parameter function computing time. Conversely, the pricing graph 410 generated by the present embodiment shows an almost constant simulation computing time with increasing individual price parameter function computing time. Financial institutions can easily have OTC derivatives that have a pricing time in the excess of 1 second; in some cases of several minutes, or even a few hours in some extreme cases. Extrapolating the results data in the table above, with a function pricing time of 1000 milliseconds, for example, the forecasting system 300 could improve the computing time required by 5000 times.

Also, in the prior art, it is useless to try to calculate forecasts from counterparty credit risk metrics for an OTC derivative that has a pricing function time of 1 minute. However, with embodiments of the present invention, the pricing calculation is achievable in a very reasonable time frame.

3. Reduction in Noise

This test uses the Longstaff-Schwartz pricing function where 100 scenarios are run using the prior art forecasting system 100 and 400,000 scenarios are run using the forecasting system 300. Both tests used 105 time steps.

The time taken for the process 204 with direct evaluation of the pricing parameter function (namely the prior art method) was 13,955 seconds. The time taken using the approximation approach for the forecasting system 300 was comparable at 12,248 seconds. However the noise in the PFE results 412 from this simulation with direct evaluation of the pricing parameter function of the prior art was noticeably higher than the noise 414 generated by the forecasting system 300 of the present embodiment, as it can be seen in FIGS. 14(*a*) and 14(*b*).

This test shows that, for the approximately the same computational time, a more accurate and less noisy risk metric can be determined using the forecasting system 300 over the prior art forecasting system 100.

Application in Multiple Dimensions

The embodiments described above have been discussed with reference to a one dimensional price parameter function, i.e. with a single variable, x. In other embodiments, the price parameter function 156 may be multidimensional i.e. multivariable, having n-dimensions, e.g. $f(x_1, x_2, x_3, \ldots, x_n)$. The forecasting system 300 can handle multidimensional price parameter functions in a number of ways. Four methods that may be carried out by the forecasting system 300 to perform multi-dimensional forecasting are discussed below by way of example only. It is to be understood that the forecasting system 300 may be configured to carry out multi-dimensional forecasting in one or more of several ways:

1. Locking the Price Parameter Function to One Degree of Freedom

In most embodiments, one of the variables out of $x_1$ to $x_n$ causes most of the change in the output of a price parameter function 156. In this case, the value of the other variables can be kept constant as changing the value of the variable generally has a negligible effect on the output of the price parameter function 156. Using the notation $x_i = \tilde{x}_i$ to represent a variable being held constant, taking the example where $x_1$ is the dominant variable in a price parameter function 156, it can be stated that:

$$f(x_1, x_2, x_3, \ldots, x_n) \approx f(x_1, \tilde{x}_2, \tilde{x}_2, \ldots, \tilde{x}_n)$$

Figure 6B:
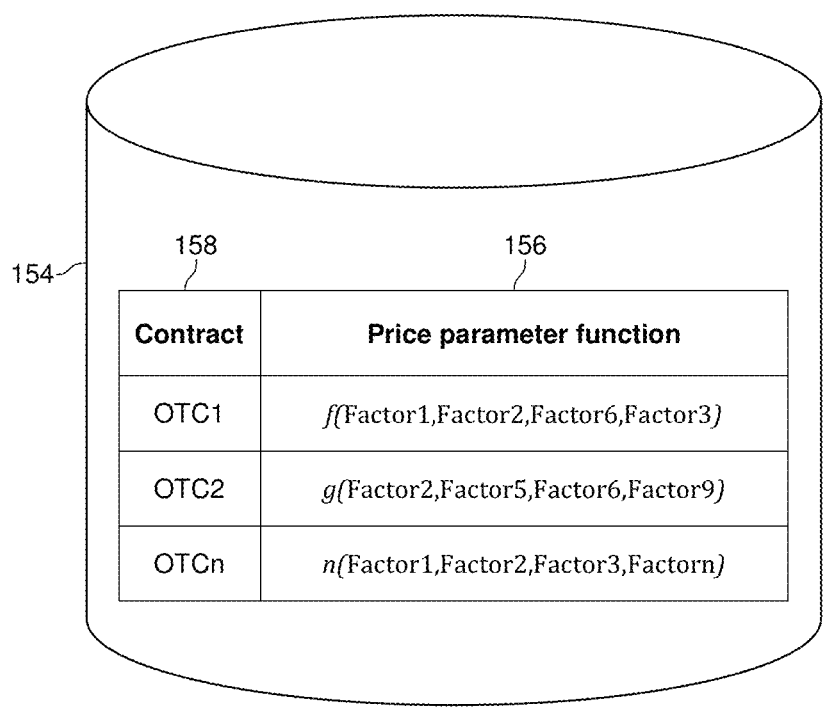
FIG. 6(b) is a schematic block diagram of a pricing function database of the price parameter module of FIG. 6(a)
Figure 7A:
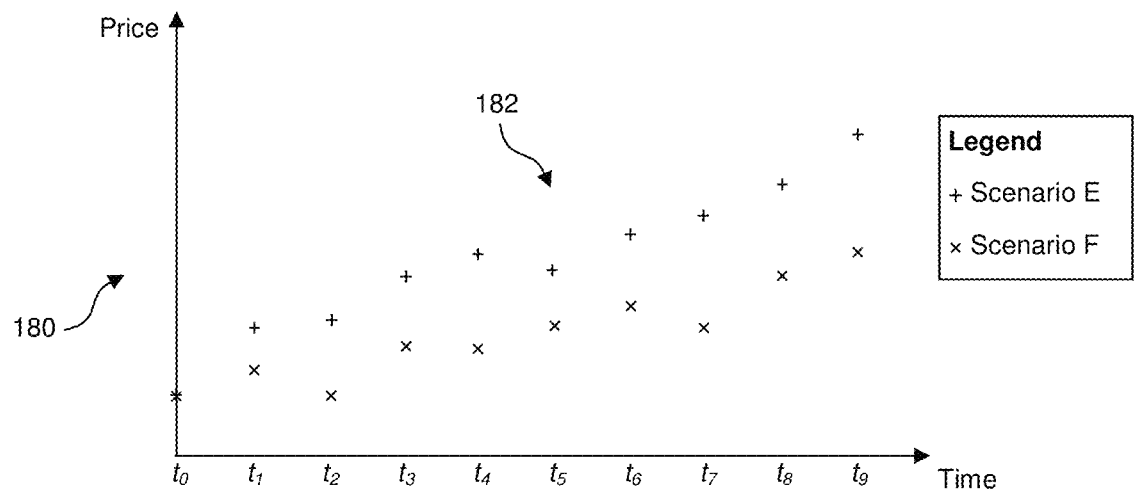
FIGS. 7(a) and 7(b) are example charts showing the variation of price parameters determined at specific time points.
Figure 7B:
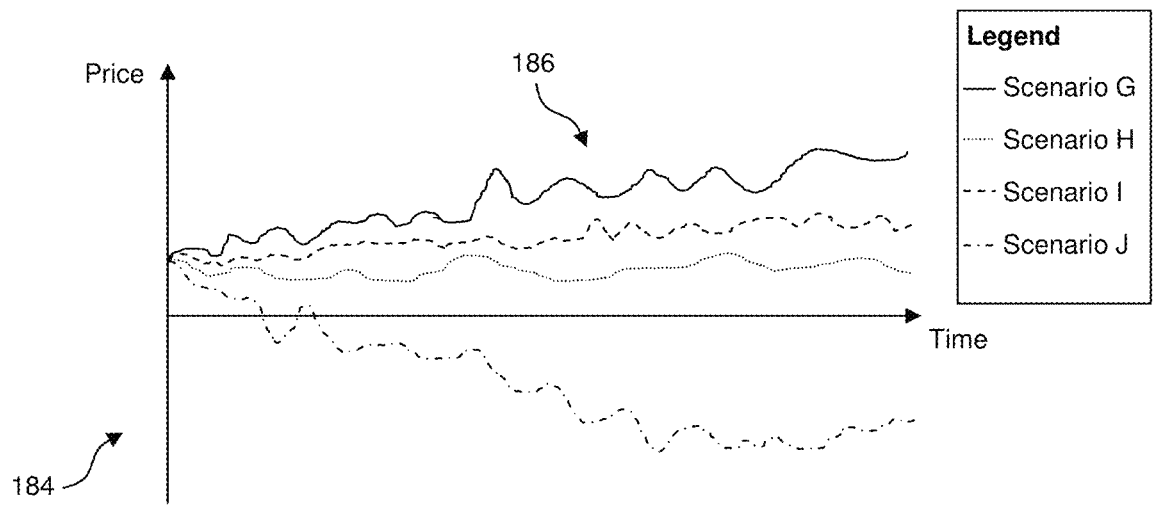

As can be seen, the number of degrees of freedom locked is one less than the number of dimensions. Using this approximation, the approximation generator 314 could determine the approximating function 319 in the one-dimensional approach of Step 354 as described above with reference to FIGS. 6(*a*) and 6(*b*).

For example, taking a price parameter function that outputs the temperature in a weather forecasting system, where the price parameter function comprises two variables, humidity ($x_1$) and height ($x_2$), when forecast the temperature over an area of land that is fairly flat, the height, $x_2$, is taken to be a constant value, $\tilde{x}_2$. The function $f(x_1, \tilde{x}_2)$ is then approximated by the forecasting system 300.

2. Coordinate Transformation

In other embodiments, the coordinate system is changed by the forecasting system 300 such that the method described above in locking the price parameter function to one degree of freedom can be applied. For example, taking a two variable case where $x_1 + x_2$ causes the predominant change in the output of the price parameter function, the following change of coordinates would be applied:

$$z_1 = x_1 + x_2$$

$$z_2 = x_1 - x_2$$

Such that, in the new frame of reference:

$$f(z_1, z_2) \approx f(z_1, z_2)$$

This price parameter function can then be approximated by the approximation generator 314 as described above.

Whilst this example presents a two-dimensional price parameter function, it is to be understood that this can be readily applied to a general n-dimensional price parameter function without loss of generality.

3. Approximating in More than One Dimension

In some embodiments, a plurality of the variables may have a strong influence on the output of the price parameter function 156 in a combination that makes it very computationally difficult to apply the coordinate transformation and/or locking the price parameter function to one degree of freedom in the methods described above.

Taking an example two-dimensional price parameter function, $f(x_1, x_2)$, where the variable $x_1$ causes the majority of the changes in the output of the price parameter function, but the variable $x_2$ also causes non-negligible changes in the output of $f(x_1, x_2)$. By taking two representative values of $x_2$, e.g. the minimum and maximum values $(\tilde{x}_2^{min}, \tilde{x}_2^{max})$ two one-dimensional approximation functions can be solved locking the price parameter function to one degree of freedom method explained above for $f_{min}(x_1, \tilde{x}_2^{min})$ and $f_{max}(x_1, \tilde{x}_2^{max})$. Then a linear interpolation in the variable $x_2$ is used to find out a good approximation for $f(x_1, x_2)$.

A fully general way of solving this problem would be by transforming the n-dimensional approximation problem to n one-dimensional approximation problems.

A two-dimensional embodiment is explained as an example below, however, it is to be understood that the same method can readily be extended to n-dimensions.

Starting from the one-dimensional example of a series expansion described above:

$$c(y) = \sum_{j=0}^{N_E} c_j T_j(y), \; y \in [-1, 1]$$

$$T_0(y) = 1$$

$$T_1(y) = y$$

$$T_{j+1}(y) = 2y T_j(y) - T_{j-1}(y), \; j \in \mathbb{N} \text{ and } j > 1$$

$$c_j = \frac{2}{\pi} \int_{-1}^{1} \frac{1}{\sqrt{1-y^2}} g(y) T_j(y) dy, \; j > 0$$

$$c_0 = \frac{1}{\pi} \int_{-1}^{1} \frac{1}{\sqrt{1-y^2}} g(y) dy, \; j = 0$$

Firstly, a linear transformation is performed on each variable, $x_1$ and $x_2$, by the transformer 312 of the approximation module 302, such that:

$$x_1 \in [a_1, b_1] \to y_1 \in [c_1, d_1]$$

$$x_2 \in [a_2, b_2] \to y_2 \in [c_2, d_2]$$

Where, in this example, $c_1 = c_2 = -1$, $d_1 = d_2 = 1$.

The two one-dimensional approximations are then built each with an approximation order of $N_{E,1}$ and $N_{E,2}$. FIG. 15 shows a graph 500 where $N_{E,1} = 3$ and $N_{E,2} = 4$, hence there are four primary anchor points 502 for variable $y_1$, and five primary anchor points 502 for variable $y_2$ for the calculation of the orthogonal approximation interpolant function. The anchor points are illustrated by the solid circles in FIG. 15.

The output of the price parameter function at the point X (labelled as 504 in FIG. 15), given by the values $(\tilde{x}_1, \tilde{x}_2) \to (\tilde{y}_{x,1}, \tilde{y}_{x,2})$, can then be determined in the following steps:

1. Generate the Information for the Approximated Evaluation

This is done by the approximation generator 314 which evaluates $f(x_1, x_2) = g(y_1, y_2)$ at each primary anchor point 502. This evaluation is done solving the full price parameter function, and in the example of FIG. 15, it is evaluated 20 times.

2. Compute $f(\tilde{x}_1, \tilde{x}_2) = g(\tilde{y}_{x,1}, \tilde{y}_{x,2})$ a) If $(\tilde{y}_1, \tilde{y}_2)$ refers to the primary anchor points 502, using them, an approximated value for $g(\tilde{y}_{x,1}, \tilde{y}_2)$ can be determined by the approximation evaluator 316 to determine a set of five secondary anchor points 506, illustrated by the hollow circles in FIG. 15. One degree of freedom of the price parameter function has been locked in order to determine the secondary anchor points 506. In other words, a one-dimensional approximation method has been determined for each secondary anchor point 506, along $y_1$, in which the value of $y_2$ is held constant at the value of each of the primary anchor points of $\tilde{y}_2$, respectively.

b) Using the secondary anchor points 506, an approximation function can be used by the approximation evaluator 316 to determine the output of $g(\tilde{y}_{x,1},\tilde{y}_{x,2})$ along $y_2$, in which the value of $y_1$ is held constant at the value of $\tilde{y}_{x,1}$.

Notably, the determination of the secondary anchor points 506 in the step of computing $f(\tilde{x}_1,\tilde{x}_2)=g(\tilde{y}_{x,1},\tilde{y}_{x,2})$ is fast as it uses an approximation function 319, the advantages of which have been described above.

4. Combination of Approximating in More than One Dimension and Locking Degrees of Freedom In other embodiments, the price parameter function 156 comprises a plurality of variables in which some variables have hardly any impact on the output of the price parameter function, but other variables do. In this case, a combination of both locking one or more degrees of freedom in the price parameter function and approximating in more than one dimension as described above can be used. Firstly, the non-negligible variables are not locked:

$$f(x_1,x_2,x_3,\ldots,x_n) \approx f(x_1,x_2,\ldots,x_s,\tilde{x}_{s+1},\ldots,\tilde{x}_n)$$

Taking the number of non-negligible variables to be s, the number of degrees of freedom locked is s less than the number of dimensions. Then, the multi-dimensional technique can be applied to those variables that are not locked.

Improvements Achieved Over Prior Art of Approximating in More than One Dimension Taking an example where there are 105 time steps and 10,000 scenarios and taking the computation time to be 130 milliseconds (as in the case of the Longstaff-Schwartz example discussed above) for each evaluation of a two-dimensional price parameter function, the time taken to evaluate the price parameter function 156 for all time points and scenarios is:

$$105 \times 10{,}000 \times 130 \text{ milliseconds} \approx 37.9 \text{ hours}$$

However, using the multi-dimensional technique in the two-dimensional price parameter function of an embodiment of the present invention, and assuming that $N_{E,1}=N_{E,2}=10$ (leading to 121 anchor points 502), and assuming the estimated computational time of each one-dimensional approximation function of 0.15 milliseconds (like in the Longstaff-Schwartz example), the estimated time to compute the same number of time points and scenarios is given by the time taken to evaluate price parameter function for anchor points added to the time taken to evaluate the secondary anchor points 506 for all time points and scenarios is:

$$11 \times 11 \times 130 \text{ milliseconds} + 105 \times 10{,}000 \times (11+1) \times 0.15 \text{ milliseconds} = 0.5 \text{ hours}$$

This yields an improvement of around 76 times less computing time.

Many modifications may be made to the above examples without departing from the spirit and scope of the present invention as defined in the accompanying claims.

For example, the price parameter function could be a function that can be used to evaluate the volume of crude oil extractable from an oil reservoir at a particular time in the oil and gas industry, or it can be used to determine the temperature in a location at a particular time in the field of weather modelling.

Figure 1:
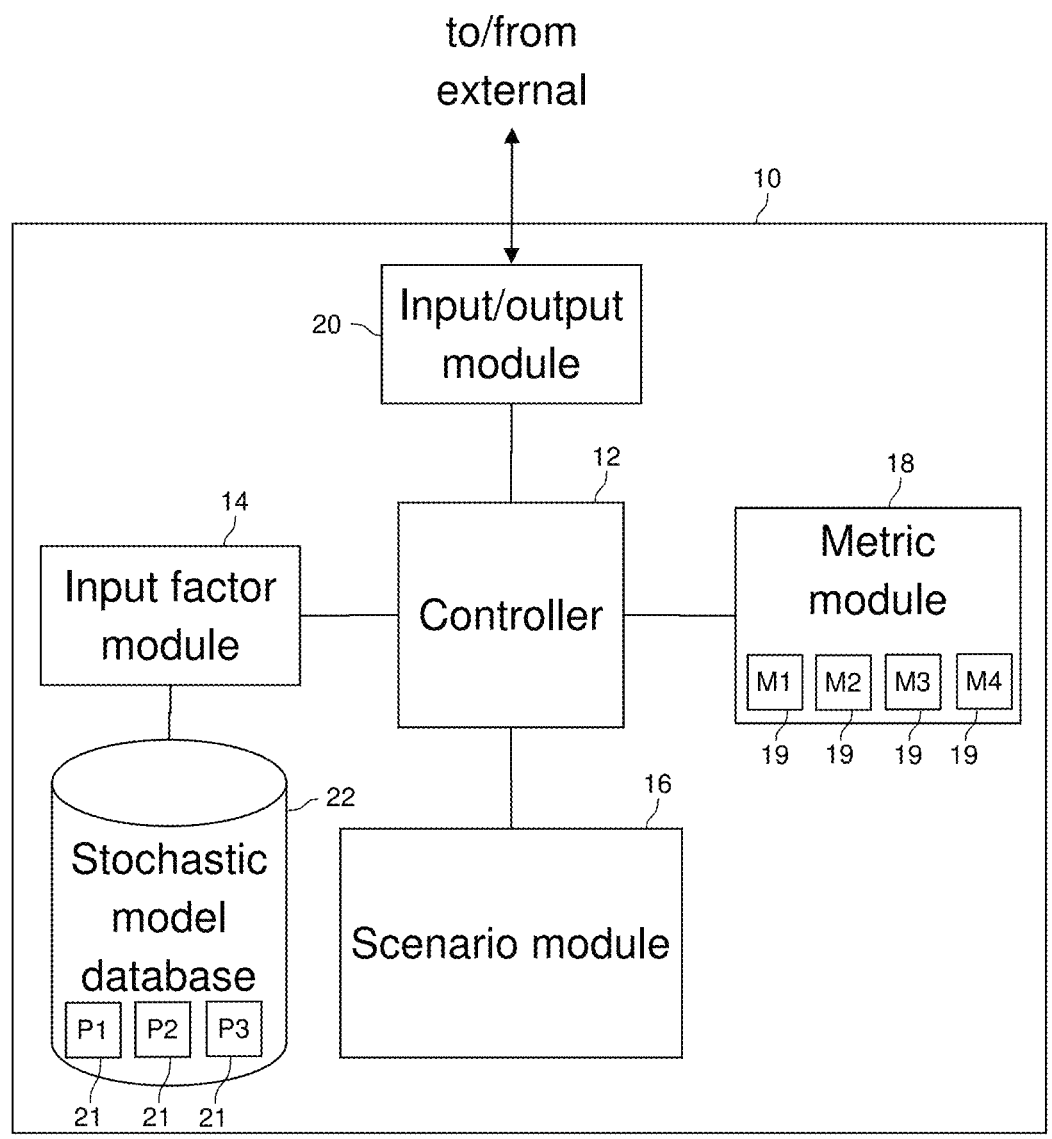

The functionality and processes described above may be implemented via a system architecture such as that shown in FIGS. 1(*a*), 1(*b*), 2(*a*), 2(*b*), 4(*a*), 4(*b*), 5(*a*), 5(*b*), 6(*a*), 6(*b*) and 6(*c*). At its most general level, the forecasting system 300 according to the present invention comprises the risk factor module 104, the risk metric module 108, the approximation module 302 and the controller 102 which are each implemented by a processor or can be software instances implemented on any parallel processing processor platform. Example processing architecture that may be suitable for the present invention include the Intel Xeon, Core i7 and Core i5 x86-64 microprocessors utilising the Haswell, Sandy Bridge or Ivy Bridge microarchitectures, the AMD Opteron x86-64 microprocessors utilising the Bulldozer, Piledriver or Jaguar microarchitectures, or 64-bit ARM System-on-Chip architecture.

The forecasting system 300 can equally be used in different forecasting applications, other that OTC derivatives in financial modelling. For example, the forecasting system 300 could be adapted for use in molecular biology, oil and gas, structural engineering, and weather forecasting by including appropriate parameter functions into the pricing function database 154. Additionally, appropriate stochastic input variables would be determined by the risk factor module 104 and stored in the stochastic model database 112.

More specifically, returning to the example of oil and gas described in the background section, the set of one or more input parameters may include: viscosity of the crude oil, remaining supplies in the oil reservoir, oil pumping capacity, well temperature, availability and/or effectiveness of drilling fluid which each vary stochastically over time. In this example, the parameter database comprises a parameter function to which outputs the extractable volume of crude oil in an oil well, the parameter function using the input parameters. The processes 348 and 354 carried out by the forecasting system 300 are substantially the same compared to using a price parameter function. However, at Step 380, an approximation function is generated for the parameter function for outputting the extractable volume of crude oil in an oil well. The approximation function is less computationally expensive to evaluate relative to the original parameter function. The approximation function is evaluated for each time point in each scenario. The scenarios determined at Step 354 using the approximation function can then be used to determine metrics which may include required oil refinement and purification capacity and staffing levels required in downstream processes. Preferably, the approximation function used is based on fitting a set of orthogonal functions or an approximation to a set of orthogonal functions to the parameters.

Fitting, (i.e. curve fitting) used to generate the approximation function is the process of constructing a curve, or mathematical function, that has the best fit to a series of data points, possibly subject to constraints.

Accuracy of the approximation function or of a metric is the degree to which the result of a measurement, calculation, or specification conforms to the correct value or a standard.

Similarly, for weather forecasting, the set of one or more input variables may include air pressure, air density, solar energy and humidity each from hundreds or more of different locations. The parameter database comprises a parameter function to output the temperature at a geographic location as a function of one or more of the input variables. The processes 348 and 354 carried out by the forecasting system 300 are substantially the same compared to using a price parameter function. However, at Step 380, an approximation function is generated for the parameter function for outputting the temperature at a geographic location. The approximation function is less computationally expensive to evaluate relative to the original parameter function. The approximation function is evaluated for each time point in each scenario. The scenarios determined at Step 354 using the approximation function can then be used to determine metrics which may include sea level, pollen count, UV index and wind speed/direction. Preferably, the approximation function used is based on fitting a set of orthogonal functions or an approximation to a set of orthogonal functions to the parameters.

User devices may further be in communication with the forecasting system 300, e.g. via a communications network such as the Internet, and interface with the input/output module via a web-enabled browser or application running on a portable multifunctional device (e.g., smart phone, personal digital assistant (PDA), iPad™, notebook, subnotebook, tablet PC, electronic reader, etc.) or a non-portable device (e.g., desktop computer, such as PC or Mac, internet capable electronic displays/TVs, etc.).

Figure 5A:
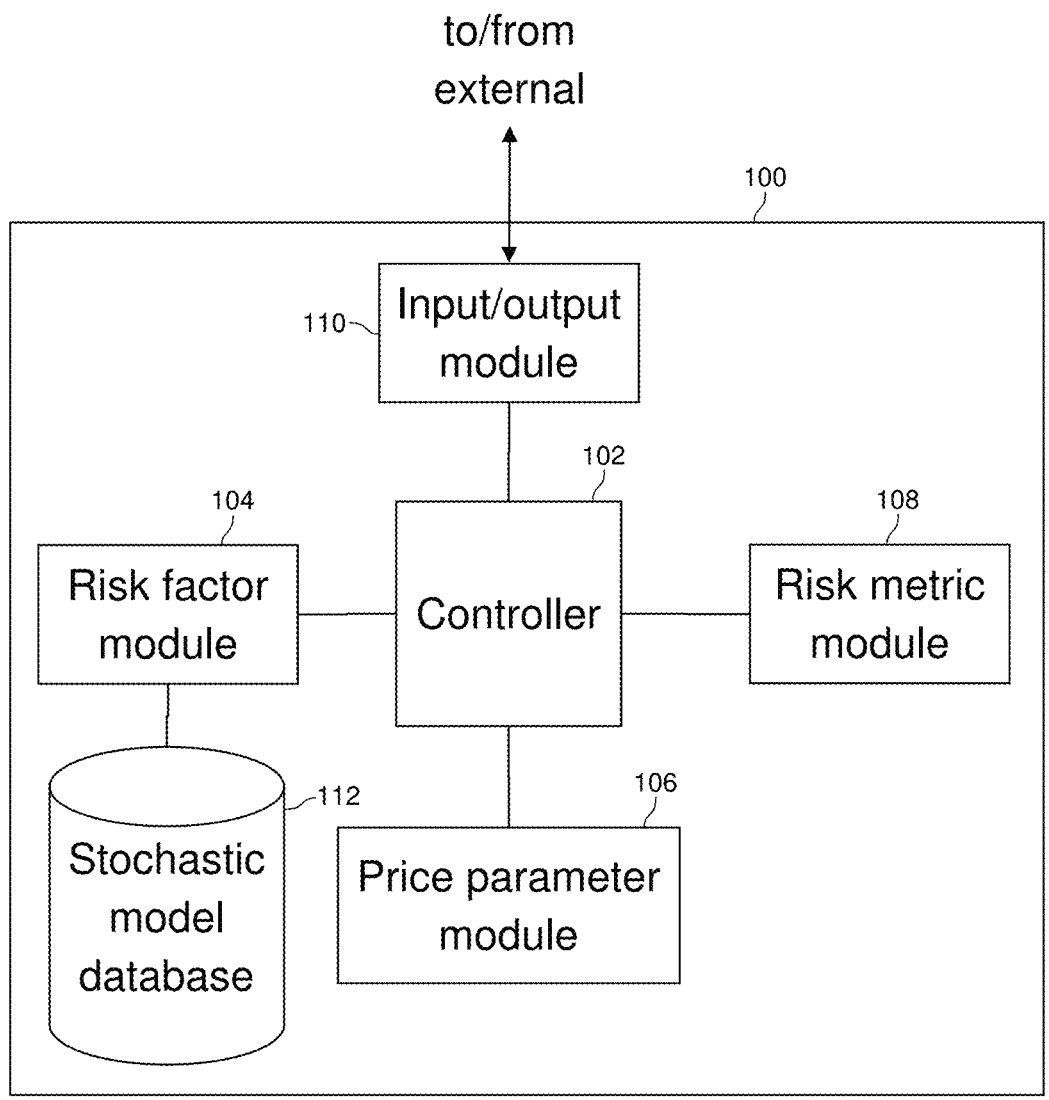
FIG. 5(a) is a schematic block diagram of a prior art forecasting system.
Figure 5B:
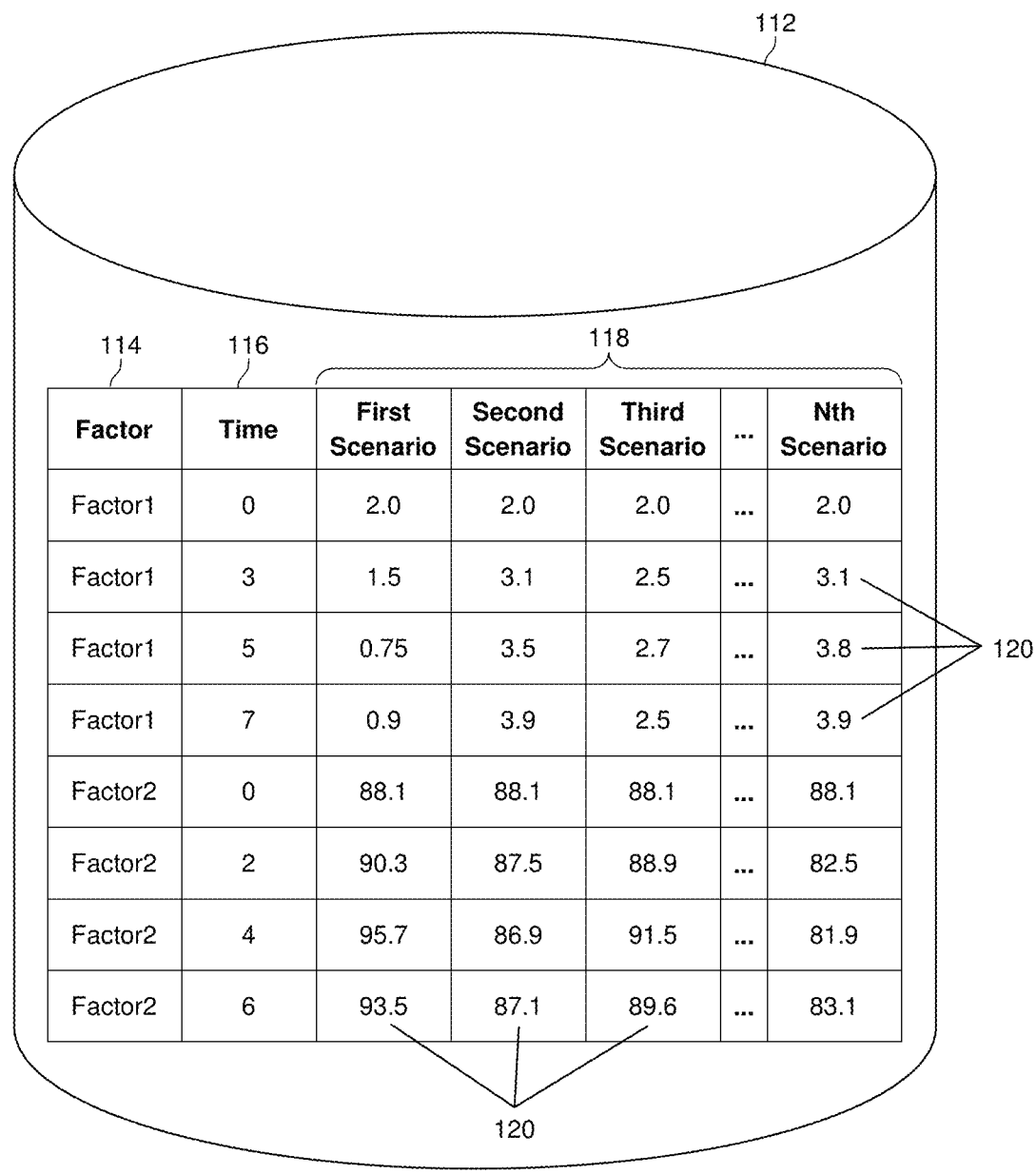
FIG. 5(b) is a schematic block diagram of a stochastic model database of the prior art system of FIG. 5(a)
Figure 5C:
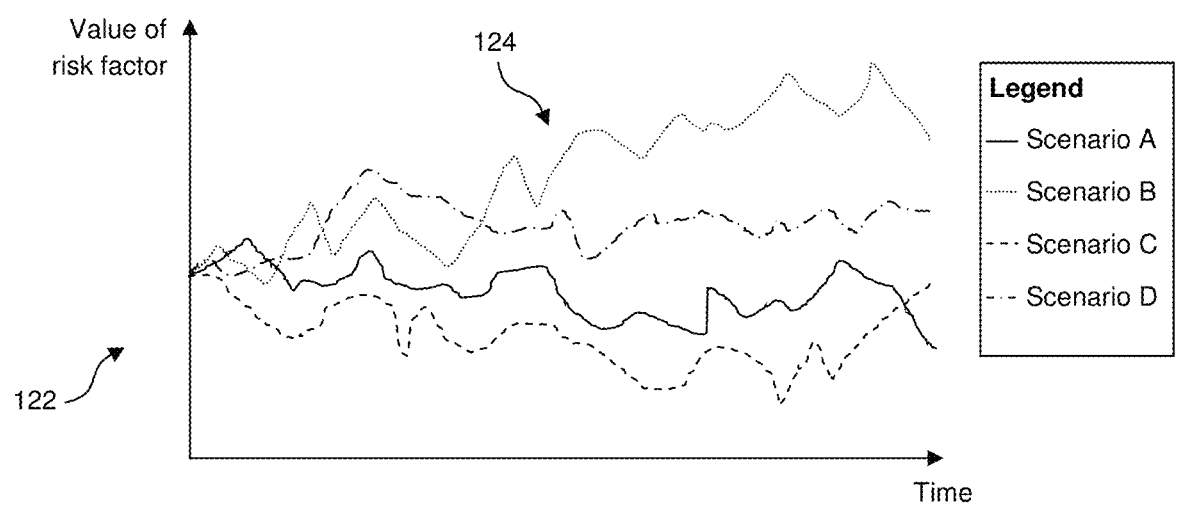
FIG. 5(c) is an example chart showing the variation of values of risk factor over time in a stochastic model stored in the stochastic model database of FIG. 5(b)

The forecasting system 300 may further comprise one or more processor modules. In FIGS. 1(a) and 5(a), five modules are shown. However it is to be appreciated that other arrangements of processing modules and databases may be envisaged which distribute the functionality of the system which would also be within the scope of the present invention.

Computer programs based on the written description and flow charts of this invention are within the skill of an experienced developer. The various software components, functions, programs and/or program modules described in this application may be created using any of the techniques known to one skilled in the art or can be designed in connection with existing software, and implemented as software code to be executed by a processor using any suitable computer language, such as, for example, Java®, C++, Perl, HTML or XML. The software code may be stored as a series of instructions or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the focus of the description above is on the forecasting on data processing system 300, as mentioned in the background section it is to be understood that this data processing system 300 may be part of an overall control system for configuring a system or device to accommodate a future state of the system/device or further events related to the system/device. In particular, such a control system may comprise two elements: namely, the data processing system 300; and, means for using the simulation from the data processing system 300 to control the system/device. The description focuses on the improved data processing system 300 because it is this which enables the overall control system to be either faster for performing the same function as the prior art, or more efficient (namely, requiring less processing power and resources) in performing the same task as the prior art. That is, the data processing system 300 is used to generate a simulation of an end scenario which comprises a set of output parameters based on received input variables. The control system then has means for using the output of the data processing system 300 to control or configure the device/system.

In the above-described embodiments, the number of anchor points was assumed to be equal to the upper bound of summation $N_E$ in the approximation to the pricing parameter function; however, any suitable number of anchor points may be used in different embodiments, including, for example, $N_E+1$ anchor points.

In the above-described embodiments, Chebyshev polynomials are employed by the approximation module 302 as the family of orthogonal functions to be used to approximate the price parameter functions 156. In addition, the anchor points are defined as the Chebyshev points or nodes. That is, the anchor points are the zeros or extrema, plus the points at the end of the domain (e.g. '−1' and '+1'), or a subset of them, of the same family of orthogonal functions, or approximation thereto, as the orthogonal functions or approximations that are used to approximate the price parameter functions 156 in the expansion series database 321. In different embodiments, this need not be the case. That is, a first family of orthogonal functions or approximations may be chosen to approximate the price parameter functions 156 in the expansion series database 321, and the anchor points may be defined as the zeros or extrema, plus the end-points of the domain, of a second (different) family of orthogonal functions or approximations. For example, Lagrange polynomials may be used to approximate the price parameter functions 156 with anchor points that are the Chebyshev points. In more detail, for a transformed or converted price parameter function g(y) as in the above-described embodiments, if $g_j$ is the value of g(y) at the j-th anchor point $y_j$, an approximation q(y) to g(y) may be expressed as $$q(y) = \sum_{j=0}^{N_E} g_j l_j(y), \, y \in [-1, 1],$$

where $l_j(y)$ is the j-th Lagrange polynomial, the anchor points are the $N_E+1$ Chebyshev points of degree $N_E$, and where $l_j(y)$ equals one at the anchor point $y_j$ and zero at all of the other anchor points $y_k$. The approximating function q(y) converges exponentially to g(y) as $N_E$ increases.

Approximation of Transform of Price Parameter Function

In the above-described embodiments, the approximation function q(y) to the converted price parameter function g(y) is generated by the approximation generator 314 using the $g_j$ values, i.e. the values of g(y) at the anchor points, and then this approximation function q(y) is evaluated by the approximation evaluator 316 so as to generate the scenarios. It is not necessary, however, that the generated $g_j$ values are used to generate the approximation function q(y) so as to generate the scenarios in the approximation evaluator 316. For example, the generated $g_j$ values may be used to generate an approximation of a transform of the converted price parameter function g(y). This transform may be any number of possible transforms, for example a first-order derivative, a higher-order derivative, a linear transformation, a quadratic transformation, a polynomial transformation of degree n, etc. That is, the generated $g_j$ values may be used to generate an approximation function h(y), where h(y) is an approximation of a transform of the converted price parameter function g(y), and then h(y) is evaluated by the approximation evaluator 316 so as to generate the scenarios. Note that in these embodiments, q(y) may or may not be generated. Below is described two separate examples in which h(y) is generated in the case where the transform is a first-order derivative of the converted price parameter function g(y).

Referring to FIG. 9(b), in the first example the approximation generator 314 selects the desired expansion series 321 from the expansion series database 320. Instead of generating an approximation function of the pricing function and then storing the approximated pricing function in the approximating pricing function database 318 as in the previously-described embodiments, in the present embodiment the approximation generator 314 generates an approximation of the first-order derivative of the generated approximation function (referred to as the 'derivative approximation function' 319, or the 'Greek approximation function' 319) and then stores the derivative approximation function 319 in the approximating pricing function database 318. The derivative approximation function 319 is then used by the approximation evaluator 316 to generate an approximated value of the derivative approximation function 319 at each of the risk factor scenarios created by the risk factor module 104.

More specifically, the approximation generator 314 computes the converted anchor points $y_j$, $y \in [c,d]$ in the same manner as for the above-described embodiments. The approximation generator 314 then evaluates the pricing function at the anchor points $y_j$ to generate a collection of values $g_j$ of the converted pricing function as for the above-described embodiments. Instead of generating an approximation function using the pricing function values $g_j$ at the converted anchor points $y_j$ as in the above-described embodiments, the approximation generator 314 transforms the $g_j$ values into a collection of values $h_j$ of the derivative of the pricing function, i.e. the Greek function, at the anchor points $y_j$ to generate the Greek approximation function. This transform is described below.

Assume that the Lagrange polynomials are chosen as the family of orthogonal functions for the expansion series as described above. Then the approximation function $q(y)$ of the converted price parameter function $g(y)$ is $$q(y) = \sum_{j=0}^{N_E} g_j l_j(y), \ y \in [-1, 1]$$

Also assume that the maxima of the Chebyshev polynomial of degree $N_E$ are chosen as the anchor points. The pricing function values $g_j$ generated at the anchor points $y_j$ are then transformed into the collection of Greek (or derivative) function values $h_j$ according to $$\begin{bmatrix} h_0 \\ \vdots \\ h_{N_E} \end{bmatrix} = \begin{bmatrix} D_{00} & \cdots & D_{0N_E} \\ \vdots & \ddots & \vdots \\ D_{N_E 0} & \cdots & D_{N_E N_E} \end{bmatrix} \cdot \begin{bmatrix} g_0 \\ \vdots \\ g_{N_E} \end{bmatrix}$$

where $$D_{00} = \frac{2N_E^2 + 1}{6}, \ D_{N_E N_E} = -\frac{2N_E^2 + 1}{6}$$

$$D_{jj} = \frac{-y_j}{2(1-y_j^2)}, \text{ for } 1 \le j \le N_E - 1,$$

$$D_{ij} = \frac{c_i}{c_j} \frac{(-1)^{i+j}}{(y_i - y_j)}, \text{ for } i \ne j$$

$$c_i = \begin{cases} 2 & \text{for } i = 0 \text{ or } N_E, \\ 1 & \text{for } 1 \le i \le N_E - 1 \end{cases},$$

The approximation generator 314 then uses the approximation to the Greek function values $h_j$ to generate the Greek approximation function $h(y)$ according to $$g'(y) = h(y) = \sum_{j=0}^{N_E} h_j l_j(y), \ y \in [-1, 1]$$

where $g'(y)$ is the first-order derivative of $g(y)$.

Now consider a second example in which $h(y)$ is generated in the case where the transform is a first-order derivative of the converted price parameter function $g(y)$, i.e. where $h(y)$ is an approximate Greek function. In this example, Chebyshev polynomials (of the first kind) are chosen as the family of orthogonal functions for the expansion series; however, note that this may be generalised to any family of orthogonal functions. Then the approximation function $q(y)$ to the converted price parameter function $g(y)$ is given by $$q(y) = \sum_{j=0}^{N_E} g_j T_j(y), \ y \in [-1, 1]$$

$$T_0(y) = 1$$

$$T_1(y) = y$$

$$T_{j+1}(y) = 2yT_j(y) - T_{j-1}(y), \ j \in \mathbb{N} \text{ and } j > 0$$

The anchor points are chosen to be the Chebyshev points of degree $N_E$. The approximate Greek function $h(y)$ is then given by $$h(y) = q'(y) = \sum_{j=0}^{N_E} g_j T_j'(y), \ y \in [-1, 1]$$

because the Greek function is the first-order derivative of the pricing function. Note that, in general, the series expansion $\sum_{j=0}^{N_E} g_j T_j'(y)$ may not be orthogonal.

The above two examples assume a one-dimensional pricing function $P(x)$ (or one-dimensional converted pricing function $g(y)$); however, this may be generalised to cases in which the factors $x$ are multi-dimensional. In such cases, multi-dimensional mathematical (partial) derivatives will be needed as inputs to the risk metric calculations. The above two example may also be extended to higher-order derivatives of the pricing function with no loss of generality.

The above two examples of approximating the Greek function are beneficial over prior art methods when the number of anchor points $N_A$ used by the approximation generator 314 is sufficiently small. For example, it is common in prior art methods for the Greek function $G(x)$ to be calculated based on the price parameter function $P(x)$ as $$G(x) = \frac{P\left(x + \frac{1}{2}\Delta x\right) - P\left(x - \frac{1}{2}\Delta x\right)}{\Delta x}$$

where $\Delta x$ is a small incremental value of x. If the risk metric module 108 generates $N_S$ scenarios, it is seen that prior art methods need to evaluate the price parameter function $P(x)$ twice per scenario in order to generate $N_S$ scenarios. In the two examples described above, the price parameter function $P(x)$ (or its converted form $g(y)$) is evaluated by the approximation generator 314 $N_A$ times, i.e. once per anchor point.

Consequently, this embodiment of the invention is beneficial over the prior art methods when $$\frac{2 \cdot N_S \cdot T}{N_A \cdot T + N_S \cdot t} > 1$$

where t is the time taken to run the approximation function, and T is the time taken to run the price parameter function. In general, if the price parameter module 106 (FIG. 5*a*) in prior art systems needs to call the price parameter function n times per scenario, this embodiment of the invention is beneficial over the prior art systems when $$\frac{n \cdot N_S \cdot T}{N_A \cdot T + N_S \cdot t} > 1$$

Stability of Approximation Module 302 Evaluations

There are different computational methods for approximating parameter functions in a forecasting system using Chebyshev and Lagrange polynomials. Some of these computational methods are problematic in that they lead to relatively slow and/or unstable computation of the approximating parameter function in the approximation evaluator 316 (FIG. 9*b*).

Different expressions of the same approximating pricing function need greater or fewer numbers of cycles of a computer processor in order to evaluate the function. This results in different speeds of computation in the approximation evaluator 316 (FIG. 9*b*) depending on the computational method being used. That is, the greater the number of cycles, the slower the computation is.

Computational evaluations of mathematical expressions are subject to so-called 'numerical instabilities' such us floating-point, round-off or truncation errors. These instabilities are rooted in the fact that computers can only express numbers with a limited number of digits. Hence each number expressed in a computer is an approximation to the exact value of the number. For example, if a computer expresses a number with 15 digits, then the computer-expressed number of 1.12345678901234446789 is 1.12345678901234. Therefore, the computational expression of the exact value of the number has an error of 0.00000000000000046789.

The 'numerical errors' arising because of the limited precision that a computer has to express a number may be amplified as the computer performs operations with that number. The greater the number of operations that a computer carries out, the more the numerical error may be amplified. This can result in the output of a computing operation containing relatively large errors to the extent that, in some cases, the result is of limited or no practical use. However, techniques are available such that numerical errors are substantially reduced or eliminated.

For example, when evaluating an approximation function 319 (FIG. 9*b*), the evaluation method described below may be used by the approximation evaluator 316 to guard against numerical instabilities. Specifically, instead of directly evaluating the Chebyshev series $$c(y) = \sum_{j=0}^{N_E} c_j T_j(y), \ y \in [-1, 1]$$

the approximation evaluator 316 may instead evaluate an equivalent expression of the series given by Clenshaw's algorithm:

$$c(y) = \tfrac{1}{2}(a_0 + u_0 - u_2)$$

$$u_k = 2y u_{k+1} - u_{k+2} + a_k$$

$$u_{N_E+1} = 0, u_{N_E} = a_{N_E}$$

$$k = N_E - 1, \ldots, 0$$

Note that the expression given by Clenshaw's algorithm is not an approximation of the Chebyshev series. Both of the expressions are the same mathematical object; however, the expression given by Clenshaw's algorithm is more efficient, i.e. faster than, the direct Chebyshev series when evaluated by a computer.

This is illustrated with reference to FIG. 16, which shows the results of tests carried out with a typical Black-Scholes option pricing formula for the price parameter function. Then 1000 evaluations of each of the two different expressions were carried out by the approximation evaluator 316. This was repeated for different numbers of anchor points (horizontal axis in the graph). It may be seen that the expression obtained by Clenshaw's formula is faster to evaluate than the direct Chebyshev series, and so it is beneficial to use Clenshaw's formula over the Chebyshev series in the approximation evaluator module 316 when the approximation generator 314 uses Chebyshev polynomials as the family of orthogonal polynomials 321 the expansion series database 320.

Now consider an example where a processor needs to evaluate a Lagrange expansion series 321 (FIG. 9*b*) that has used the Chebyshev points as anchor points. In order to guard against numerical instabilities, instead of directly evaluating the Lagrange series $$q(y) = \sum_{j=0}^{N_E} g_j l_j(y), \ y \in [-1, 1]$$

the approximation evaluator 316 may instead evaluate an equivalent expression of the series given by a Barycentric interpolation formula. In this particular example the Barycentric interpolation formula may be expressed as $$q(y) = A(y)/B(y)$$

$$A(y) = \sum_{j=0}^{N_E} {'} \frac{(-1)^j g_j}{y - y_j}$$

$$B(y) = \sum_{j=0}^{N_E} {'} \frac{(-1)^j}{y - y_j}$$

where $q(y)=g$ if $y=y_j$, and where $y_j$ are the anchor points and the primes in the summation operator indicate that the terms $j=0$ and $j=N_E$ are multiplied by a factor of 0.5.

As a further possibility, the approximation evaluator 316 may instead evaluate the Vandermode formula $$q(y) = \sum_{j=0}^{N_E} a_j y^j, \ y \in [-1, 1]$$

where the coefficients $a_j$ are the solution to the following system of linear equations $$\begin{pmatrix} g_0 \\ \vdots \\ g_{N_E} \end{pmatrix} = \begin{pmatrix} 1 & y_0 & \cdots & y_0^{N_E} \\ \vdots & & \ddots & \vdots \\ 1 & y_{N_E} & & y_{N_E}^{N_E} \end{pmatrix} \begin{pmatrix} a_0 \\ \vdots \\ a_{N_E} \end{pmatrix}$$

FIG. 17a shows the results of tests carried out with a typical Black-Scholes option pricing formula for the price parameter function. Then 1000 evaluations of each of the three different expressions were carried out by the approximation evaluator 316. This was repeated for different numbers of anchor points (horizontal axis in the graph). It may be seen that the expression obtained by the Vandermode formula is the fastest to compute, followed in most cases by the Barycentric formula, and followed finally by the direct Lagrange series.

FIG. 17b illustrates the stability of the calculation performed by the approximation evaluator 316 for each of the three expressions above, i.e. direct Lagrange series, Barycentric formula, and Vandermode formula. The stability is measured as the precision (vertical axis) of the computation in the domain [a, b] where the approximation module 302 computes approximation values for the price parameter. The precision is defined as the maximum error of the approximation calculation, compared to the original price parameter function $f(x)$ in the domain [a, b].

It may be seen that the direct Lagrange series and the Barycentric formula provide similar levels of precision; however, the Vandermode formula provides notable errors when the number of anchor points is greater than approximately fifteen. The source of these errors is in the numerical instability of the algorithm used to compute the calculation by the computer. Note that the threshold value of fifteen anchor points for the Vandermode formula is specific to this example. This threshold value may be higher or lower depending on the price parameter function that is being approximated.

Therefore, the Vandermode formula may be optimal in terms of speed and stability for the evaluation of Lagrange series when the number of anchor points is sufficiently low (e.g. less than fifteen). However, for a greater number of anchor points, the Barycentric evaluator is optimal in terms of speed and stability.

Transformation of Anchor Points

In the above-described embodiments, the anchor points are defined as the zeros or extrema, plus the points at the end of the interval, of a family of orthogonal functions (e.g. Chebyshev polynomials), and then the (converted) price parameter function is evaluated at the anchor points. The price parameter function values at the anchor points are then used to generate an approximation to the price parameter function. In some embodiments, values of the price parameter function at points different from the anchor points are known a priori. Although it may be possible to generate an approximation to the price parameter function using the function values at these given points, an optimal approximation to the price parameter function is obtained by generating the approximation value based on the price parameter function values at the anchor points. Hence, in such a case the transformer 312 (FIG. 9b) transforms the given values of the price parameter function at non-anchor points to the values of the price parameter function at the chosen anchor points.

With reference to FIGS. 18a and 18b, consider the case in which the values of the price parameter function $f(x)$ are known at the values $x=x_1, x_2, x_3$ indicated by crosses in FIG. 18a. In this case, Chebyshev polynomials are chosen as the family of orthogonal polynomials by the expansion series database 321, and the Chebyshev points, i.e. the anchor points, are indicated by circles in FIG. 18a. The price parameter function $f(x)$ is then transformed to g(y) according to $x \in [a,b] \rightarrow y \in [c,d]$ $x_1 \rightarrow y_1; x_2 \rightarrow y_2; x_3 \rightarrow y_3$ $f(x) \rightarrow g(y)$ such that in the y domain, the given values of the parameter function correspond to the values of the price parameter function at the anchor points as shown in FIG. 18b, i.e. the points indicated by crosses coincide with the points indicated by circles. The exact nature of this transformation will of course depend on the points at which the price parameter functions are given and on the choice of anchor points.

Piecewise Input Interval

In the above-described embodiments, the approximation module 302 performs a single approximation of the price parameter function $f(x)$ across the entire interval $x=[-a, b]$ to obtain the approximation function q(y). In some cases, an optimal approximation of $f(x)$ may be obtained by dividing the interval $x=[-a, b]$ into a plurality of sub-intervals and generating an approximation function to $f(x)$ in each of the sub-intervals, i.e. by approximating $f(x)$ in a piecewise manner.

FIG. 19 illustrates a price parameter function $f(x)$ in which it may be advantageous to generate its approximation in a piecewise manner. In particular, FIG. 19 shows a typical price parameter function of an option when the risk factor parameter x is the so-called "option Spot underlying". It may be seen how the value of the option price parameter changes relatively abruptly around the value x=100.

Consider the case in which the price parameter function in FIG. 19 is approximated using Chebyshev polynomials as the chosen family of orthogonal polynomials by the expansion series database 320 (FIG. 9b). If the approximation generator 314 generates the approximation as a single function across the entire domain from a=50 to b=150, the approximating function will have a maximum error of $10^{-6}$ when the approximation generator 314 uses 70 anchor points.

Alternatively, if the domain [a=50, b=150] is split into the three sub-domains or sub-intervals given by [a=50, 85], [85, 115] and [115, b=150], then a separate approximation of the price parameter function may be generated for each of the three sub-domains and stored in the approximating pricing function database 318. Thereafter, when the approximation evaluator 316 generates an approximated value for the price parameter for a given scenario, the approximation controller 310 will select the approximating pricing function 319 that corresponds to the value of the risk parameter value of that scenario. That is, the approximation controller 310 will select one of the three generated approximating functions, depending on whether the risk factor parameter of the scenario falls in the [a=50, 85], [85, 115] or [115, b=150] interval. For the case in which the total number of anchor points used is 30, i.e. the sum of the number of anchor points in the three intervals, the approximation evaluator 316 also delivers an accuracy of $10^{-6}$ relative to the price parameter function $f(x)$.

The benefits of the described piecewise approach are two-folded. Firstly, the number of times that the original price parameter function $f(x)$ needs to be called by the approximation module is reduced, i.e. the number of anchor points is reduced from 70 to 30.

Secondly, the expansion series 319 used by the approximation evaluator 316 when the approximation module 302 uses only a single expansion series across the entire domain [a=50, b=150] has 70 terms (corresponding to the 70 anchor points). However, the expansion series 319 used by the approximation evaluator 316 when the approximation module 302 uses a separate expansion series in each of the three sub-domains defined above has fewer than 30 terms (corresponding to the 30 anchor points). This is because the 30 anchor points are distributed between the three approximating functions in the approximating function database 318, and so each individual one of them will always have fewer than 30. As a result, the time t taken by the approximation evaluator 316 to generate the approximate pricing function for each scenario is decreased.

As described previously, the time to perform a forecasting calculation is $N_A \cdot T + N_S \cdot t$, where $N_S$ is the number of scenarios and T is the evaluation time of the original price parameter function $f(x)$. The time t to evaluate the approximating function depends on the number of terms $N_E$ in the expansion series. Note that the approximate time that prior art systems take to perform a forecasting computation is $N_S \cdot T$.

When the approximation module 302 uses one single domain, $N_E$ is approximately equal to the number of anchor points $N_A$. However, when the domain [a, b] is split into sub-domains, the number of terms $N_E$ in the expansion series is always smaller than the number of anchor points $N_A$.

Referring to the example given above with reference to FIG. 19, typical values of the above-mentioned variables on a desktop computer may be t=700 nanoseconds for $N_E$=70, t=120 nanoseconds for $N_E$=15, T=1 millisecond, and $N_S$=100,000 scenarios. The following table shows the approximated computation time in each of the cases considered:

| Case | Approximate Computational time | Acceleration over prior art |
| --- | --- | --- |
| Prior Art | 100,000 ms | n/a |
| One expansion series | 140 ms | 714 times faster |
| Three expansion series | 27 ms | 3,700 times faster |

The invention claimed is:

1. A control system for configuring a system/device to accommodate a future state of the system/device or further events related to the system/device, the control system comprising:
  a data processing system for generating a future behaviour simulation of the system/device, the simulation comprising a set of output parameters; and
  a feedback controller for using the simulation generated by the data processing system as feedback for the control system to configure the system/device,
    wherein, the data processing system comprises one or more processors configured to implement:
      an input/output module configured to receive sets of values of one or more variables from one or more external parties;
      an input factor module configured to determine one or more input scenarios based on the received sets of values;
      an approximation module having an approximation generator and an approximation evaluator, the approximation module being configured to determine an approximated value of each of one or more parameters in a first domain based on the one or more input scenarios, the one or more parameters being dependent on the one or more variables which vary in a second domain, and the one or more parameters being determined by one or more functions which relate the sets of values of the one or more variables in the second domain to corresponding values in the first domain; and
      a metric module configured to calculate one or more standard metrics based on the one or more approximated parameters in the first domain so as to generate the set of output parameters to be output via the input/output module,
    wherein the approximation generator is configured to:
      select a plurality of anchor points in the second domain, each selected anchor point comprising one of the received sets of values of the one or more variables in the second domain, and the selected anchor points being selected from the zeros or extrema of each of a series of orthogonal functions, or selected from a subset of the zeros or extrema;
      evaluate, at each selected anchor point, the one or more functions to generate corresponding values of each of the parameters in the first domain; and
      generate an approximation function to each of the one or more functions by fitting the series of orthogonal functions or an approximation to the series of orthogonal functions to the corresponding values of the one or more parameters in the first domain,
    wherein the approximation evaluator is configured to use the approximation function to generate the approximated value of each of the one or more parameters in the first domain.

2. The control system of claim 1, wherein the approximation module is configured to transform the function into an intermediary function before generating the approximation function, wherein the intermediary function is a linear transformation of the function, and wherein the approximation module is configured to approximate the intermediary function to generate the approximation function.

3. The control system of claim 2, wherein transforming the function comprises linearly transforming the function into a predetermined range.

4. The control system of claim 1, wherein the series of orthogonal functions is one of the group comprising: sines, cosines, sines and cosines, Bessel functions, Gegenbauer polynomials, Hermite polynomials, Laguerre polynomials, Chebyshev polynomials, Jacobi polynomials, Spherical harmonics, Walsh functions, Legendre polynomials, Zernike polynomials, Wilson polynomials, Meixner-Pollaczek polynomials, continuous Hahn polynomials, continuous dual Hahn polynomials, a classical polynomials described by the Askey scheme, Askey-Wilson polynomials, Racah polynomials, dual Hahn polynomials, Meixner polynomials, piecewise constant interpolants, linear interpolants, polynomial interpolants, gaussian process based interpolants, spline interpolants, barycentric interpolants, Krawtchouk polynomials, Charlier polynomials, sieved ultraspherical polynomials, sieved Jacobi polynomials, sieved Pollaczek polynomials, Rational interpolants, Trigonometric interpolants, Hermite interpolants, Cubic interpolants, and Rogers-Szegö polynomials.

5. The control system of claim 1, wherein the series of orthogonal functions is a series of orthogonal polynomials.

6. The control system of claim 1, wherein the approximation to a series of orthogonal functions is an approximation to a series of orthogonal polynomials.

7. The control system of claim 1, wherein the approximation module is configured to select a series of orthogonal functions or an approximation to a series of orthogonal functions before generating the approximation function, and wherein the approximation module is configured to use the selected series of orthogonal functions or the approximation to the series of orthogonal functions to generate the approximation function.

8. The control system of claim 1, wherein the approximation module is configured to select the number of anchor points, $N_E$, is so that:

$$\frac{N_S \cdot T}{N_E \cdot T + N_S \cdot t} > 1$$

wherein $N_s$ is the number of scenarios, t is the time taken to run the approximation function, and T is the time taken to run the function.

9. The control system of claim 1, the approximation module is configured to hold the values of all but one variable in the set to be constant when evaluating function.

10. The control system of claim 1, wherein the values of the variables vary stochastically.

11. The control system of claim 1, wherein the approximation module is configured to use the approximation function a plurality of times to generate at least one scenario or one time step, each scenario or each time step comprising a plurality of approximated values.

12. The control system of claim 11, wherein the number of scenarios or time steps is significantly greater than the number of anchor points.

13. The control system of claim 1, wherein an output of the function is a parameter of a financial product.

14. The control system of claim 13, wherein the financial product is a financial derivative including one or more of a group comprising: an option pricing function, a swap pricing function and a combination thereof.

15. The control system of claim 1, wherein the function is one of the group comprising: a Black-Scholes model, a Langstaff-Schwartz model, a binomial options pricing model, a Black model, a Garman-Kohlhagen model, a Vanna-Volga method, a Chen model, a Merton's model, a Vasicek model, a Rendleman-Bartter model, a Cox-Ingersoll-Ross model, a Ho-Lee model, a Hull-White model, a Black-Derman-Toy model, a Black-Karasinski model, a Heston model, a Monte Carlo based pricing model, a binomial pricing model, a trinomial pricing model, a tree based pricing model, a finite-difference based pricing model, a Heath-Jarrow-Morton model, a variance gamma model, a Fuzzy pay-off method, a Single-index model, a Chepakovich valuation model, a Markov switching multifractal, a Datar Mathews method, and a Kalotay-Williams-Fabozzi model.

16. The control system of claim 1 wherein the approximation module is configured to generate the approximating function using an interpolation scheme.

17. The control system of claim 16, wherein the interpolation scheme is one from the group comprising: piecewise constant interpolants, linear interpolants, polynomial interpolants, gaussian process based interpolants, spline interpolants, barycentric interpolants, Rational interpolants, Trigonometric interpolants, Hermite interpolants and Cubic interpolants.

18. The control system of claim 1, wherein the anchor points are integration points of a numerical integration scheme.

19. The control system of claim 18, wherein the numerical integration scheme is one from the group comprising: Newton-Cotes methods, a trapezoidal method, a Simpson's method, a Boole's method, a Romberg integration method, Gaussian quadrature methods, Chenshaw-Curtis methods, a Fejer method, a Gaus-Kronrod method, Fourier Transform methods, an Adaptive quadrature method, a Richardson extrapolation, a Monte Carlo and Quasi Monte Carlo method, a Markov chain Monte Carlo, a Metropolis Hastings algorithm, a Gibbs Sampling, and Fast Fourier Transform methods.

20. The control system of claim 1, wherein the approximation module is configured to determine the approximated value of the parameter such that there is a difference between the approximated value of the parameter and the parameter in the $2^{nd}$ significant figure when compared at the same point in the first domain.

21. The control system of claim 1, wherein the approximation module is configured to determine the approximated value of the parameter such that there is a difference between the approximated value of the parameter and the parameter in between the $4^{th}$ and the $6^{th}$ significant figure when compared at the same point in the first domain.

22. The control system of claim 1, wherein the approximation module is configured to determine the approximated value of the parameter such that there is a difference between the approximated value of the parameter and the parameter in the $15^{th}$ significant figure when compared at the same point in the first domain.

23. The control system of claim 1, wherein the system is configured to determine a plurality of anchor points in a sub-domain of the second domain, wherein each anchor point comprises a set of values of the one or more variables in the sub-domain of the second domain, and the generating step comprises generating the approximation function to the function in the sub-domain.

24. The control system of claim 1, wherein the approximation function is configured to apply a transform to the approximation function, and use the transformed approximation function to generate the approximated value of the parameter.

25. The control system of claim 24, wherein the transform is a derivative of the approximation function with respect to at least one of the variables in the second domain.

26. A control system for configuring a system/device to accommodate a future state of the system/device or further events related to the system/device, the control system comprising:
  a financial forecasting system for generating a financial risk simulation of the system/device, the financial risk simulation comprising a set of output parameters;
  a feedback controller for using the financial risk simulation generated by the financial forecasting system as feedback for the control system to configure the system/device,
    wherein the financial forecasting system comprises one or more processors configured to implement:

an input/output module configured to receive sets of values of one or more variables from one or more external parties;

an input factor module configured to determine one or more input scenarios based on the received sets of values;

a price parameter approximation module having a price parameter approximation generator and a price parameter approximation evaluator, the price parameter approximation module being configured to determine an approximated value of each of one or more price parameters in a first domain based on the one or more input scenarios, the one or more price parameters being dependent on the one or more variables which vary in a second domain, and the one or more price parameters being determined by a one or more price parameter functions which relate the sets of values of the one or more variables in the second domain to corresponding values in the first domain; and a risk metric module configured to calculate one or more standard financial risk metrics based on the one or more approximated price parameters in the first domain so as to generate the set of output parameters to be output via the input/output module, wherein the price parameter approximation generator is configured to:
select a plurality of anchor points in the second domain, each selected anchor point comprising one of the received sets of values of the one or more variables in the second domain, and the selected anchor points being selected from the zeros or extrema of each of a series of orthogonal functions, or selected from a subset of the zeros or extrema;

evaluate, at each selected anchor point, the one or more price parameter functions to generate corresponding values of each of the price parameters in the first domain; and generate an approximation price parameter function to each of the one or more price parameter functions by fitting the series of orthogonal functions or an approximation to the series of orthogonal functions to the corresponding values of the one or more price parameters in the first domain, wherein the price parameter approximation evaluator is configured to use the approximation price parameter functions to generate the approximated value of each of the one or more price parameters in the first domain.

27. The control system of claim 26, wherein the series of orthogonal functions is the Lagrange polynomials.

28. The control-system of claim 26, wherein the series of orthogonal functions is the Chebyshev polynomials, and the control system is caused to apply a Clenshaw algorithm to the approximation function to obtain a Clenshaw approximation function.

29. The control system of claim 26, wherein the series of orthogonal functions is the Lagrange polynomials, and the control system is caused to apply a Barycentric algorithm to the approximation function to obtain a Barycentric approximation function.

30. A computer-implemented method of determining an approximated value of a parameter in a first domain, the parameter being dependent on one or more variables which vary in a second domain, and the parameter being determined via a function which relates sets of values of the one or more variables in the second domain to corresponding values in the first domain, the method being implemented on a computer system including a processor, and the method comprising:

generating a future behaviour simulation of a system/device, the simulation comprising a set of output parameters; and using the generated simulation as feedback for the computer system to configure the system/device,
wherein the computer system is configured to implement an input/output module configured to receive sets of values of one or more variables from one or more external parties and an input factor module configured to determine one or more input scenarios based on the received sets of values;

determining an approximated value of each of one or more parameters in a first domain based on the one or more input scenarios, the one or more parameters being dependent on the one or more variables which vary in a second domain, and the one or more parameters being determined by one or more functions which relate the sets of values of the one or more variables in the second domain to corresponding values in the first domain; and calculating one or more standard metrics based on the one or more approximated parameters in the first domain so as to generate the set of output parameters to be output via the input/output module;

selecting a plurality of anchor points in the second domain, wherein each anchor point comprises a set of values of the one or more variables in the second domain, and the selected anchor points are selected from the zeros or extrema of each of a series of orthogonal functions, or selected from a subset of the zeros or extrema;

evaluating, at each anchor point, the one or more functions to generate corresponding values of each of the parameters in the first domain;

applying a transform to the corresponding values of the parameter in the first domain;

generating an approximation function to each of the one or more functions by fitting a series of orthogonal functions or an approximation to the series of orthogonal functions to the transformed corresponding values of the parameter in the first domain; and using the approximation function to generate the approximated value of the one or more parameters in the first domain;

wherein the approximation evaluator is configured to use the approximation function to generate the approximated value of each of the one or more parameters in the first domain.

31. A computer-implemented method of determining an approximated value of a parameter in a first domain, the parameter being dependent on one or more variables which vary in a second domain, and the parameter being determined by a function which relates sets of values of the one or more variables in the second domain to corresponding values in the first domain, the method being implemented on a computer system including a processor, and the method comprising:

receiving a plurality of given values of the parameter in the first domain corresponding to a plurality of given sets of values of the one or more variables in the second domain;

determining one or more input scenarios based on the received plurality of given values;

determining an approximated value of each of one or more parameters in a first domain based on the one or more input scenarios, the one or more parameters being dependent on the one or more variables which vary in a second domain, and the one or more parameters being determined by one or more functions which relate the sets of values of the one or more variables in the second domain to corresponding values in the first domain;

calculating one or more standard metrics based on the one or more approximated parameters in the first domain so as to generate the set of output parameters;

selecting a plurality of anchor points in the second domain, wherein each selected anchor point comprises one of the received set of values of the one or more variables in the second domain, and the selected anchor points being selected from the zeros or extrema of each of a series of orthogonal functions, or selected from a subset of the zeros or extrema;

transforming the given sets of values of the one or more variables in the second domain to correspond to the plurality of anchor points;

generating an approximation function to the one or more functions by fitting a series of orthogonal functions or an approximation to a series of orthogonal functions to the given values of the parameter in the first domain at the plurality of anchor points; and using the approximation function to generate the approximated value of the parameter in the first domain.

* * * * *